United States Patent
Nagai et al.

(10) Patent No.: US 7,495,559 B2
(45) Date of Patent: Feb. 24, 2009

(54) RFID TAG INFORMATION COMMUNICATING DEVICE, CARTRIDGE FOR RFID TAG INFORMATION COMMUNICATING DEVICE, AND RFID CIRCUIT ELEMENT PROCESSING SYSTEM

(75) Inventors: Takuya Nagai, Nagoya (JP); Tsuyoshi Ohashi, Hashima (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 302 days.

(21) Appl. No.: 11/379,908

(22) Filed: Apr. 24, 2006

(65) Prior Publication Data

US 2006/0250252 A1    Nov. 9, 2006

Related U.S. Application Data

(63) Continuation-in-part of application No. PCT/JP2004/015024, filed on Oct. 12, 2004.

(30) Foreign Application Priority Data

Oct. 24, 2003  (JP) .............................. 2003-364842
Mar. 11, 2004  (JP) .............................. 2004-068424

(51) Int. Cl.
*G08B 13/14*  (2006.01)

(52) U.S. Cl. .............. 340/572.1; 340/572.4; 340/572.7; 340/572.8; 340/825.69; 340/825.72; 340/10.1; 347/7; 347/19; 347/50

(58) Field of Classification Search .............. 340/572.7, 340/572.1, 572.4, 572.8, 825.69, 825.72, 340/10.1; 235/375, 376, 380, 383; 347/7, 347/19, 50

See application file for complete search history.

(56) References Cited

U.S. PATENT DOCUMENTS

| 5,653,542 | A  | 8/1997  | Sugimoto et al. |
| 6,042,280 | A  | 3/2000  | Yamaguchi et al. |
| 6,116,796 | A  | 9/2000  | Yamaguchi et al. |
| 7,128,380 | B2 * | 10/2006 | Hatasa et al. .................. 347/7 |

FOREIGN PATENT DOCUMENTS

| JP | 7314831   | A | 12/1995 |
| JP | 10236041  | A | 9/1998  |

(Continued)

OTHER PUBLICATIONS

International Bureau of WIPO, International Preliminary Report on Patentability for Related Application No. PCT/JP2005/017791, dated Apr. 3, 2007.

(Continued)

*Primary Examiner*—Hung T. Nguyen
(74) *Attorney, Agent, or Firm*—Baker Botts L.L.P.

(57) ABSTRACT

The RFID tag information communicating device contains a cartridge holder for detachably mounting a cartridge; an antenna; a signal processing circuit for producing access information used to access RFID tag information of an IC circuit part; a transmitting portion for transmitting the produced access information via the antenna to an antenna in a non-contact manner; and a control circuit for controlling a transmission manner from the transmitting portion so as to be coincident with either a tag attribute parameter or a communication parameter of an RFID circuit element To equipped in the cartridge mounted on the cartridge holder.

35 Claims, 35 Drawing Sheets

FOREIGN PATENT DOCUMENTS

| | | |
|---|---|---|
| JP | 2002002026 A | 1/2002 |
| JP | 2002092707 A | 3/2002 |
| JP | 2002133372 A | 5/2002 |
| JP | 2003018043 A | 1/2003 |
| JP | 2003099721 A | 4/2003 |
| JP | 2003168099 A | 6/2003 |

OTHER PUBLICATIONS

Technical Report: 860 MHz—930 MHz Class I Radio Frequency Identification Tag Radio Frequency & Logical Communication Interface Specification Candidate Recommendation, Version 1.01, published Nov. 14, 2002 by the Auto-ID Center of the Massachusetts Institute of Technology.

* cited by examiner

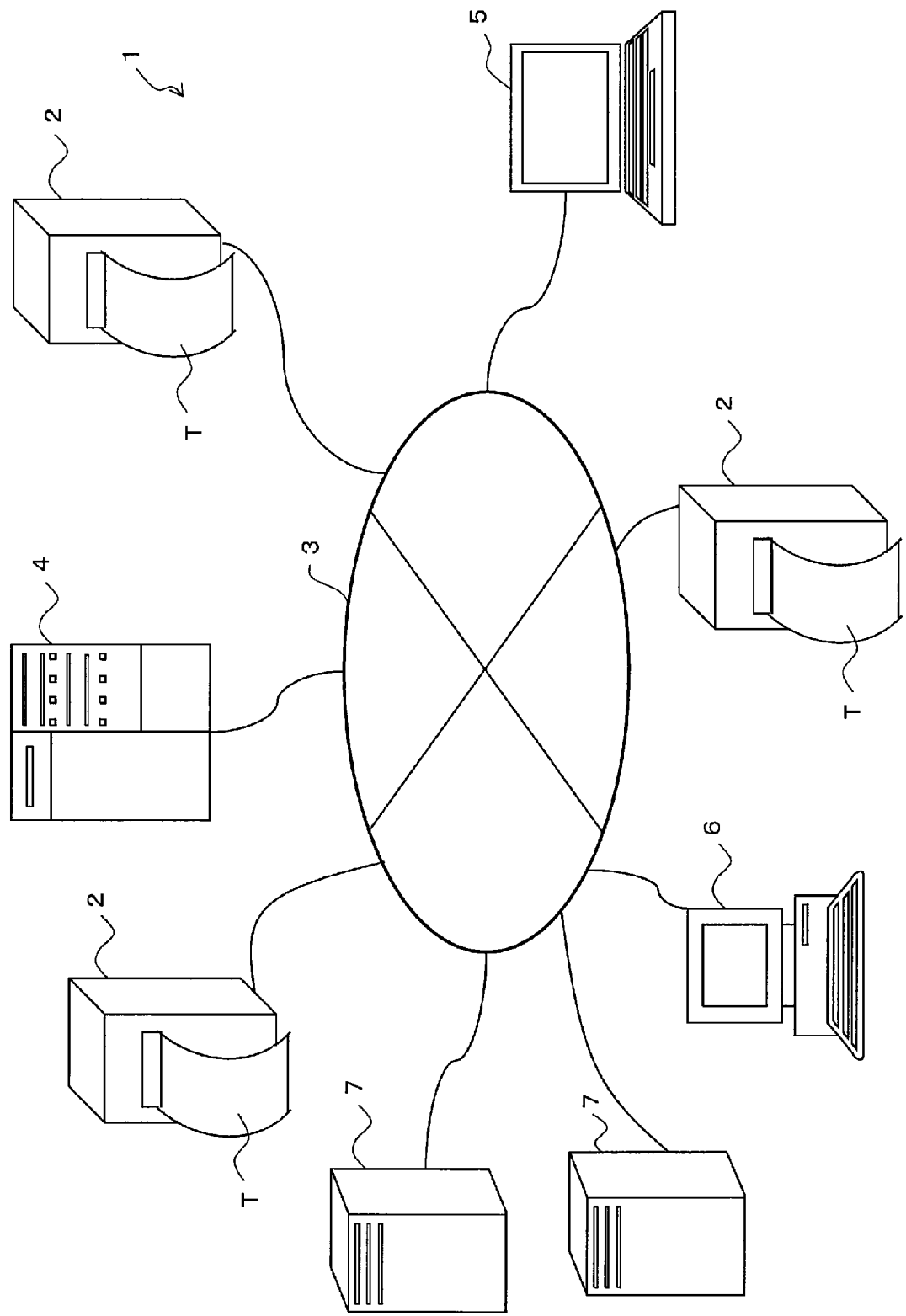
[FIG.1]

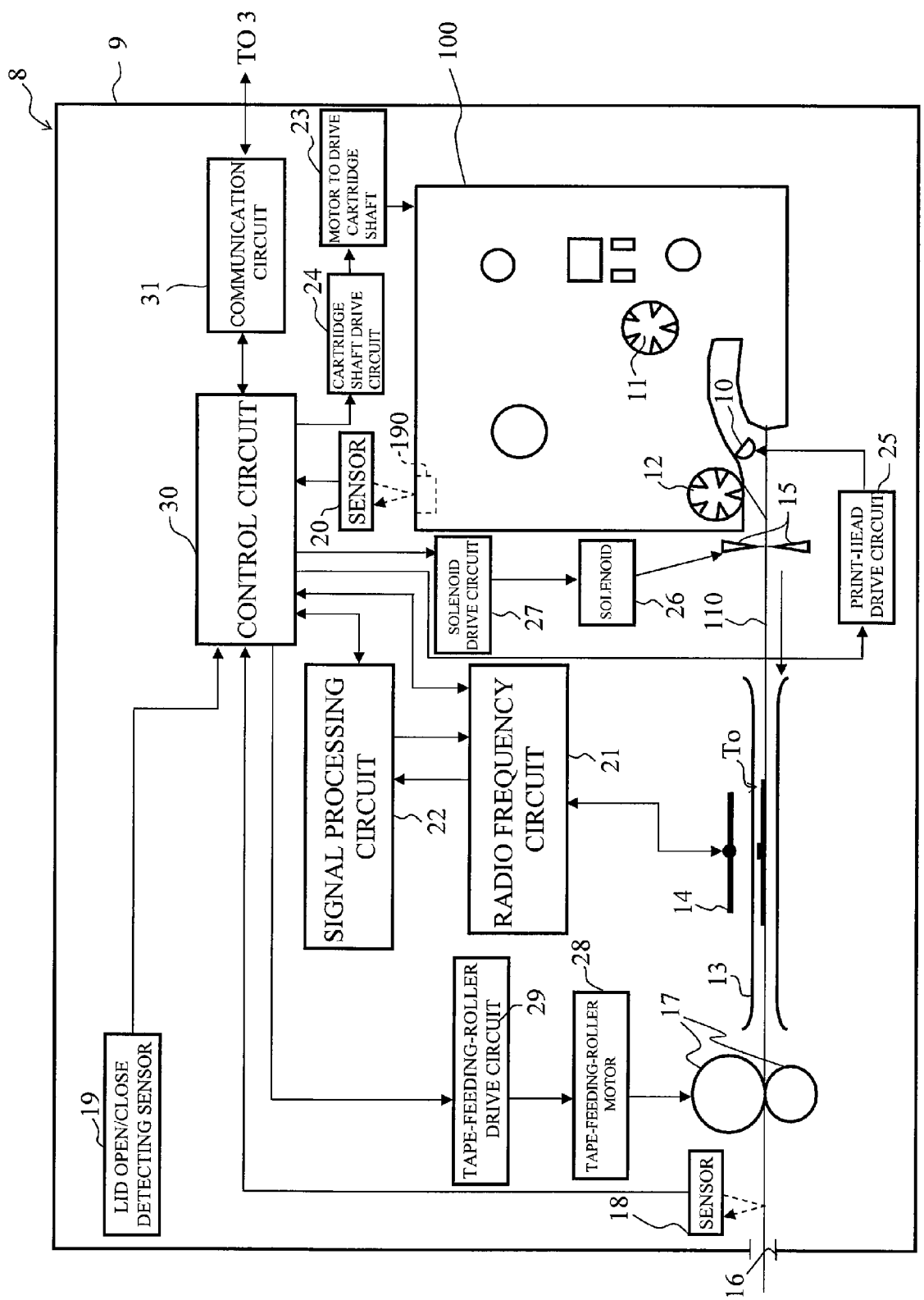
[FIG.2]

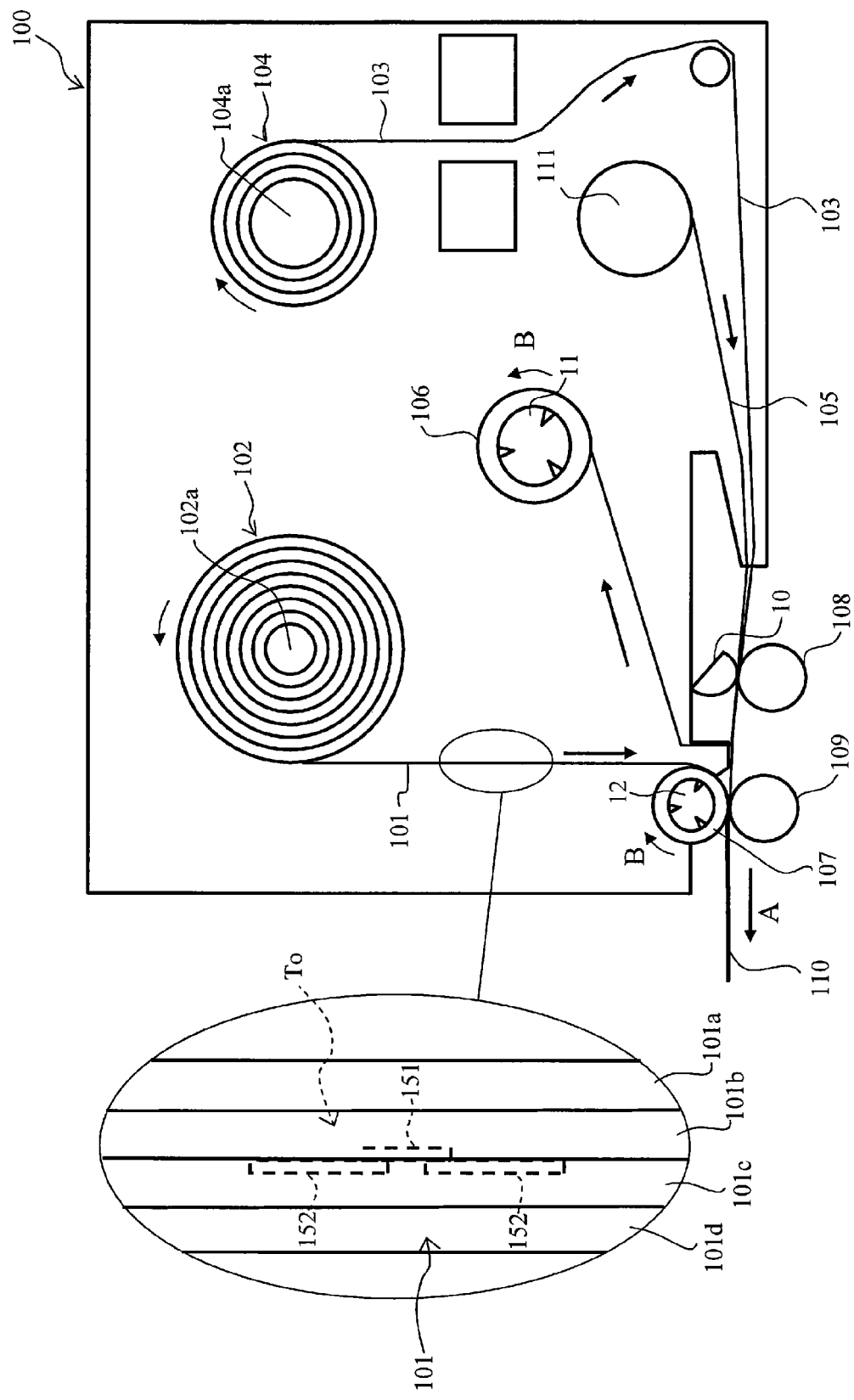
[FIG.3]

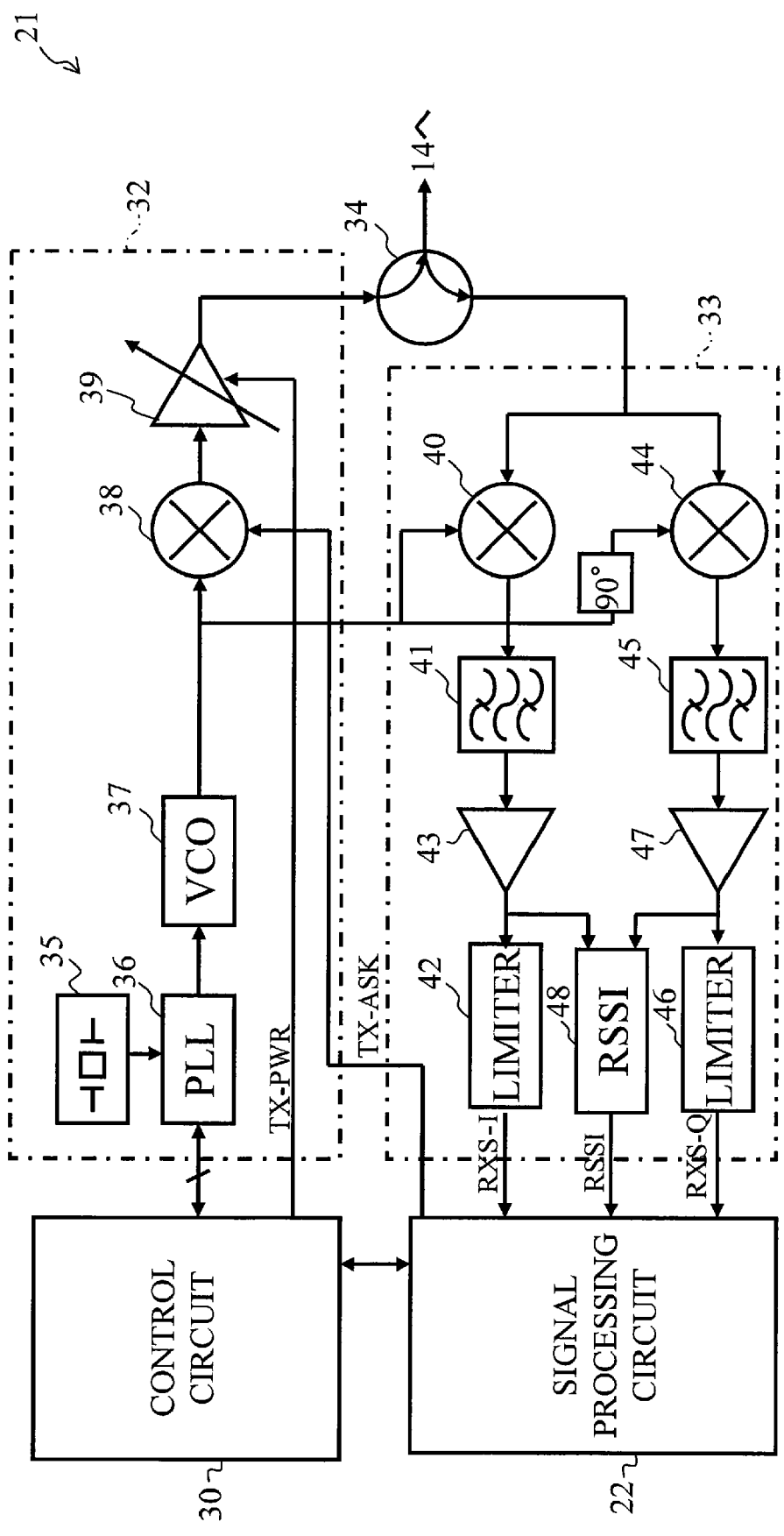
[FIG. 4]

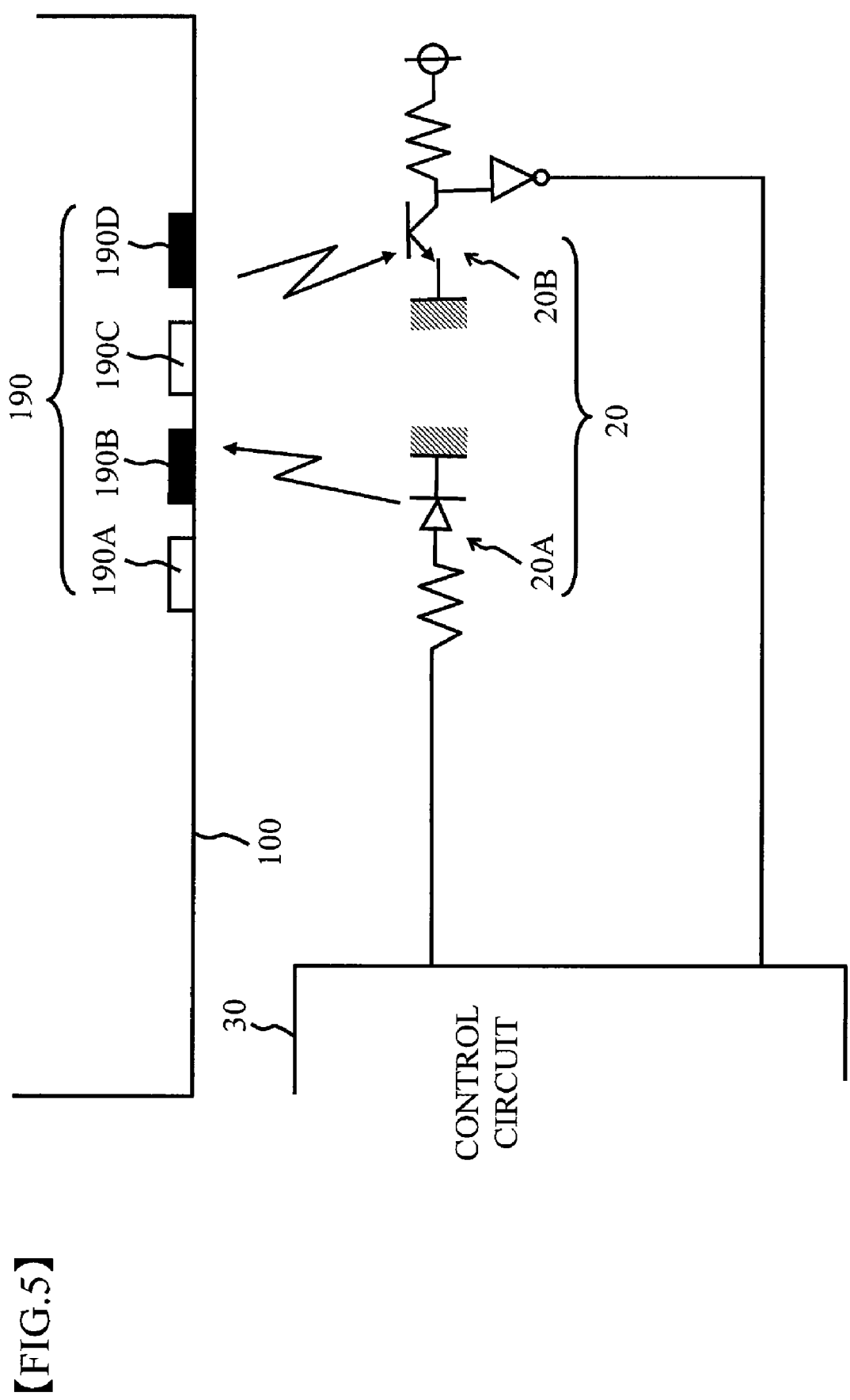
[FIG.5]

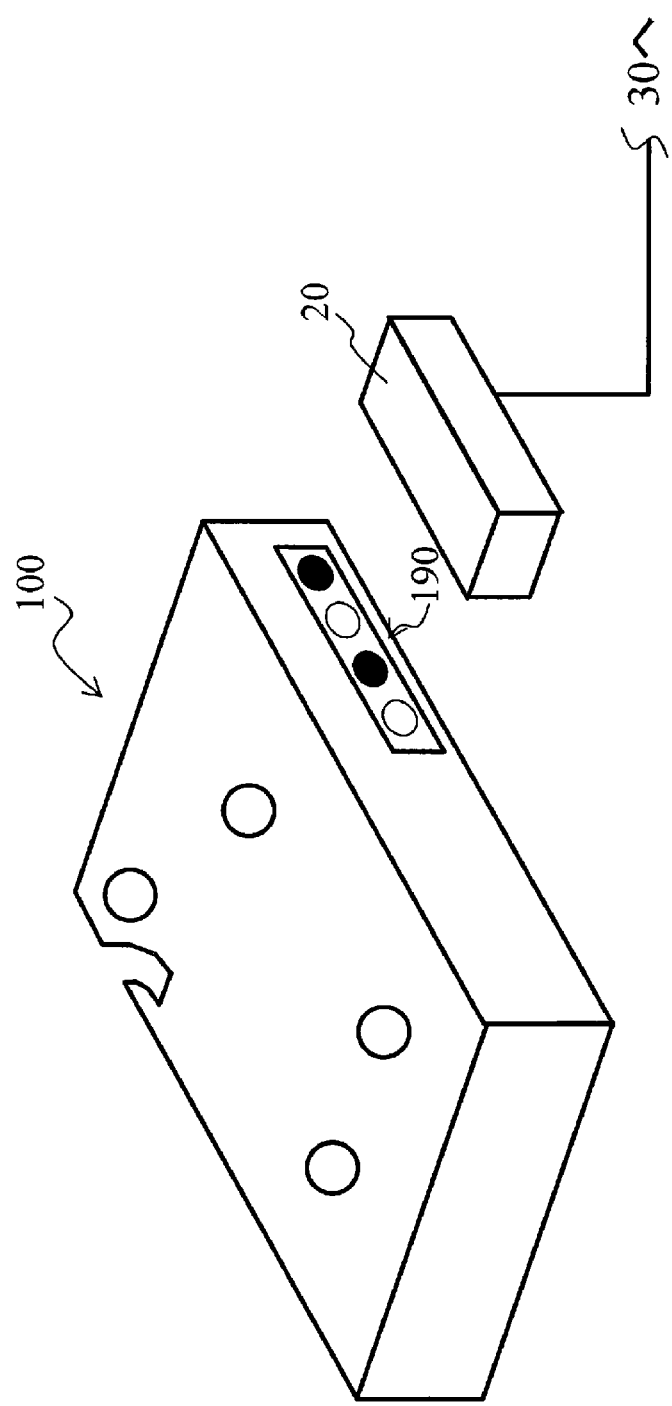
[FIG.6]

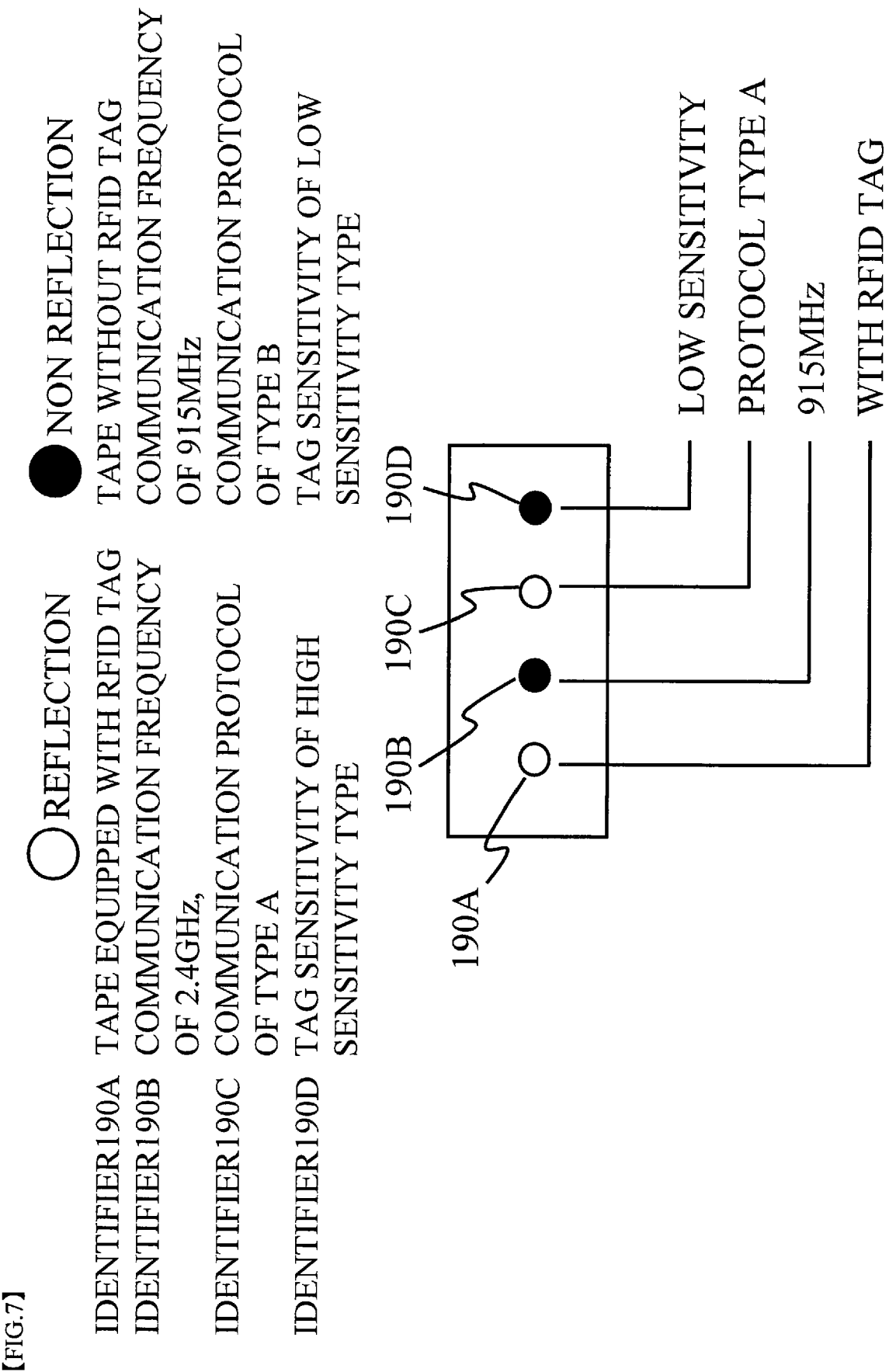

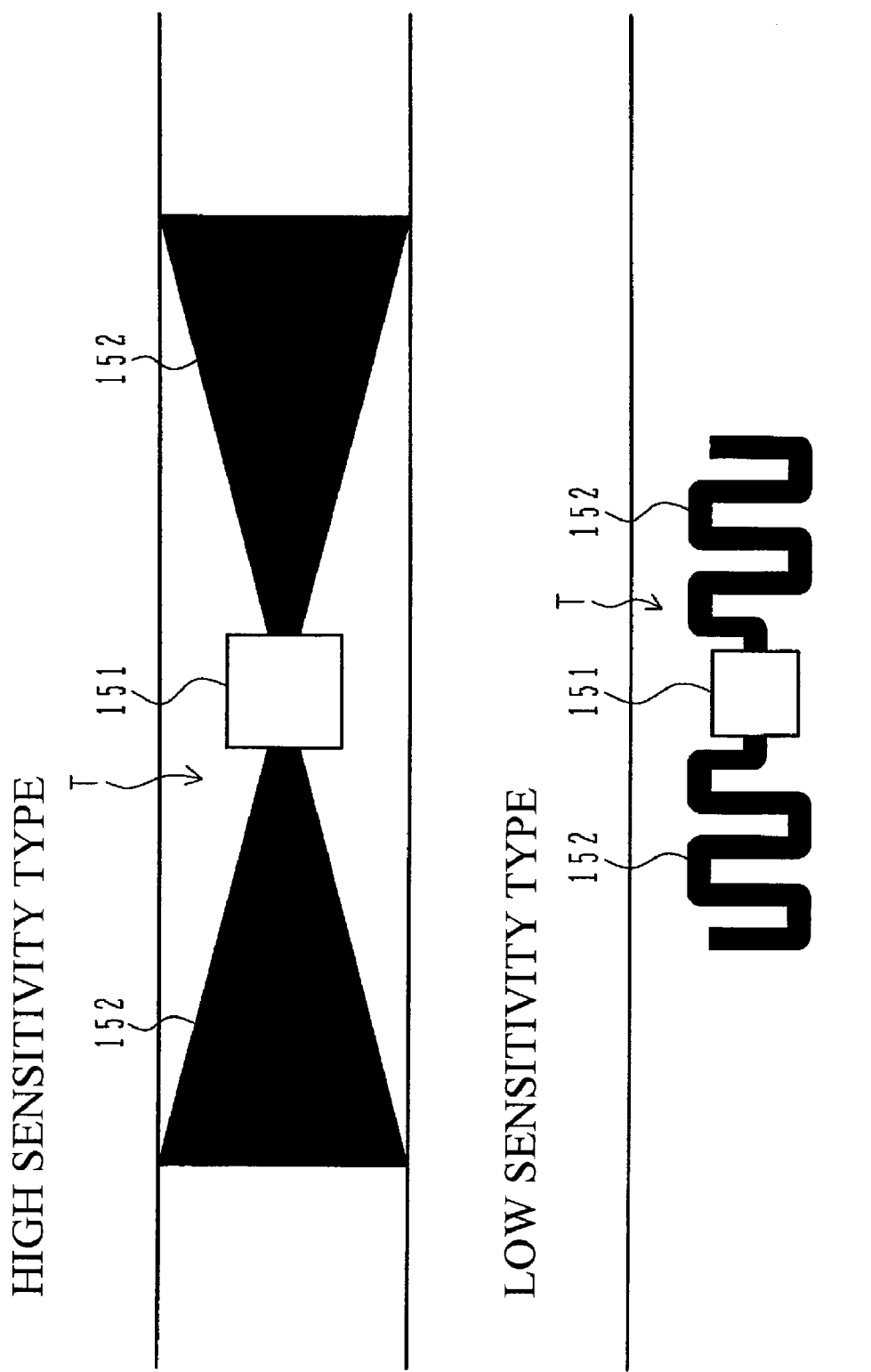
[FIG. 8]

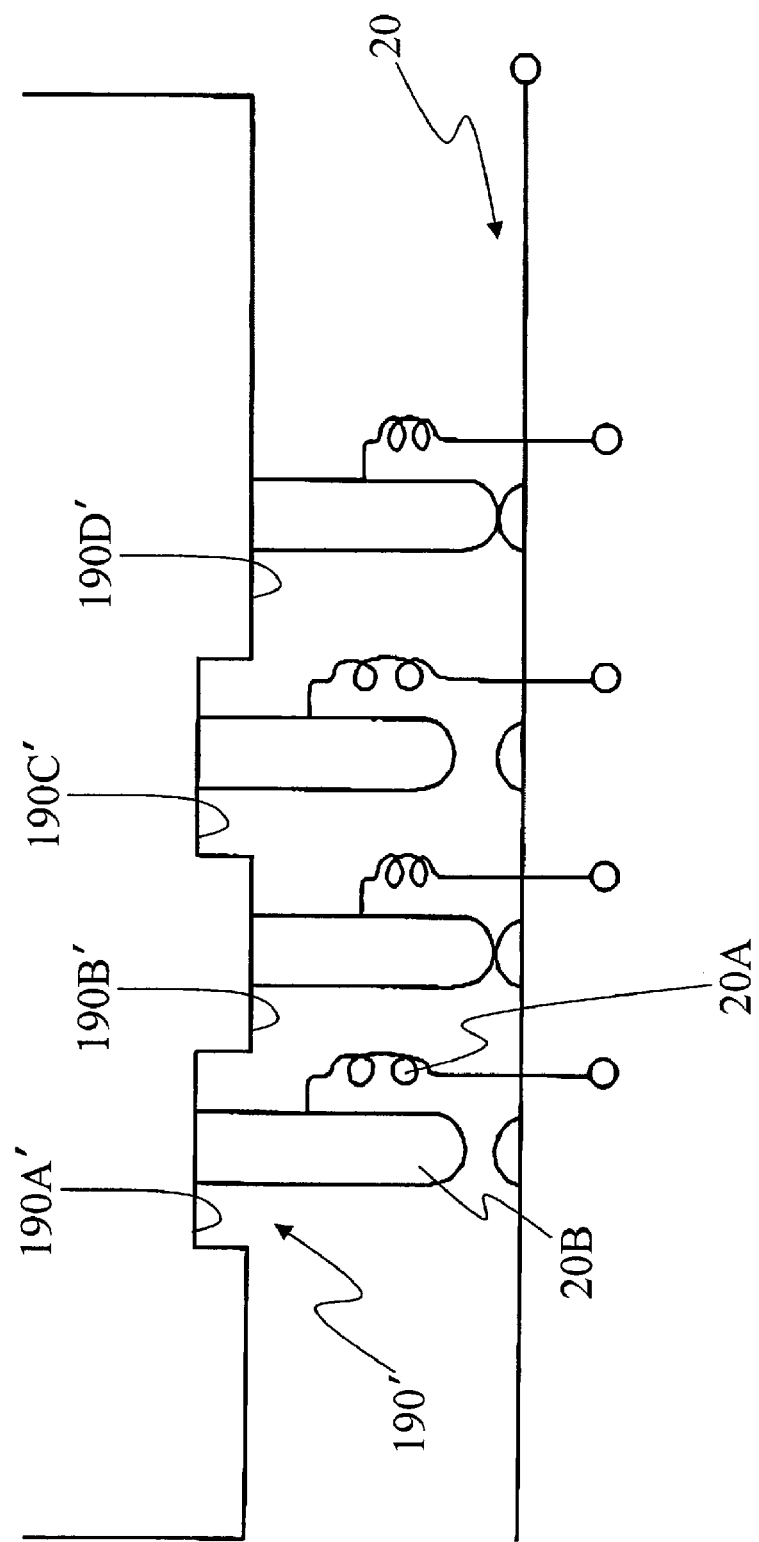
[FIG.9]

[FIG.10]
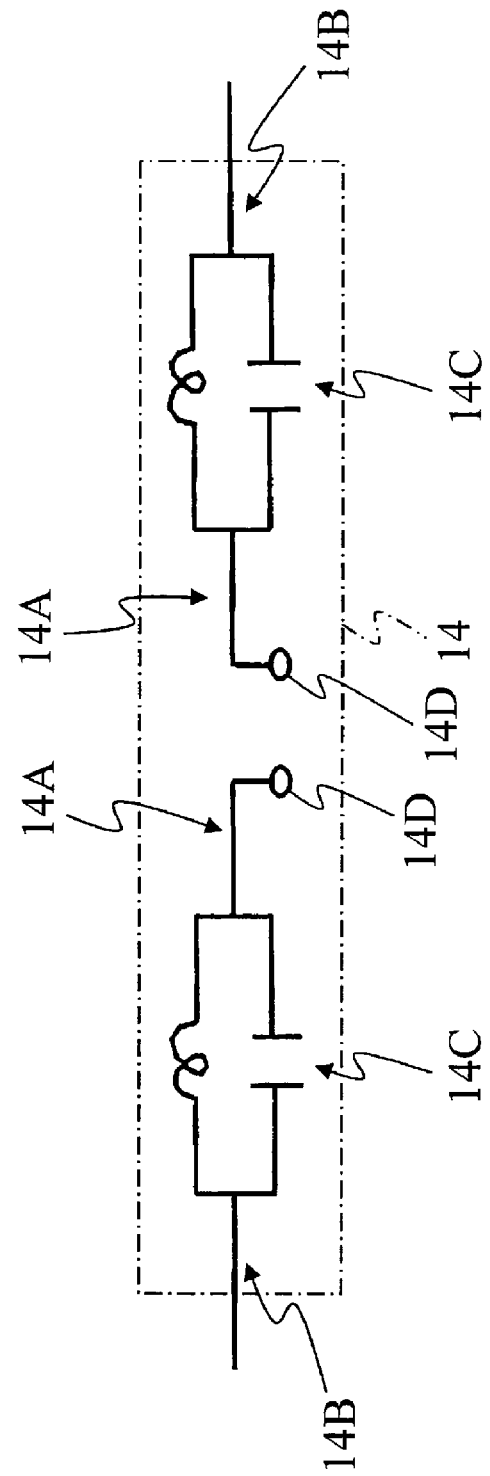

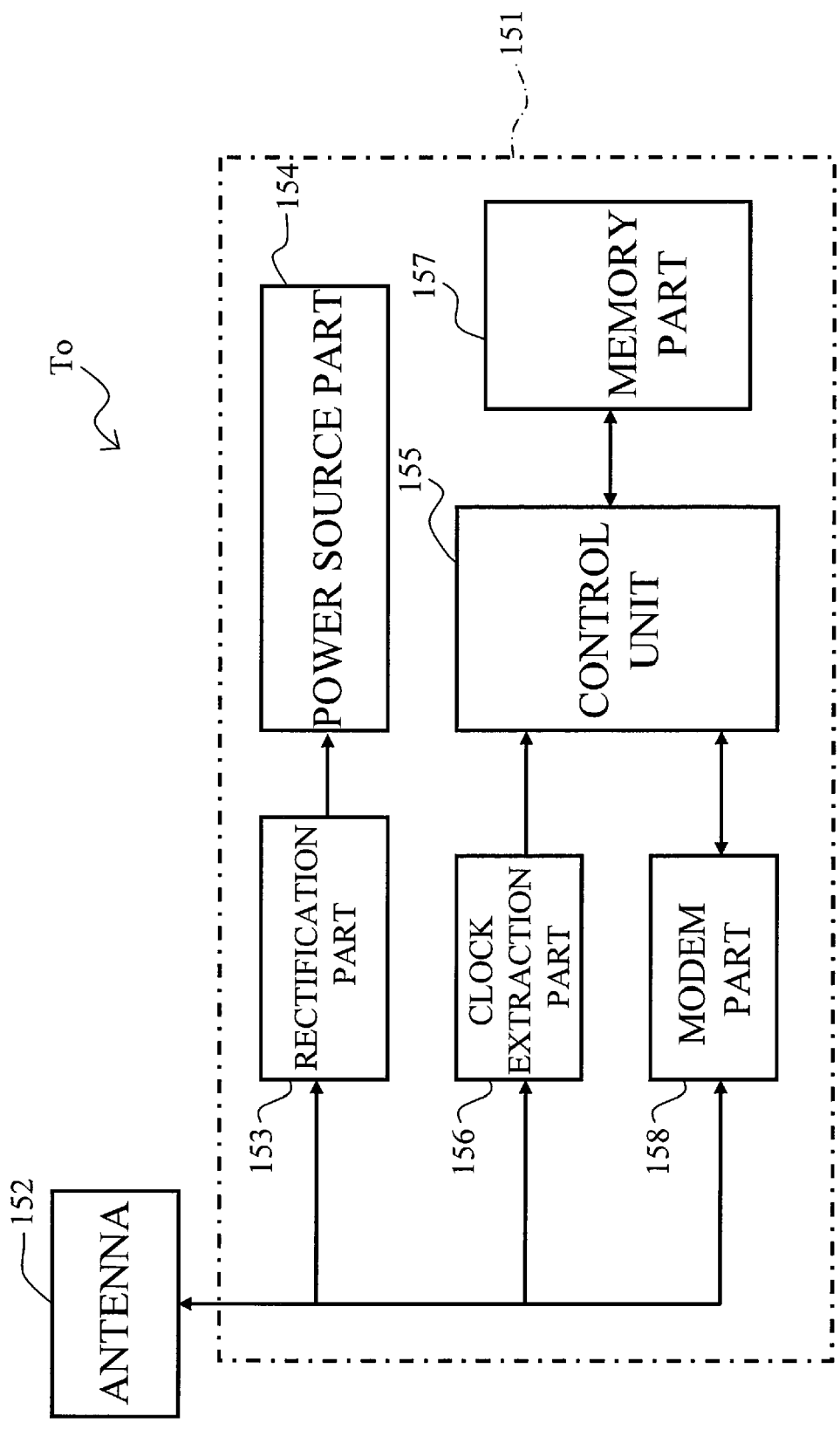
[FIG.11]

[FIG.12A] 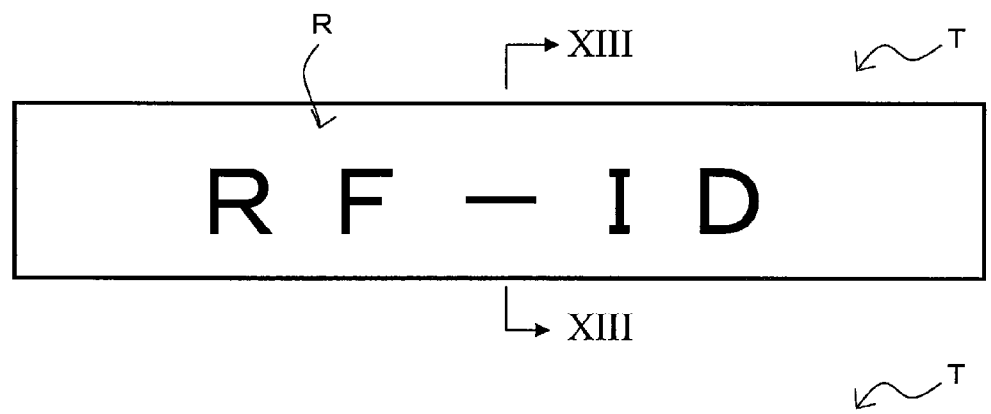
[FIG.12B] 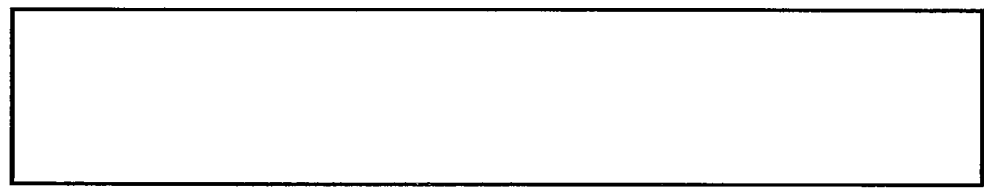

[FIG.13]
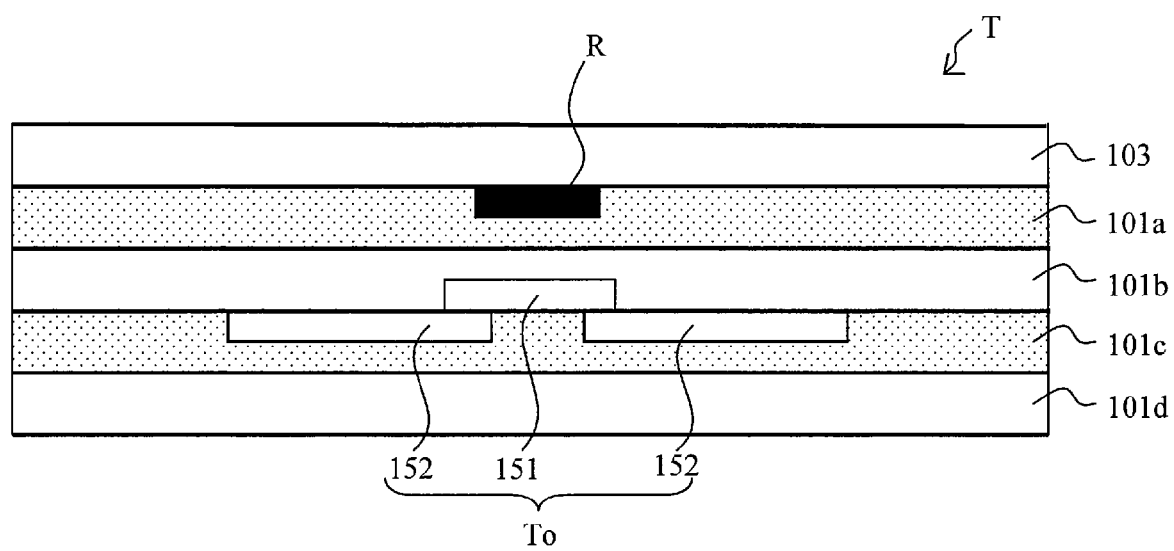

[FIG.14]

| PRINTED CHARACTER | R F – I D |
| --- | --- |
| ACCESS ID | 16,777,215 |
| COMMERCIAL GOODS INFORMATION | 131,071 |
| SERVER INFORMATION | 2,097,151 |

[FIG.15]
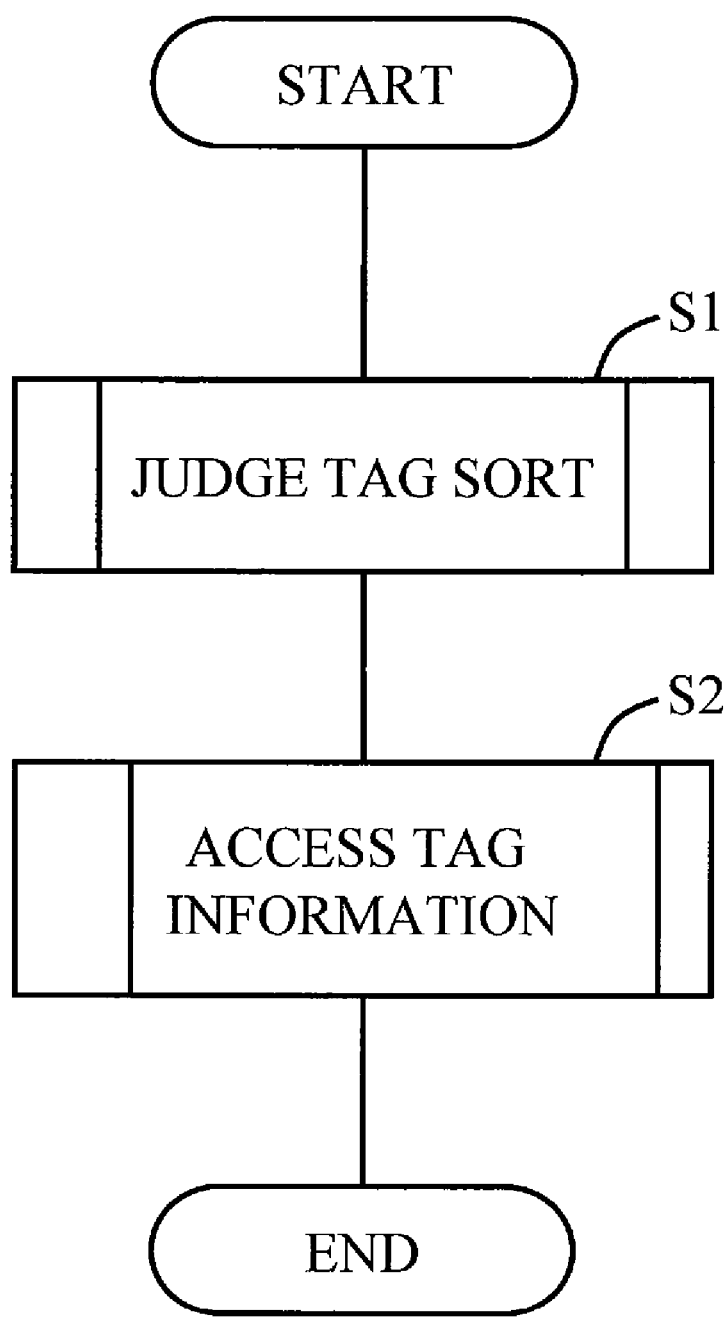

[FIG.16]
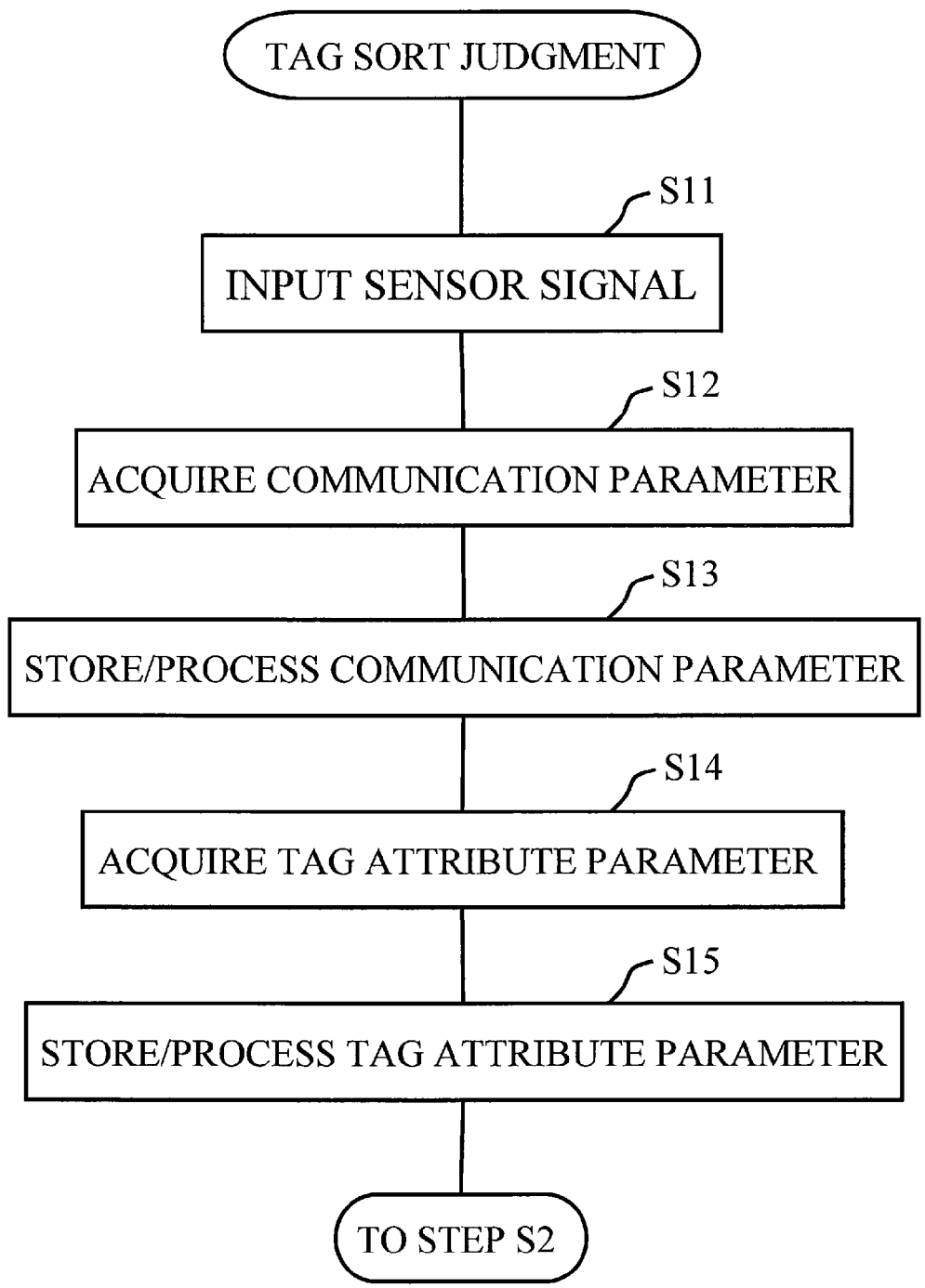

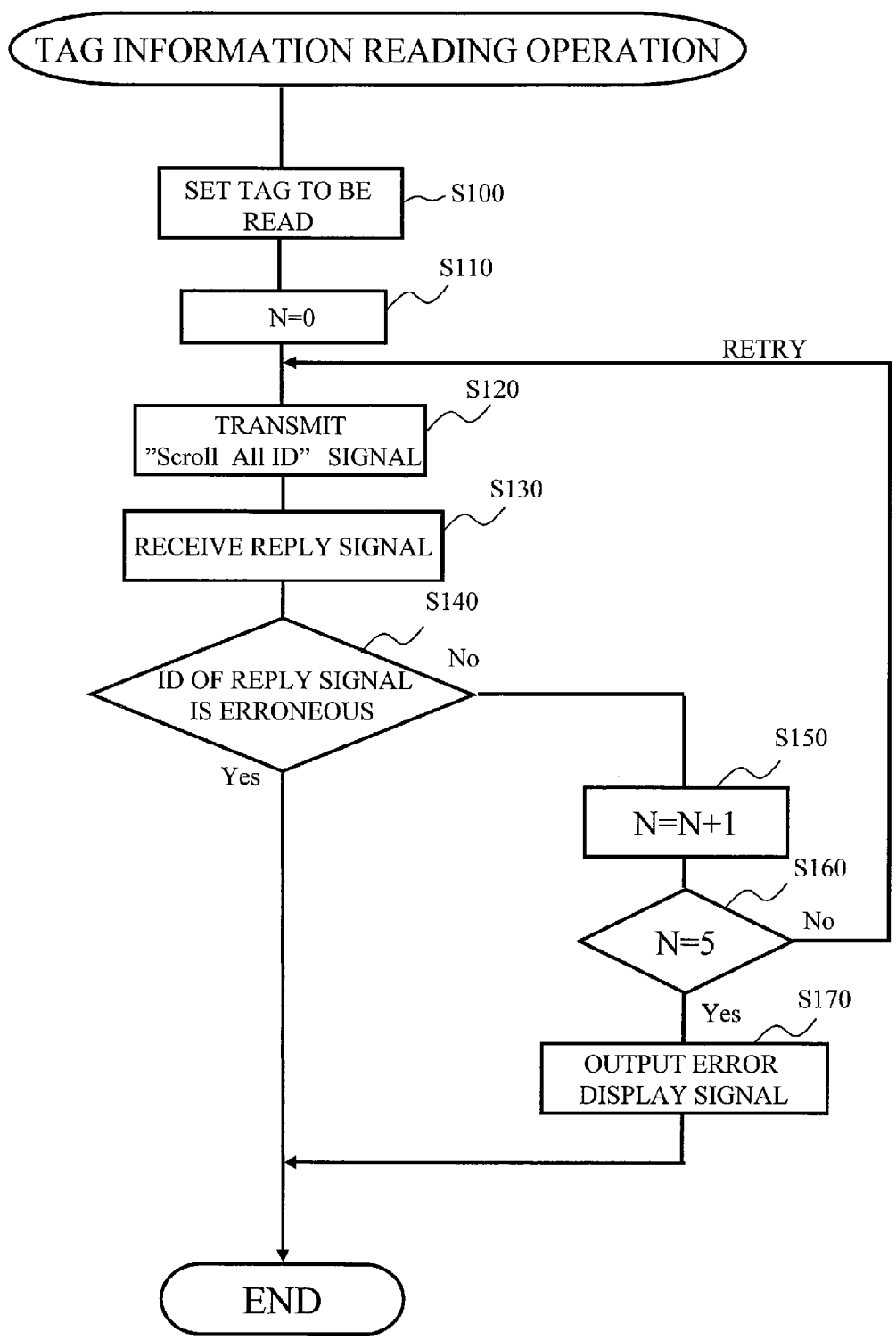
[FIG.17]

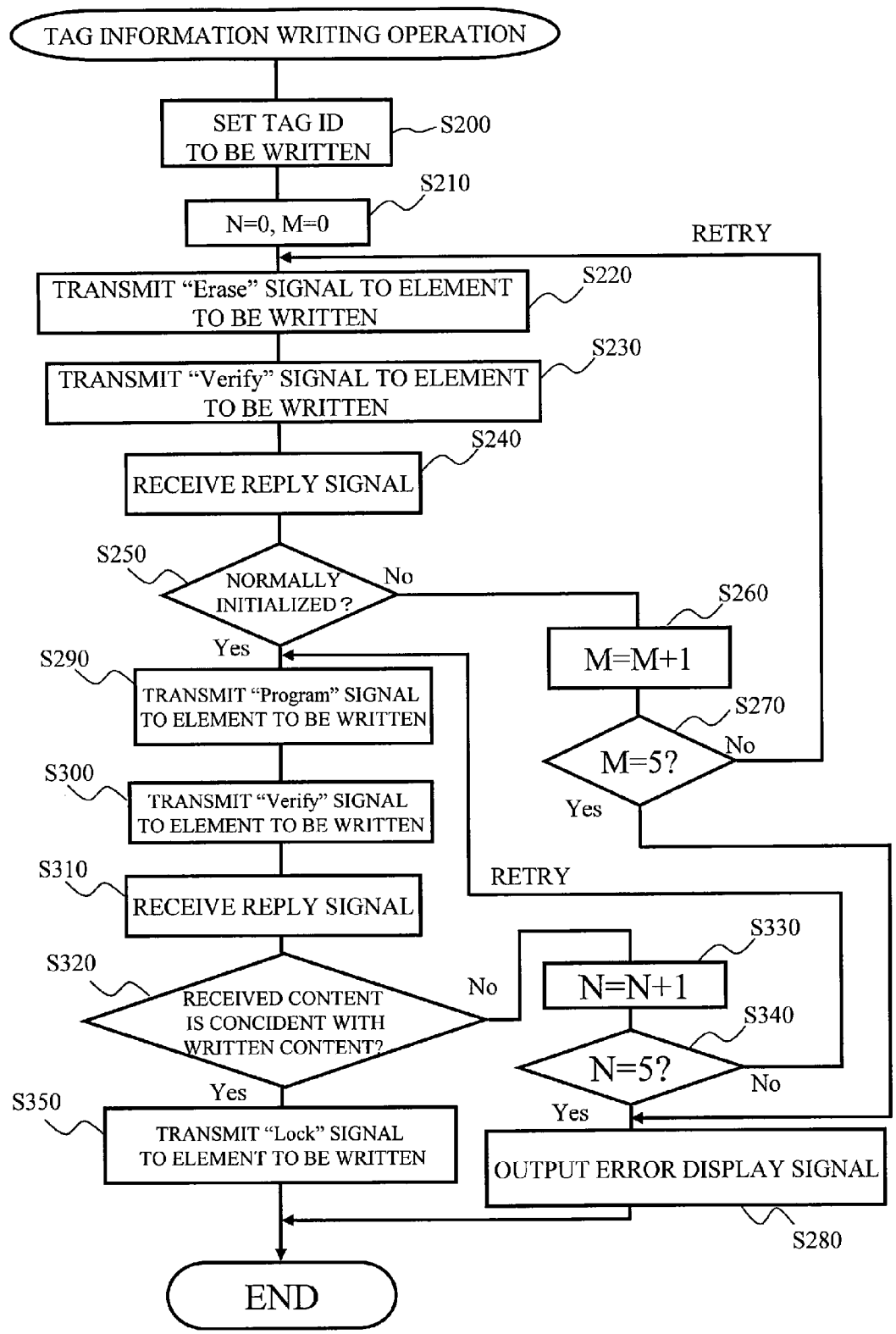
[FIG.18]

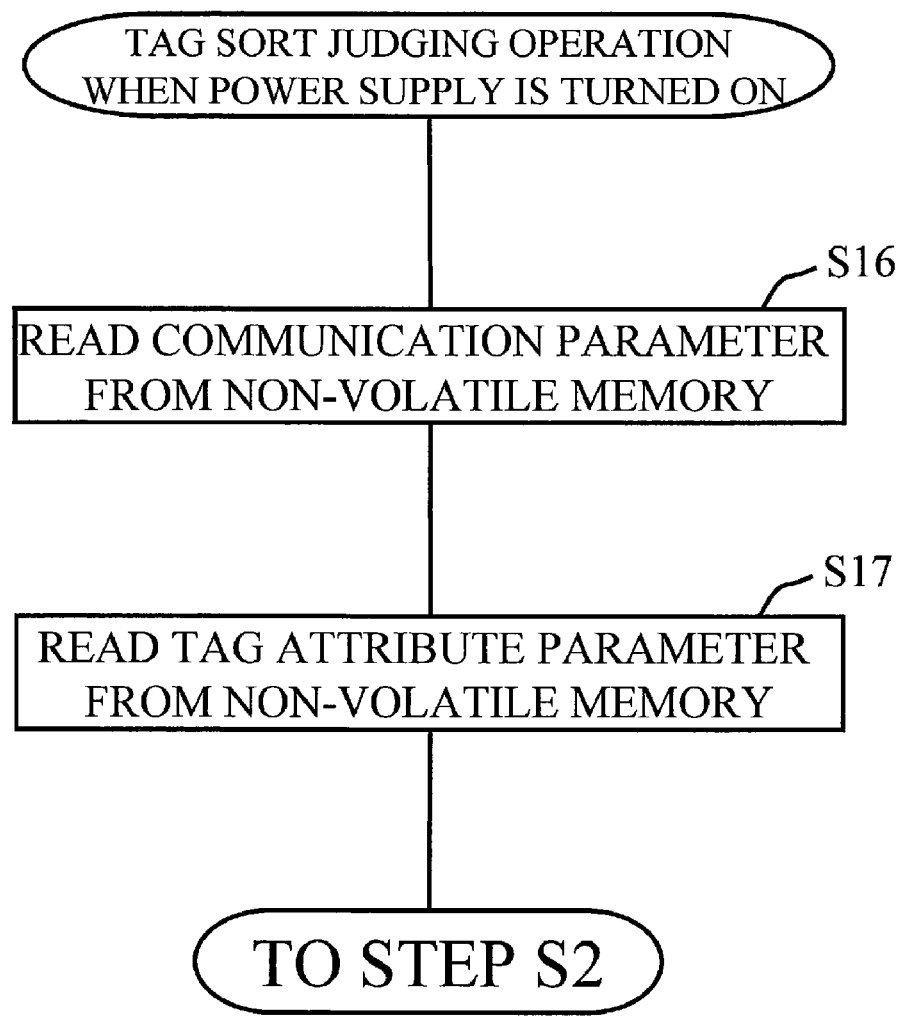
[FIG.19]

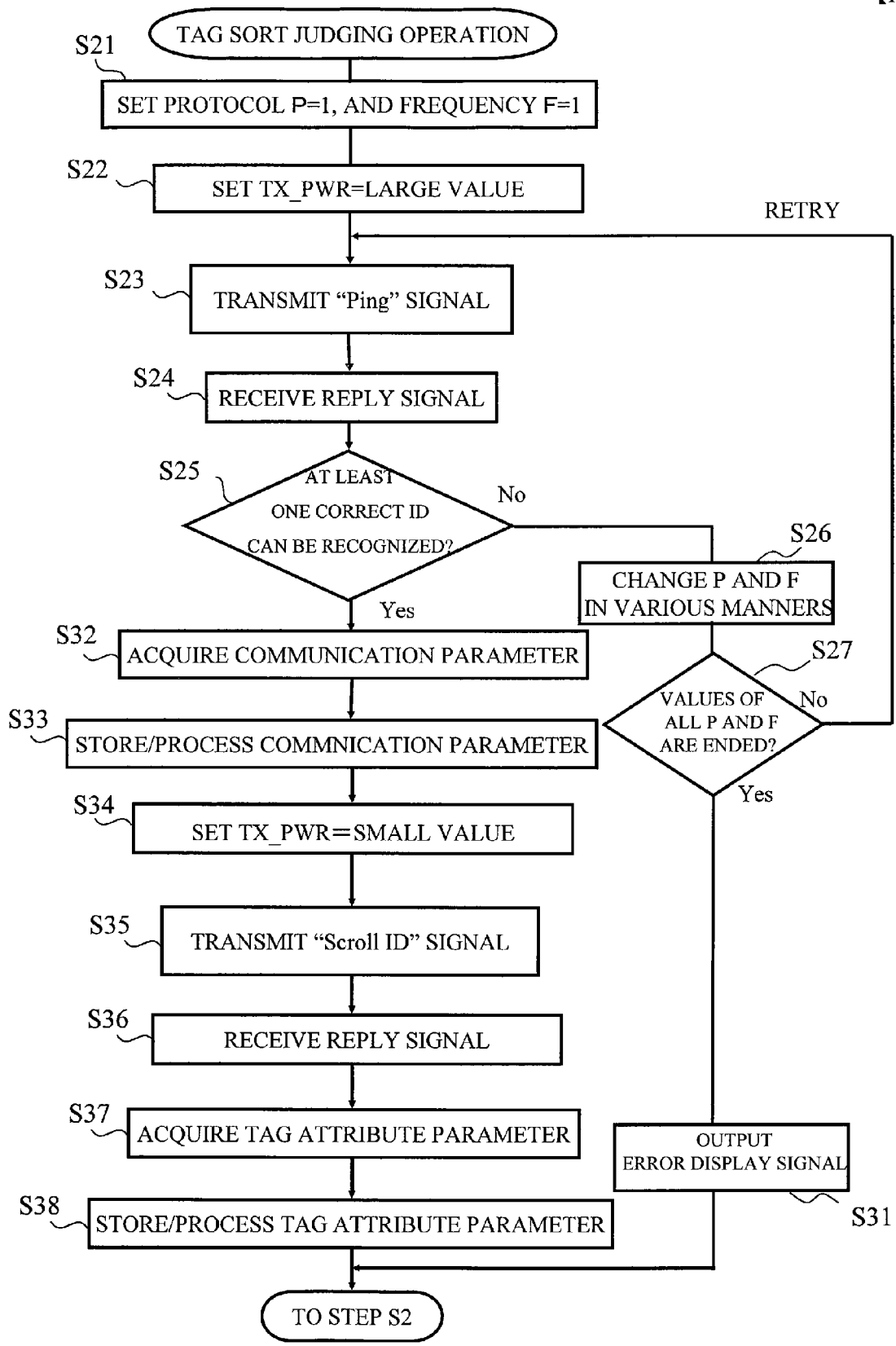

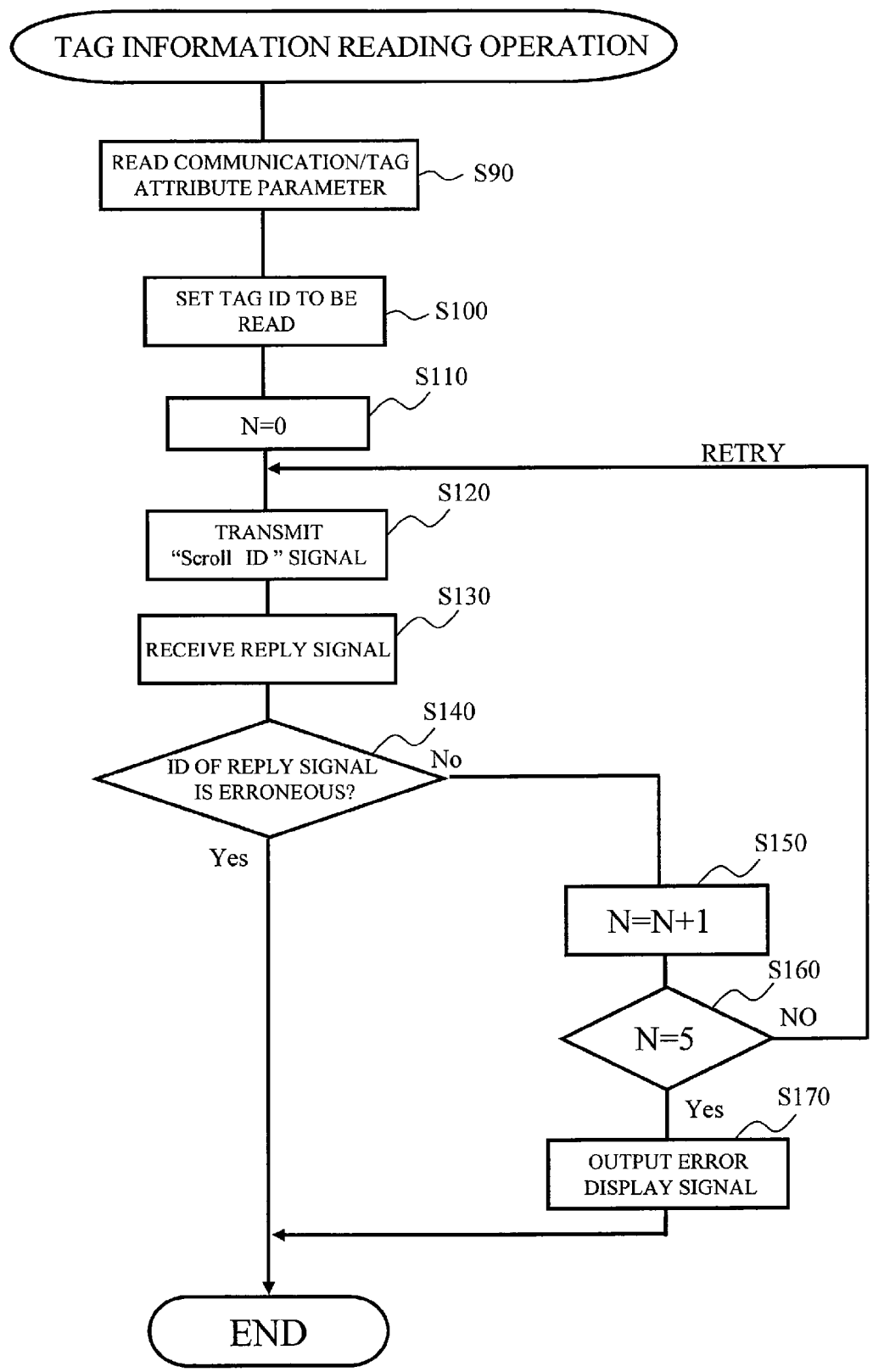
[FIG.21]

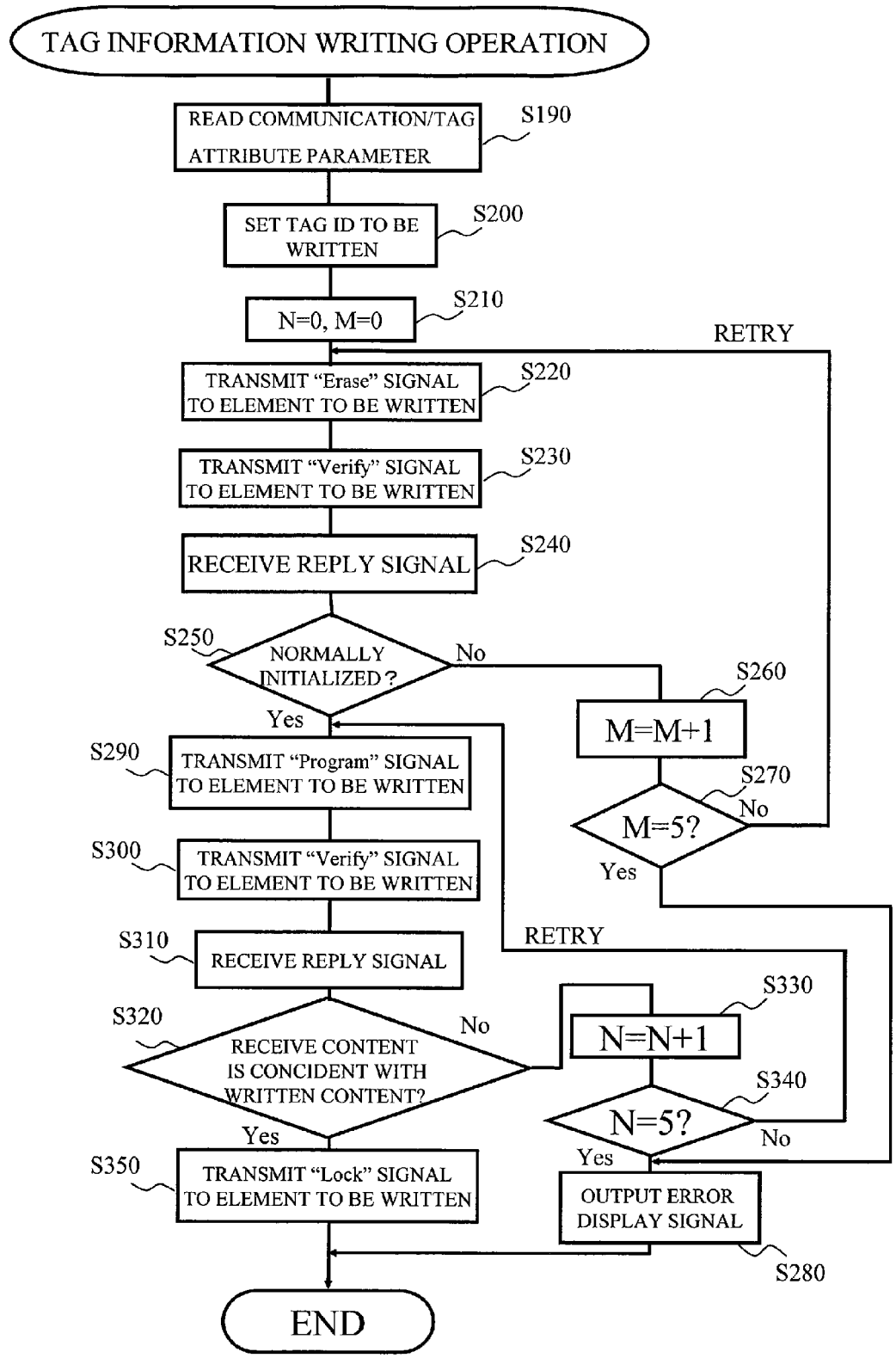

[FIG.23]
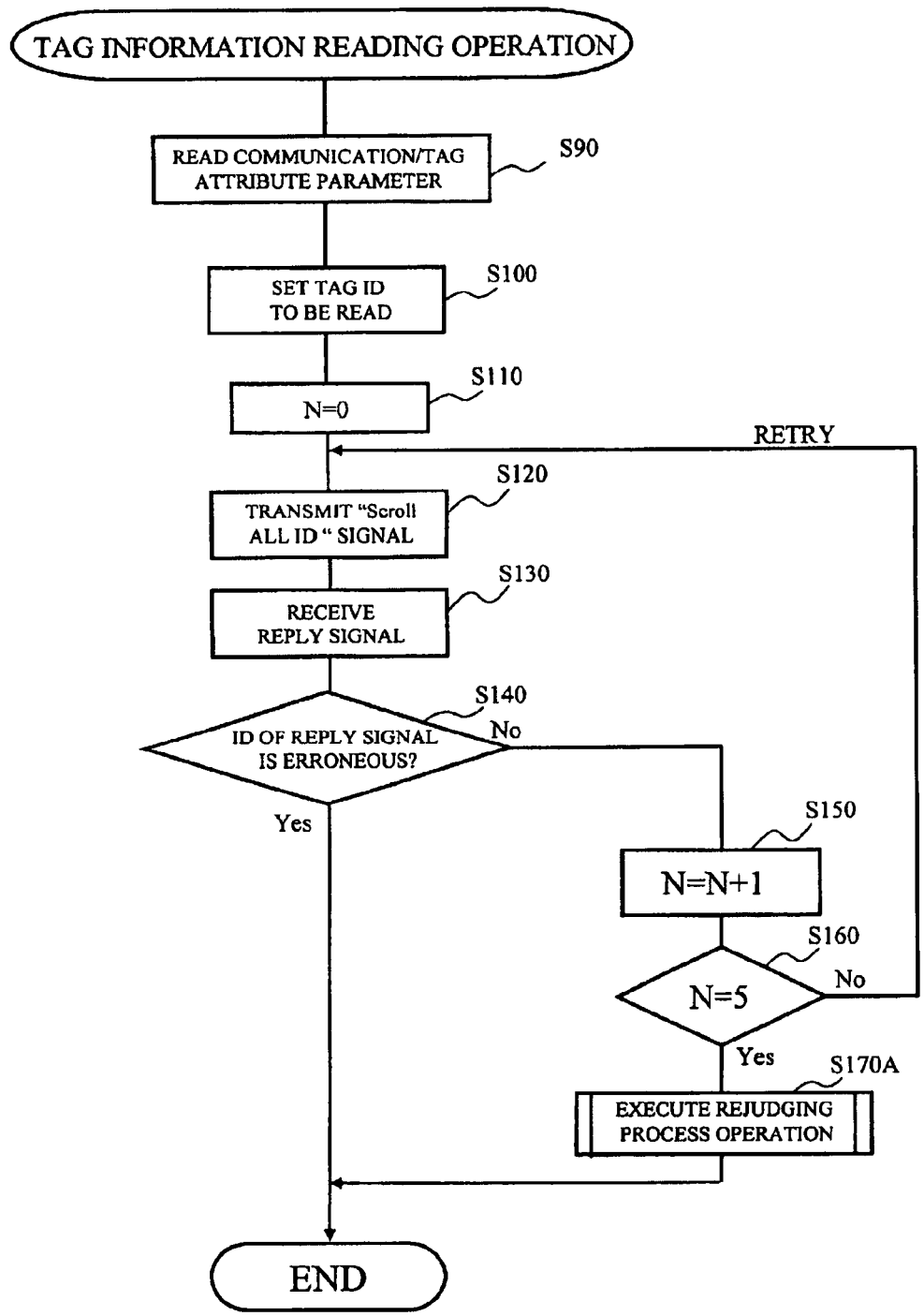

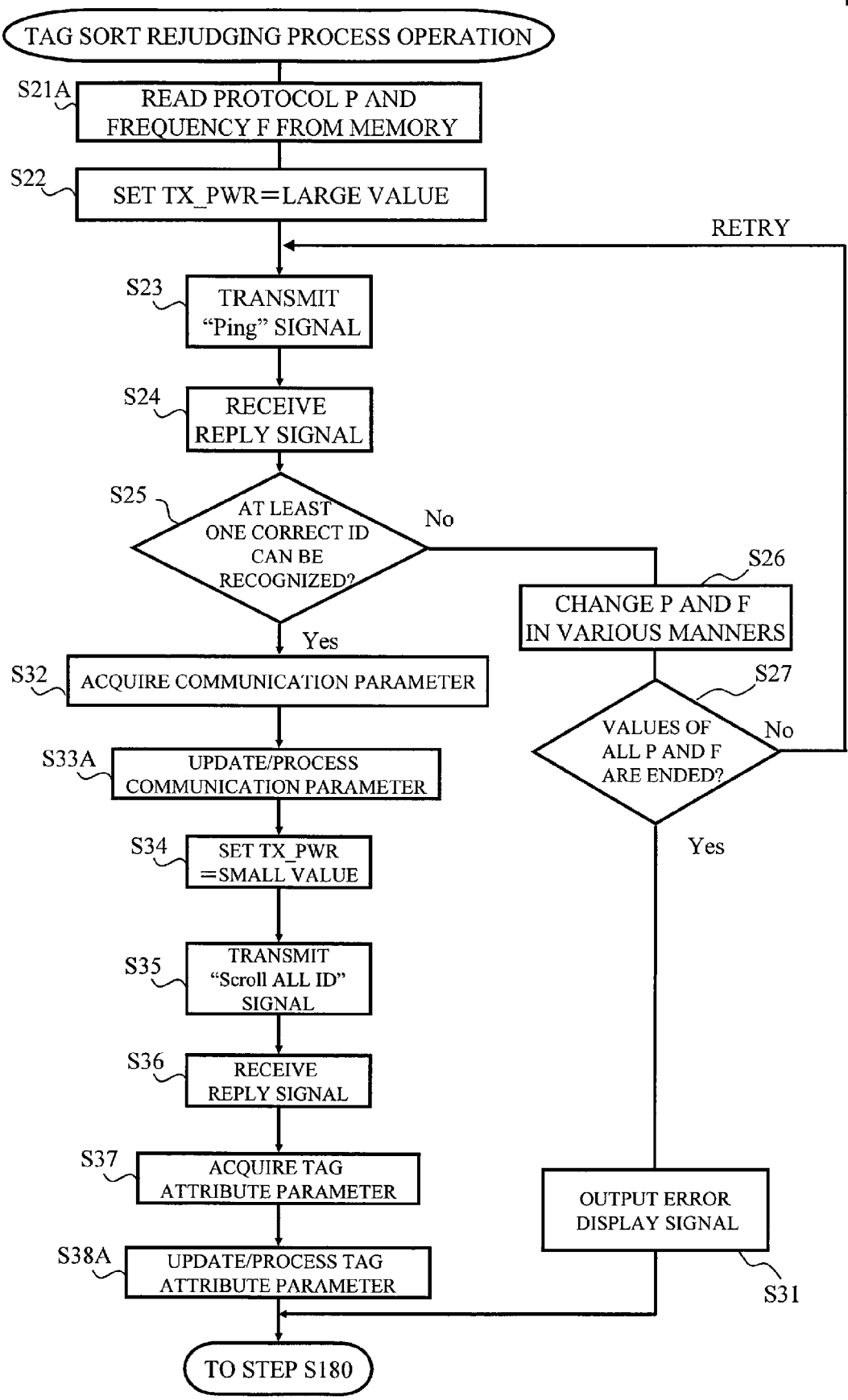
[FIG.24]

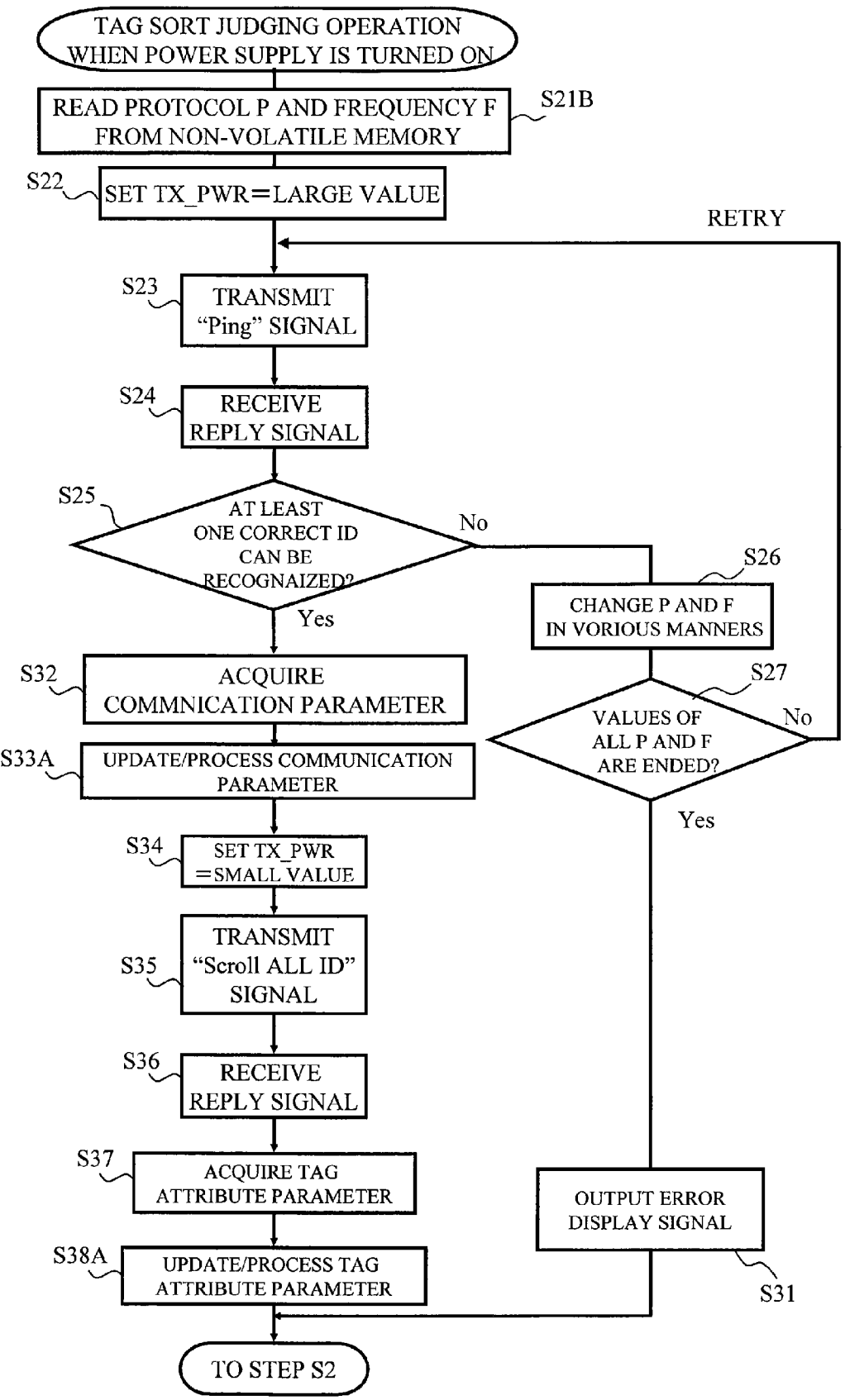
[FIG.25]

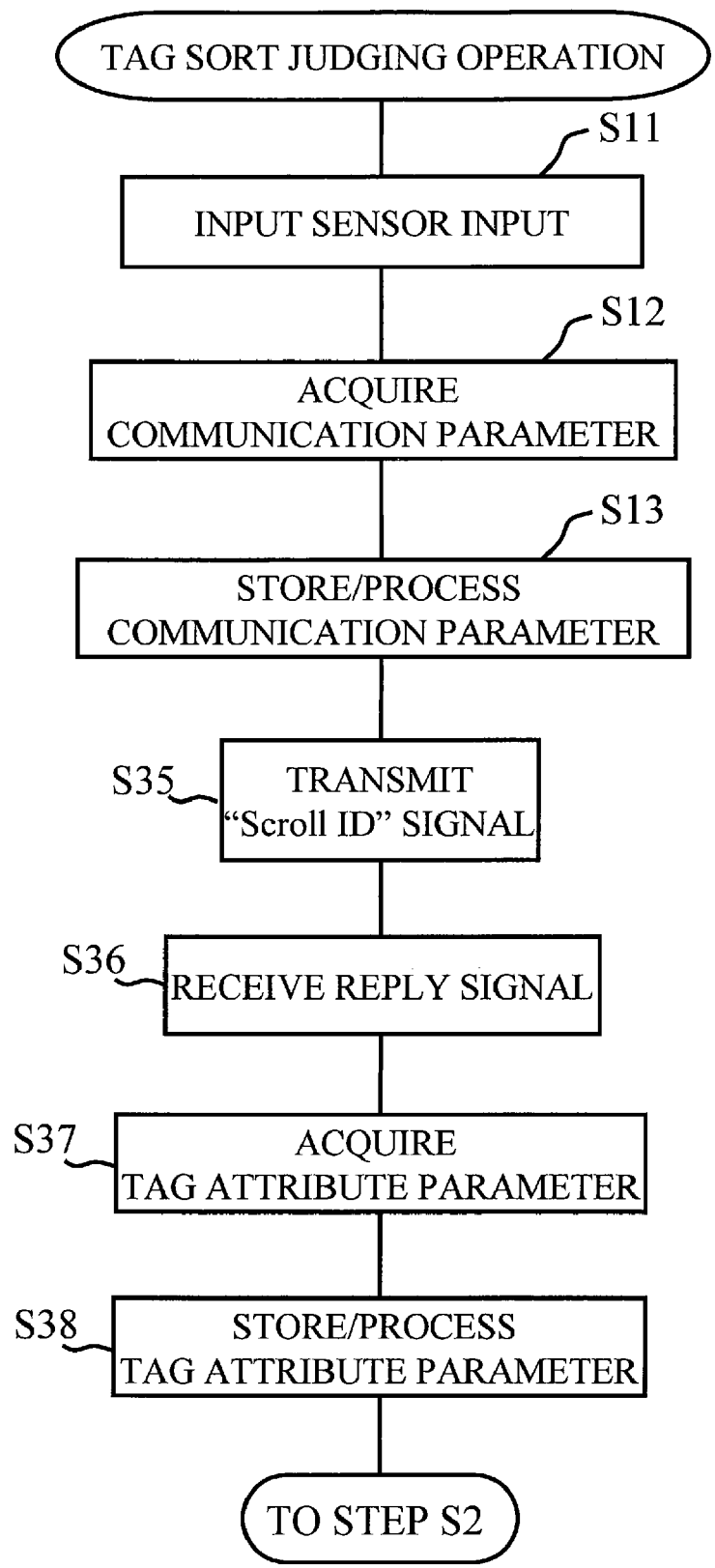
[FIG.26]

[FIG.27]
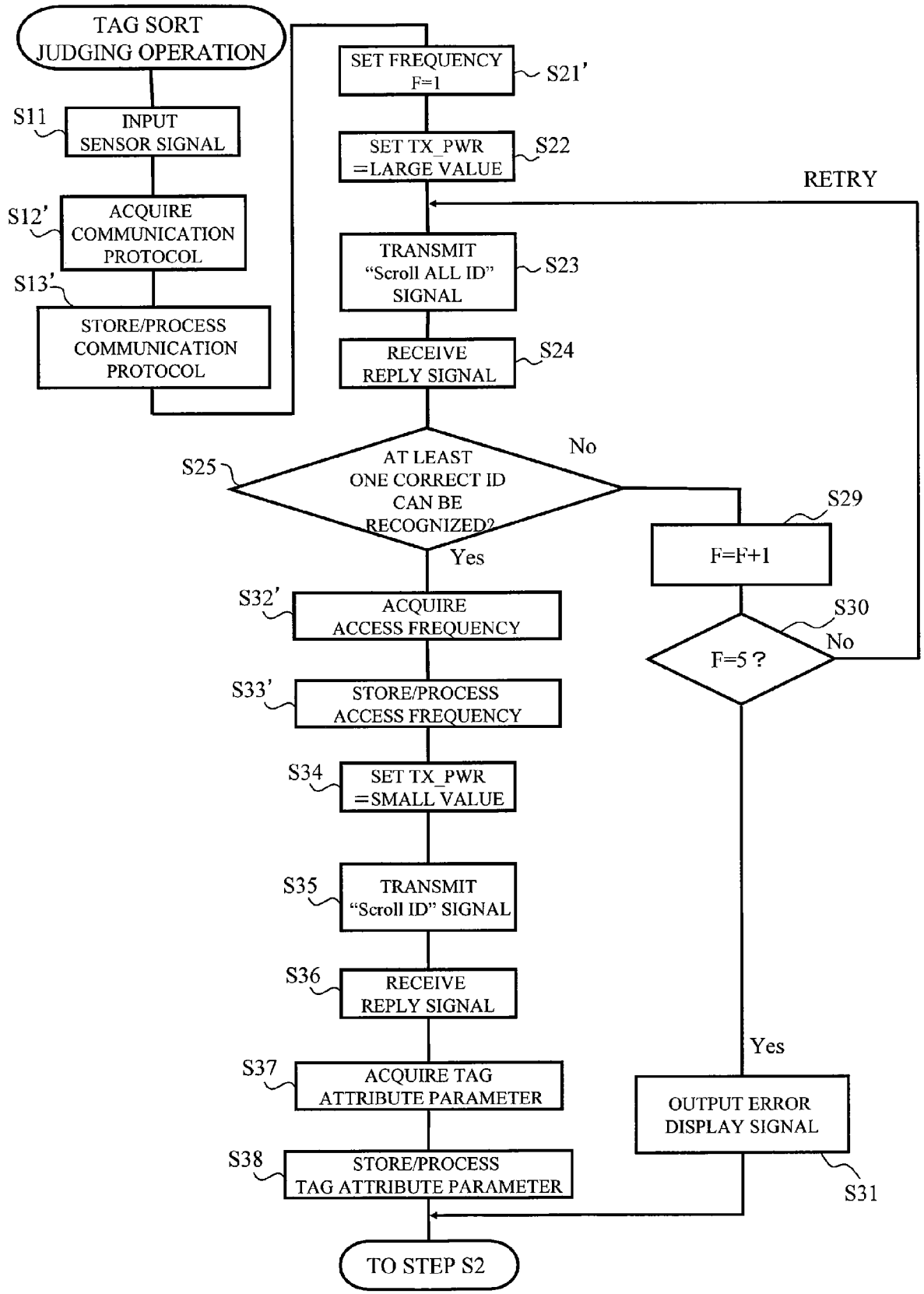

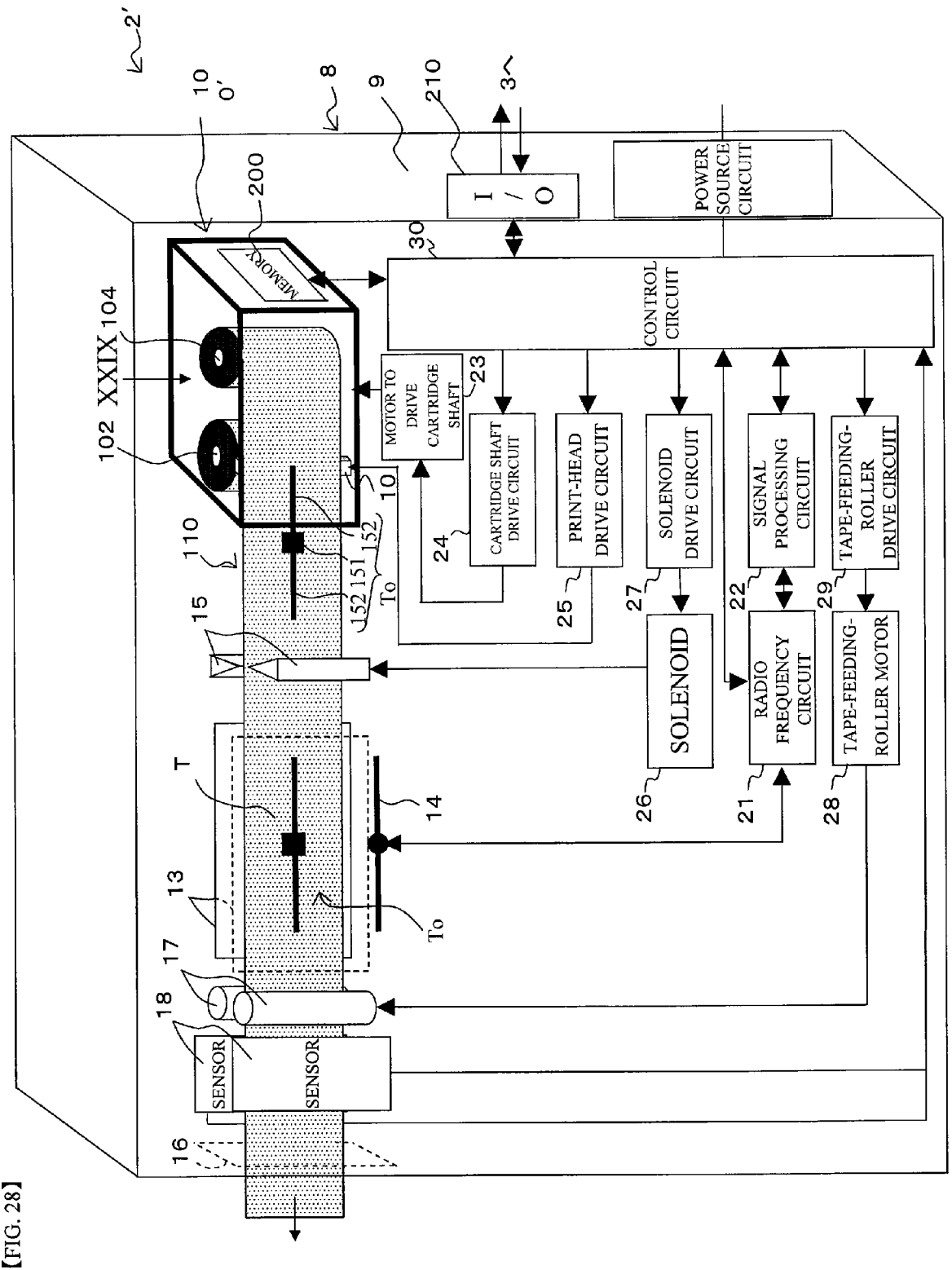
[FIG. 28]

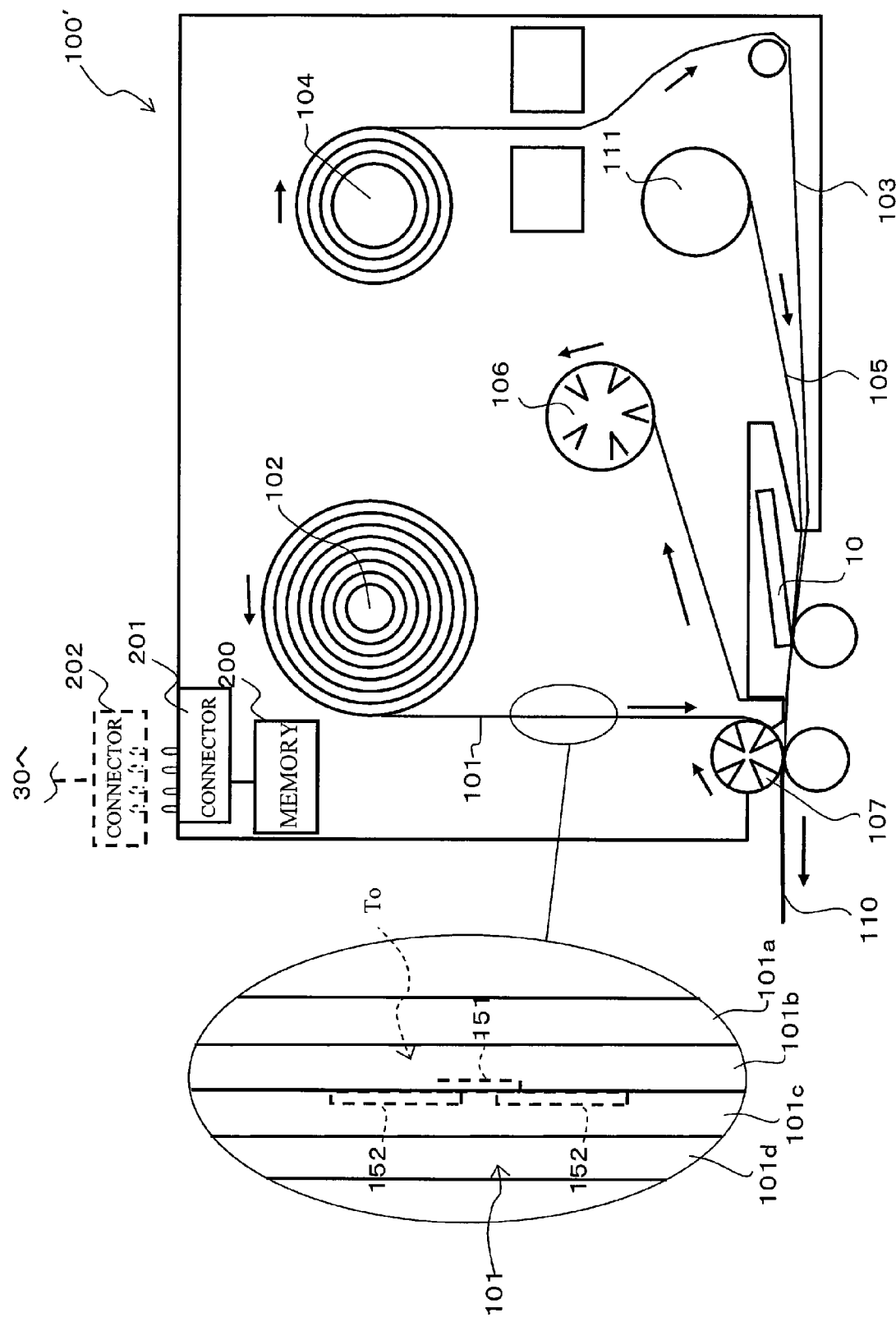
[FIG.29]

[FIG.30]

| | |
|---|---|
| B1_TAG | SORT OF RFID CIRCUIT ELEMENT |
| 2003_08_01 | MANUFACTURING DATE |
| SIR | SERIAL TYPE IDENTIFIER |
| 0100FF000001 | NUMBER OF RFID CIRCUIT ELEMENT WHICH IS FIRSTLY ROLLED OUT |
| 0100FF00007F | NUMBER OF RFID CIRCUIT ELEMENT WHICH IS FINALLY ROLLED OUT |
| 0100FF000037 | RFID CIRCUIT ELEMENT NUMBER TO BE ACCESSED |

[FIG.31]

| | |
|---|---|
| B1_TAG | SORT OF RFID CIRCUIT ELEMENT |
| 2003_08_01 | MANUFACTURING DATE |
| RANDAM | RANDOM TYPE IDENTIFIER |
| 0100FF000001 | NUMBER OF RFID CIRCUIT ELEMENT WHICH IS FIRSTLY ROLLED OUT (ADDRESS 1) |
| 0100FF0001C5 | NUMBER OF FRID CIRCUIT ELEMENT WHICH IS SECONDALLY ROLLED OUT (ADDRESS 2) |
| : | |
| : | |
| 0100FF000037 | NUMBER OF RFID CIRCUIT ELEMENT WHICH IS FINALLY ROLLED OUT (FINAL ADDRESS) |
| 14 | TOTAL NUMBER OF PRINTED TAG |

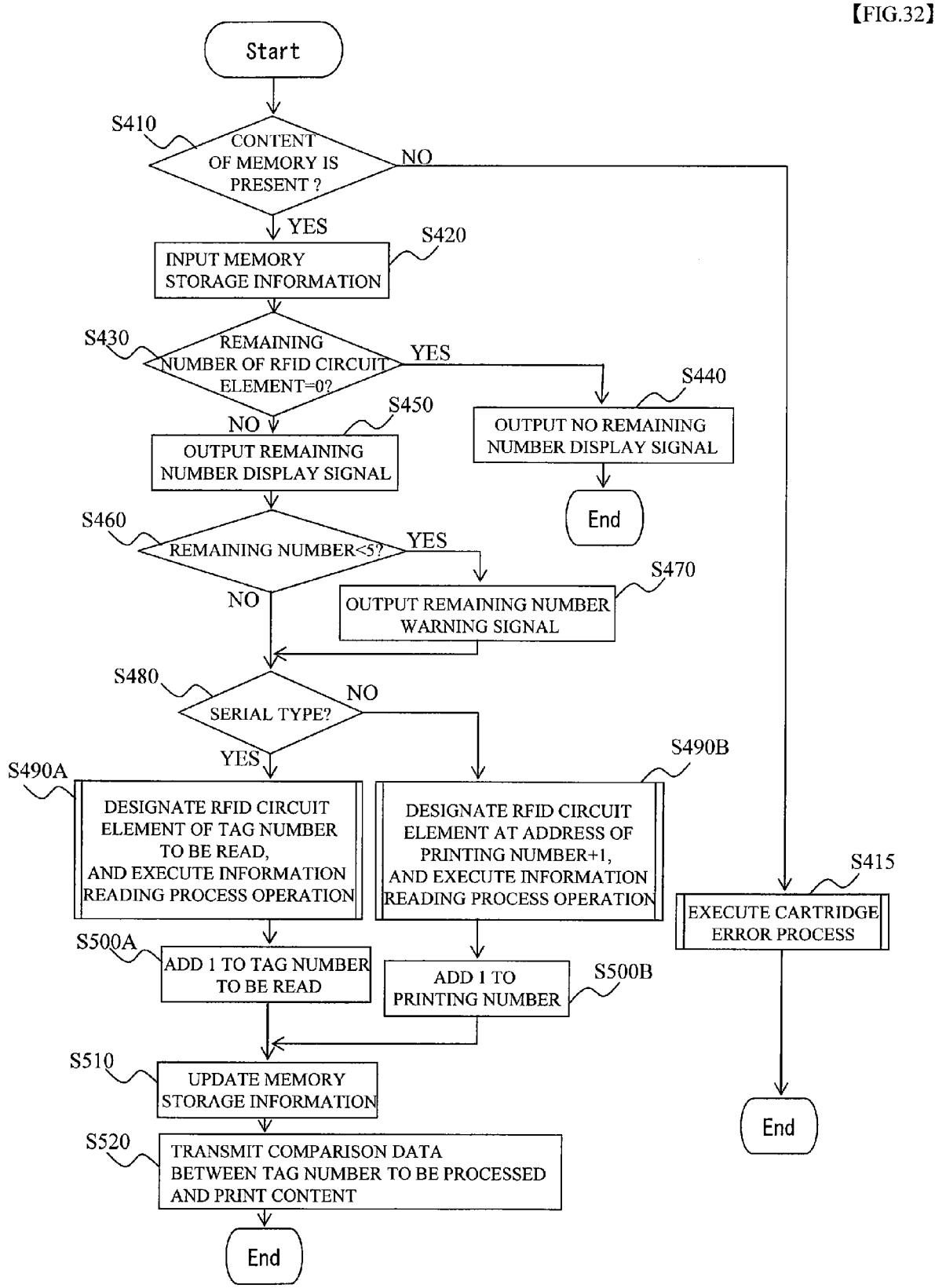
[FIG.32]

[FIG.33]
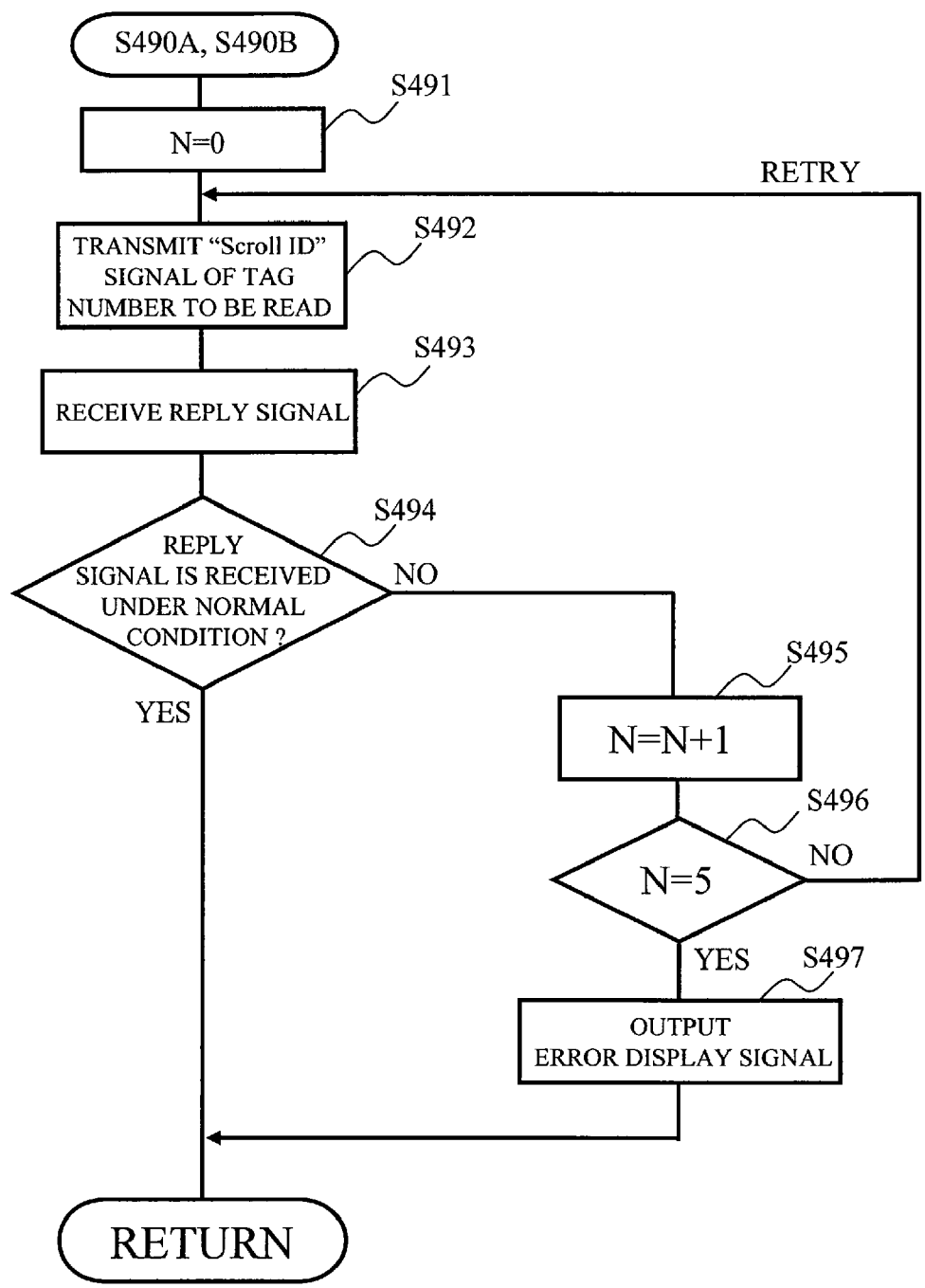

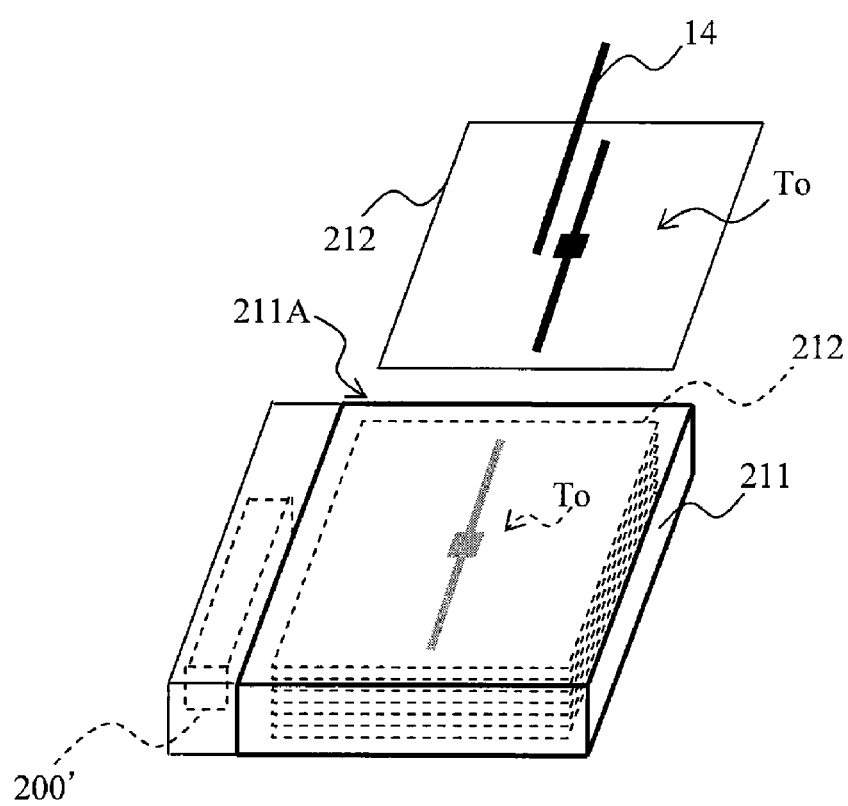
[FIG.34]

[FIG.35]
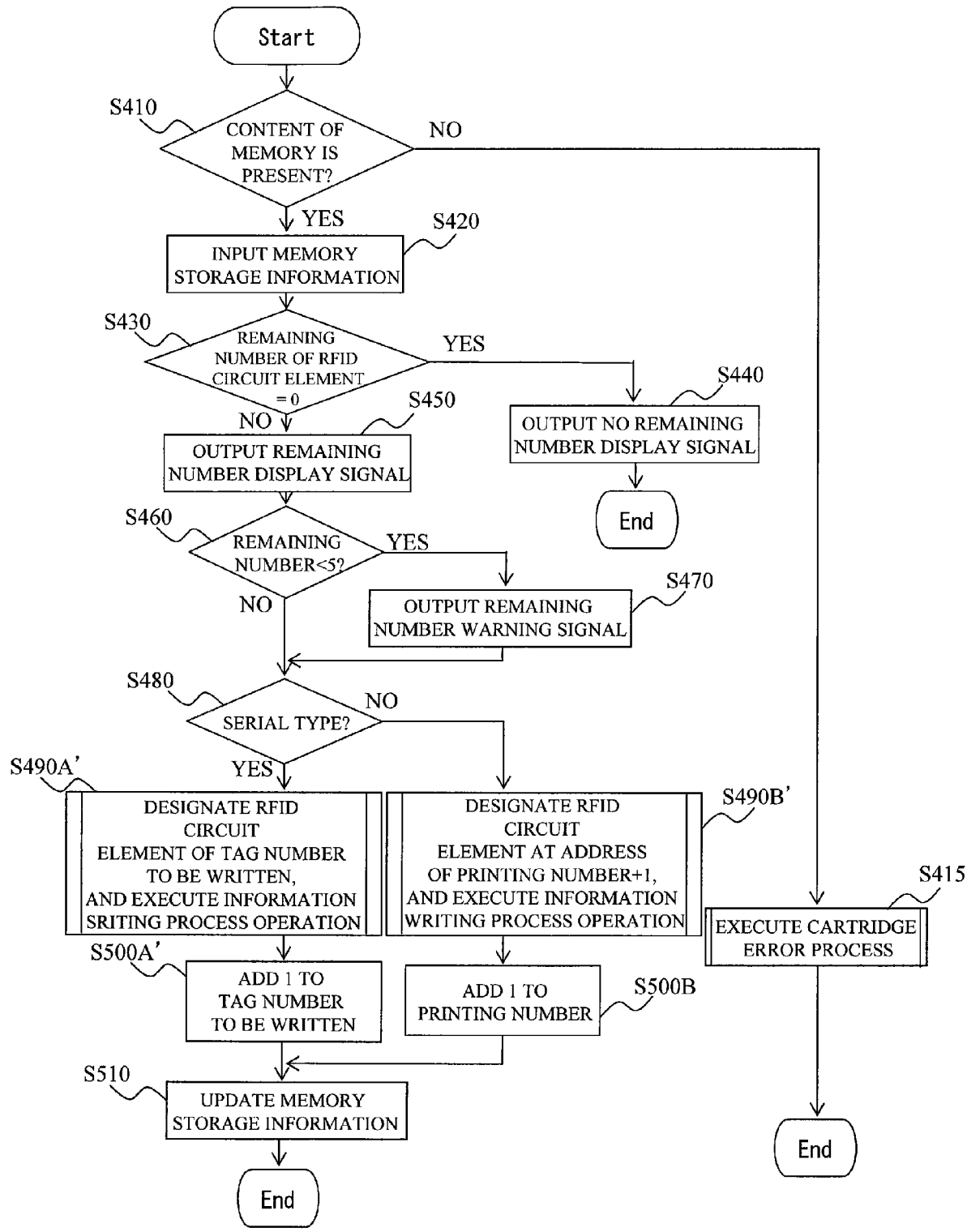

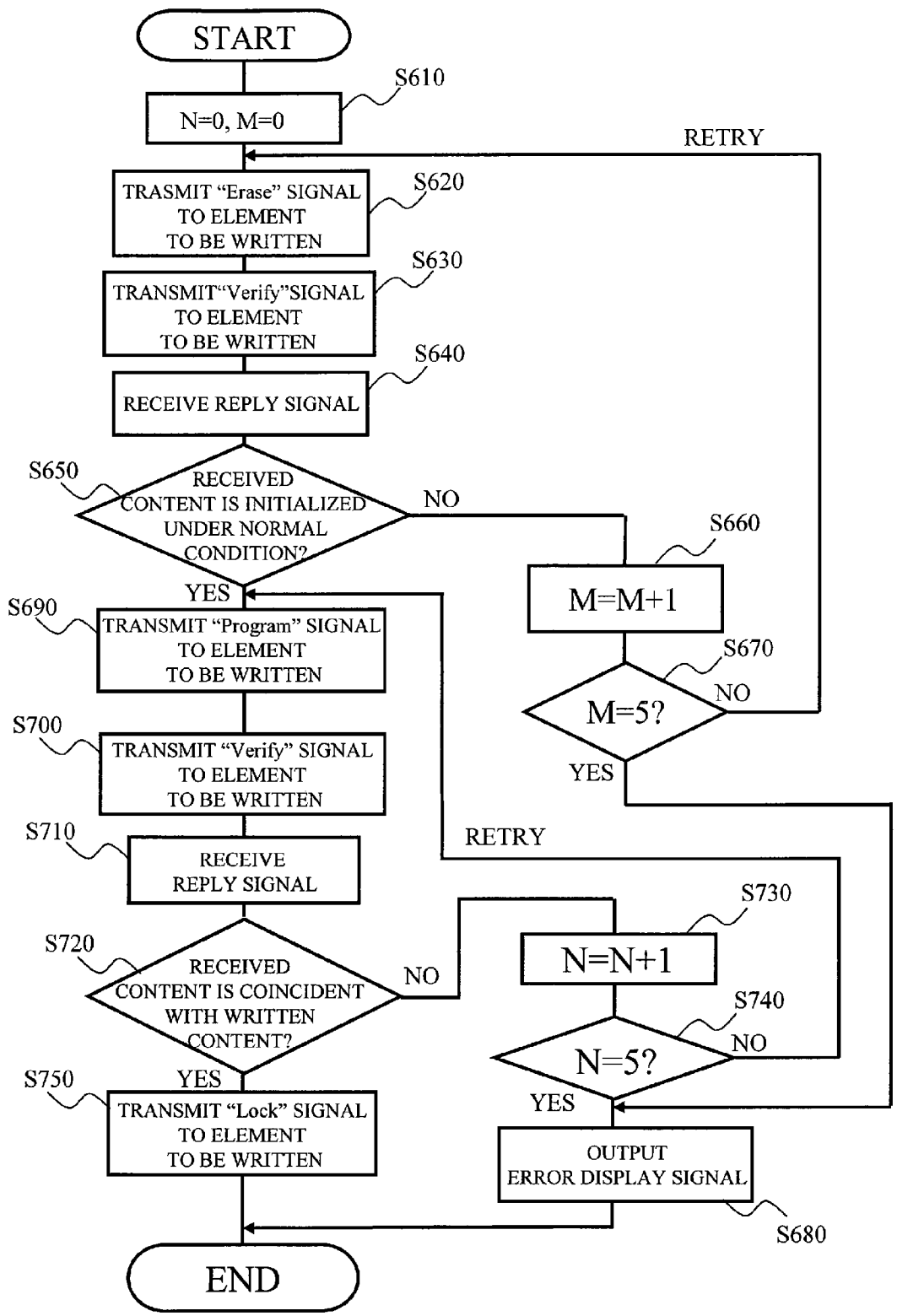
[FIG.36]

RFID TAG INFORMATION COMMUNICATING DEVICE, CARTRIDGE FOR RFID TAG INFORMATION COMMUNICATING DEVICE, AND RFID CIRCUIT ELEMENT PROCESSING SYSTEM

CROSS-REFERENCE TO RELATED APPLICATION

This application is a continuation-in-part of application Ser. No. PCT/JP2004/015024, filed Oct. 12, 2004, which was not published under PCT article 21(2) in English.

BACKGROUND OF THE INVENTION

1. Field of the Invention

The present invention is related to an RFID tag information communicating device, A cartridge for an RFID tag information communicating device, and an RFID tag circuit processing system, which read, or write information with respect to RFID tags capable of radio-communicating information with respect to an external unit.

2. Description of the Related Art

RFID (Radio Frequency Identification) systems for reading/writing information between compact RFID tags and reader (reading device)/writer (writing device) are known in the field.

For instance, an RFID circuit element provided in a label-shaped RFID tag is equipped with an IC circuit part for storing predetermined RFID tag information, and an antenna which is connected to this IC circuit part so as to transmit/receive information. Even in such a case that an RFID tag is soiled, or an RFID tag is arranged at a position which cannot be observed, the reader/writer can access (readable/writable information) with respect to RFID tag information of the IC circuit part, and practical uses of RFID systems can be expected in various fields, for instance, commercial goods management and investigation stages. For example, a non-patent publication 1 describes that various sorts of communication protocols are present with respect to radio communications with this RFID tag.

Also, for example, as a writer (writing device) for writing information with respect to such an RFID circuit element, one writer is known which is described in a patent publication 1. In this conventional technical idea, a belt-shaped paper on which labels having rectangular shapes have been adhered in a predetermined interval is sequentially rolled out from a paper supply unit, and then, is supplied from one side of a housing. Predetermined information produced in a module employed in the housing is sequentially written with respect to the IC circuit part of the RFID circuit element in such a manner that the predetermined information is transmitted via a read/write antenna provided on a transport path of the belt-shaped paper to the RFID tag circuit part adhered to the label. Finally, this belt-shaped paper is carried out from the other side of the housing.

Patent Publication 1: JP,A,2002-2026

Non-Patent Publication 1: Auto-ID Center, TECHNICAL REPROT "860 MHz-930 MHz Class I Radio Frequency Identification Tag Radio Frequency & Logical Communication Interface Specification Candidate Recommendation, Version 1.01" (USA) Nov. 14, 2002, pages 1 to 17.

As previously explained, RFID tags have been considerably and widely utilized in various sorts of fields in very recent year. However, as described in the above-described non-patent publication 1, since a large number of communication protocols are provided, various sorts/modes of communication protocols are practically used by respective RFID tags in correspondence with utilization. As a result, even when an apparatus side tries to be communicated with a certain RFID tag, there are some possibilities that a communication protocol which is suitable for this RFID circuit element is different from another communication protocol of this certain RFID tag which is tried to be communicated by the apparatus side. In such a case, a communicatable condition cannot be quickly and easily established. In addition, as to tag attribute parameters, these tag attribute parameters are similarly different from each other, depending upon sorts of RFID circuit elements. Thus, there are some cases that communicatable conditions cannot be quickly and readily established. These tag attribute parameters cover either frequencies or sensitivities of antennas of RFID circuit elements, which correspond to communication parameters similar to the above-explained communication protocols; memory capacities of IC circuit parts; and widths of tapes on which elements are adhered; and furthermore, arranging intervals of elements on these tapes.

On the other hand, in communication operations with RFID tags, the 125 KHz frequency band, the 13.56 MHz frequency band, and the like have been conventionally employed as frequency bands of these communication operations. The 125 KHz band has been utilized from old times, whereas the 13.56 MHz band has been actively employed in practical fields. However, since communication distances become short in RFID tags which employ these frequency bands, there is such a difficulty that utilization fields as RFID tags are restricted. Under such a circumstance, utilization of radio frequencies in the UHF frequency band and the like (830 to 930 MHz band, 2.45 GHz band etc.) may be conceived, while these UHF frequency band and the like have been widely used in Europe as frequency bands. The technical idea described in the above-explained patent publication 1 does not specifically consider such a specific case that these radio frequency bands are utilized. As a result, if this technical idea is directly applied to the utilization in the radio frequency bands, then communication distances become long. Accordingly, there are some possibilities that information may be written not only in an RFID circuit element which originally constitutes an information writing subject, but also in another IC circuit part of the subsequent RFID circuit element. Also, when information is read out from an RFID circuit element, similar to the above operation, if this technical idea is directly applied to the utilization in the radio frequency bands, then communication distances become long. Accordingly, there are some possibilities that information may be read not only from an RFID circuit element which originally constitutes an information reading subject, but also from another IC circuit part of the subsequent RFID circuit element.

SUMMARY OF THE INVENTION

As previously explained, in any of these conventional techniques, it is difficult that smooth access (writing, or reading) operations with respect to RFID circuit elements functioning as communication subjects can be secured.

A first object of the present invention is to provide an RFID tag information communicating device, an RFID tag information device-purpose cartridge, and an RFID circuit element processing system, which are capable of securing smooth accessing operations with respect to an RFID circuit element functioning as a communication subject.

A second object of the present invention is to provide an RFID tag information communicating device capable of securing a smooth accessing operation with respect to an RFID circuit element functioning as a communication subject, since a communicatable condition is quickly and readily established irrespective of a sort of an RFID circuit element which should be communicated.

A third object of the present invention is to provide an RFID tag information communicating device, an RFID tag information device-purpose cartridge, and an RFID circuit element processing system, which are capable of securing smooth accessing operations with respect to an RFID circuit element functioning as a communication subject, since it is avoided that information is read, or written with respect to another RFID circuit element which does not constitute a readable subject, or a writable subject even in such a case that radio frequencies such as the UHF frequency band is employed.

Means for Solving the Problem

To achieve the above-explained first object, an RFID tag information communicating device, according to first invention, is featured by comprising: a housing; a cartridge holder provided on the housing, for detachably mounting thereon a cartridge, the cartridge being equipped with a plurality of RFID circuit elements each having an IC circuit part for storing predetermined information and a tag antenna connected to the IC circuit part, for transmitting/receiving information, and the cartridge holding information related to the RFID circuit elements; a device antenna for transmitting/receiving in a radio communication between the own antenna and the tag antenna of a specific RFID circuit element among the plurality of RFID circuit elements; access information producing means for producing access information used to access RFID tag information of the IC circuit part; and information transmitting means for transmitting the access information produced by the access information means via the device antenna to the tag antenna in a non-contact manner so as to access the RFID tag information of the IC circuit part.

The access information produced by the access information producing means is transmitted via the device antenna to the tag antenna of the RFID circuit element by the information transmitting means, and further, the access (either reading or writing) operation to the RFID tag information of the IC circuit part is carried out.

At this time, in the first invention of the present application, the information related to the RFID circuit element such as the tag attribute parameter, or the communication parameter, and the identification information thereof has been held in the cartridge.

In the case that the cartridge has held either the tag attribute parameter or the communication parameter, the RFID tag information communicating device can control the transmission manner from the information transmitting means so as to be coincident with these parameters. As a consequence, even in such a case that a plurality of cartridges in which the tag attribute parameters and the communication parameters of the RFID circuit elements are different from each other are properly detachably replaced in the cartridge holder to be used, this RFID tag information communicating device can quickly and readily perform the information communicating operation by employing the optimum parameters corresponding to the RFID circuit element of each of the cartridges. As a result, the smooth access operations with respect to the RFID circuit elements within the cartridge can be secured.

In the case that the cartridge has held the identification information, for example, while the RFID circuit elements are sequentially carried on a label material when the cartridge is manufacture, if the identification information of the respective RFID circuit elements grasped at this time has been previously held in, for instance, a deriving order from the cartridge, then the cartridge is mounted on the cartridge holder in the RFID tag information communicating device so as to access the IC circuit part. Thus, at this time, identification information of such an RFID circuit element which is accessed outside the cartridge and in which information should be presently written, or read can be acquired. As a result, when either the reading operation or the writing operation is carried out in the RFID tag information communicating device, since the RFID circuit element for the subject element can be easily specified, the information transmitting means is controlled based upon this specified element. For example, if the RFID tag information communicating device reads, or write only to this specified RFID circuit element, then it is possible to avoid that the information is read out from, or written in the other RFID circuit elements which should not be read, or written. As a result, the smooth accessing operation can be secured with respect to the RFID circuit element within the cartridge.

To achieve the first object and the second object, second invention is featured by that in the above-explained first invention, the cartridge has held either a tag attribute parameter or a communication parameter of the RFID circuit element as the information related to the RFID circuit element; and the RFID tag information communicating device comprises: transmission control means for controlling a transmission manner from the information transmitting means so as to be coincident with either the tag attribute parameter or the communication parameter.

The transmission manner from the information transmitting means is controlled by the transmission control means so as to be coincident with the either the tag attribute parameter or the communication parameter of the RFID circuit element of the cartridge mounted on the cartridge holder. As a consequence, even in such a case that a plurality of cartridges in which the tag attribute parameters and the communication parameters of the RFID circuit elements are different from each other are properly detachably replaced in the cartridge holder to be used, this RFID tag information communicating device can quickly and readily perform the information communicating operation by employing the optimum parameters corresponding to the RFID circuit element of each of the cartridges.

Third invention is featured by that in the above-described second invention, first parameter information which corresponds to the tag attribute parameter and the communication parameter of the corresponding RFID circuit element is formed in the cartridge; the RFID tag information communicating device further comprises: first information detecting means for detecting the first parameter information; and wherein: the transmission control means controls the transmission manner from the information transmitting means based upon the first parameter information detected by the first information detecting means.

The first parameter information formed in the cartridge is detected by the first information detecting means, and the transmission control means controls the transmission manner based upon this first parameter information so as to be coincident with either the tag attribute parameter or the communication parameter. As a consequence, even in such a case that a plurality of cartridges in which the tag attribute parameters and the communication parameters of the RFID circuit elements are different from each other are properly detachably replaced in the cartridge holder to be used, this RFID tag information communicating device can quickly and readily perform the information communicating operation by employing the optimum parameters corresponding to the RFID circuit element of each of the cartridges.

Fourth invention is featured by that in the above-explained second invention, the RFID tag information communicating device further comprises: information receiving means for receiving a reply signal transmitted from the IC circuit part after the access information has been transmitted by the information transmitting means in response to the transmitted access information via the tag antenna by the device antenna in a non-contact manner, and for performing a reading operation; and second information detecting means for detecting second parameter information related to the tag attribute parameter of the corresponding RFID circuit element in response to the reply signal read by the information receiving means; and wherein: the transmission control means controls the transmission manner from the information transmitting means based upon the second parameter information detected by the second information detecting means.

In the RFID tag information communicating device, after the access information has been transmitted from the information transmitting means, the replay signal returned from the IC circuit part is received by the information receiving means, the second parameter information is detected by the second information detecting means based upon this reply signal, and then, the transmission control means controls the transmission manner so as to be coincident with either the tag attribute parameter or the communication parameter. As a consequence, even in such a case that a plurality of cartridges in which the tag attribute parameters and the communication parameters of the RFID circuit elements are different from each other are properly detachably replaced in the cartridge holder to be used, this RFID tag information communicating device can quickly and readily perform the information communicating operation by employing the optimum parameters corresponding to the RFID circuit element of each of the cartridges.

Fifth invention is featured by that in the above-explained second invention, third parameter information which corresponds to the tag attribute parameter and the communication parameter of the corresponding RFID circuit element is formed in the cartridge; the RFID tag information communicating device further comprises: third information detecting means for detecting the third parameter information; confirmation instruction transmitting means for transmitting a confirmation instruction signal via the device antenna to the tag antenna in a non-contact manner, the confirmation instruction signal confirming the tag attribute parameter of the RFID circuit element based upon the third parameter information detected by the third information detecting means; and confirmation information receiving means for receiving fourth parameter information related to the tag attribute parameter read by the IC circuit part via the tag antenna by the device antenna in a non-contact manner in response to the confirmation instruction signal, and for reading the received fourth parameter information; and wherein: the transmission control means controls the transmission manner from the information transmitting means based upon both the fourth parameter information read by the confirmation information receiving means and the third parameter information detected by the third information detecting means.

In the RFID tag information communicating device, the third parameter information formed in the cartridge is detected by the third information detecting means, the confirmation instruction signal is transmitted from the confirmation instruction transmitting means to the tag antenna based upon this third parameter information, and the fourth parameter information responding to this confirmation instruction signal is read from the IC circuit part to be received by the confirmation information receiving means. Then, based upon this fourth parameter information and the previously detected third parameter information, the transmission control means controls the transmission manner so as to be coincident with either the tag attribute parameter or the communication parameter. As a consequence, even in such a case that a plurality of cartridges in which the tag attribute parameters and the communication parameters of the RFID circuit elements are different from each other are properly detachably replaced in the cartridge holder to be used, this RFID tag information communicating device can quickly and readily perform the information communicating operation by employing the optimum parameters corresponding to the RFID circuit element of each of the cartridges.

Sixth invention is featured by that in the third invention, or the fifth invention, the first, or third information detecting means is means for optically, or electrically identifying an identifier formed in the cartridge.

Since the identifier formed in the cartridge is optically, or electrically identified, either the first parameter information or the third parameter information formed in the cartridge can be detected.

Seventh invention is featured by that in the third invention, the RFID tag information communicating device further comprises: device storage means for storing the detected first parameter information.

As a consequence, the RFID tag information communicating device can store the first parameter information in the device storage means in a re-readable manner.

Eighth invention is featured by that in the fourth invention, or the fifth invention, the RFID tag information communicating device further comprises: device storage means for storing the detected second to fourth parameter information.

As a consequence, the RFID tag information communicating device can store the second parameter to fourth parameter information in the device storage means in a re-readable manner.

Ninth invention is featured by that in the eighth invention, the RFID tag information communicating device further comprises: judging means for judging as to whether or not the information transmitting means executes the access operation in the transmission manner based upon the control of the transmission control means, and thereafter, can succeed in an access operation to the IC circuit part; reconfirmation instruction transmitting means operated in such a manner that when the judging means judges an access failure, a reconfirmation instruction signal for reconfirming either the tag attribute parameter or the communication parameter of the RFID circuit element is transmitted via the device antenna to the tag antenna in a non-contact manner; information re-receiving means for receiving the fifth parameter information related to the tag attribute parameter, or the communication parameter read from the IC circuit part in response to the reconfirmation instruction signal via the tag antenna by the device antenna in a non-contact manner, and for reading the received fifth parameter means; and update control means for updating parameter information stored in the device storage means to the fifth parameter.

In the ninth invention of the present invention, the RFID tag information communicating device accesses the IC circuit part of the RFID circuit element in the transmission manner based upon the control by the transmission control means, and thereafter, the judging means judges as to whether or not this access can succeed. When it is so judged that the access fails, the reconfirmation instruction transmitting means transmits the reconfirmation instruction signal, and the fifth parameter information read from the IC circuit part is received by the information re-receiving means so as to be read in response to this reconfirmation instruction signal. Then, the update control means updates this storage information by the read fifth parameter irrespective of the storage content which has been so far stored in the device storage means. As a result, even when the parameter information related to the tag attribute parameter and the communication parameter, which have been read in the beginning, is made erroneous due to some reason (even under erroneous reading operation), this parameter information can be corrected by correct information during the updating operation.

Tenth invention is featured by that in the eighth invention, or the ninth invention, the RFID tag information communicating device further comprises: initial confirmation instruction transmitting means for transmitting an initial confirmation instruction signal via the device antenna to the tag antenna in a non-contact manner, the initial confirmation instruction signal initially confirming either the tag attribute parameter or the communication parameter when the cartridge is replaced, or a power supply is turned ON; and initial information receiving means for receiving sixth parameter information related to the tag attribute parameter, or the communication parameter read from the IC circuit part in response to the initial confirmation instruction signal via the tag antenna by the device antenna in a non-contact manner, and for reading the received sixth parameter means; and wherein: update control means updates parameter information stored in the device storage means into the sixth parameter.

In the tenth invention of the present application, in the RFID tag information communicating device, every time the power supply is turned ON, the initial confirmation instruction transmitting means transmits the initial confirmation instruction signal, and the sixth parameter information read from the IC circuit part is received by the initial information receiving means in response to this initial confirmation instruction signal. Then, the transmission control means updates this storage information by the read sixth parameter irrespective of the storage content which has been stored in the device storage means. As a result, when the power supply is turned ON, or the cartridge is replaced, the parameter information stored in the device storage means can be corrected by the correct information irrespective of the storage content stored in the device storage means (when erroneous reading operation is performed, content is corrected, whereas when content is stored under normal condition, this content is reconfirmed).

11th invention is featured by that in the ninth invention, or the tenth invention, either the reconfirmation instruction transmitting means or the initial confirmation instruction transmitting means produces and transmits the reconfirmation instruction signal and the initial confirmation instruction signal based upon the communication parameter based on the parameter information stored in the device storage means.

When either reconfirmation instruction signal or the initial confirmation instruction signal is produced and transmitted, the signal is produced in accordance with the communication parameter stored in the device storage means by referring to the past history. As a result, the time required to acquire the correct communication parameter can be shortened, as compared with such a case that at least the communication parameters are produced in the fixed order, or at random.

12th invention is featured by that in the 11th invention, in the case that an effective signal is not read from the IC circuit part in response to either the reconfirmation instruction signal or the initial confirmation instruction signal, either the reconfirmation instruction transmitting means or the initial confirmation instruction transmitting means newly produces and transmits the reconfirmation instruction signal and the initial confirmation instruction signal in correspondence with a communication parameter different from the communication parameter.

As previously explained, even when either the reconfirmation instruction signal or the initial confirmation instruction signal is produced and transmitted by starting from the past experience value, in such a case that an effective response is not sent from the IC circuit part but also the communication parameter is incorrect, the reconfirmation instruction signal, or the initial confirmation instruction signal is produced in accordance with such a communication parameter different from the above communication parameter in response thereto. As a result, a seeking operation can be carried out in order to become the correct communication parameter, so that the seeking operation can be reached to the correct communication parameter, and the effective response can be obtained from the IC circuit part.

13th invention is featured by that in any one of the seventh invention to the 12th invention, the device storage means is a non-volatile storage means.

As a result, even when the power supply is turned OFF, the storage content can be held without requiring a back-up power supply.

14th invention is featured by that in any one of the second invention to the 13th invention, the tag attribute parameter contains at least one of a sensitivity of the tag antenna of the corresponding RFID circuit element, a memory capacity of the IC circuit part, a width of a tape for adhering the RFID circuit element, and an arranging interval of the RFID circuit elements on the tape.

The transmission control means can control the transmission manner of the transmission control means so as to be coincident with the sensitivity of the tag antenna of the corresponding RFID circuit element, the memory capacity of the IC circuit part, the width of the tape for adhering the RFID circuit element, and the arranging interval of the RFID circuit elements on the tape.

15th invention is featured by that in any one of the second invention to the 14th invention, the communication parameter contains at least one of a frequency of electromagnetic waves, electric power thereof, and a communication protocol, which are used in the radio communication operation.

The transmission control means can control the transmission manner of the transmission control means so as to be coincident with frequency of the electromagnetic waves, the electric power thereof, and the communication protocol, which are used in the radio communication operation.

To achieve the above-described first and third objects, 16th invention is featured by that in the first invention, the cartridge comprises: an RFID circuit element storage unit for storing the plurality of RFID circuit elements in such a manner that the circuit elements can be sequentially derived; and cartridge storage means for storing information related to the RFID circuit elements; and wherein: the RFID tag information communicating device further comprises: access control means for reading information held in the cartridge storage means, and for controlling an access operation by the information transmitting means based upon the read information.

When the predetermined access information is produced by the access information producing means, this access information is transmitted via the device antenna to the IC circuit part of the RFID circuit element in the non-contact manner by the information transmitting means. In this case, for example, when a radio frequency of the UHF band is employed, a communication distance thereof is prolonged due to its characteristic. As a result, for instance, when a plurality of RFID circuit elements carried on a label material are sequentially derived to be accessed, there are some possibility that the RFID tag information communicating device can access not only the RFID circuit element which should be originally accessed and located at a predetermined access position, but also can access other RFID circuit elements which are not located at this access position. As a consequence, before the accessing operation of the above-explained information is carried out, this RFID circuit element which should be accessed must be specified, and then, the communication operation must be carried out only with respect to this specified element. On the other hand, for example, in such a case that an RFID tag label is manufactured, an RFID circuit element storage unit made of the label material which carries the above-explained RFID circuit elements corresponds to an original material, so-called "consumed product." When manufacturing operations of all of the RFID tag labels are accomplished by employing one RFID circuit element storage unit, a new RFID circuit element storage unit is mounted on the RFID tag information communicating device, and then, an RF tag manufacturing work is again carried out under normal condition.

In the 16th invention, the RFID circuit element storage unit is made of a cartridge which can be detachably mounted on the RFID tag information communicating device, and the cartridge storage means is provided on this cartridge, and then, information related to all of the RFID circuit elements of this RFID circuit element storage unit, for example, identification information of the RFID circuit elements are held. Then, the access control means provided on the RFID tag information communicating device reads the information held in the cartridge storage means, and controls the access operation by the information transmitting means based upon this information.

As a consequence, while a cartridge is manufactured, for example, when the RFID circuit elements are sequentially carried on the label material so as to constitute the RFID circuit element storage unit, if the information of the respective RFID circuit elements grasped at this time is previously stored in the cartridge storage means in accordance with the deriving order from the cartridge, then when the cartridge is mounted on the cartridge holder so as to access the IC circuit part, the cartridge storage means is accessed from the access control means outside the cartridge. Thus, for instance, identification information of an RFID circuit element which should be presently read, or written can be obtained. As a result, the RFID circuit element to be read, or written can be easily specified by the access control means provided in the RFID tag information communicating device, so that the information transmitting means is controlled based upon this information so as to read, or write only to this specified RFID circuit element. As a result, it is possible to avoid that the information is not read, or written with respect to other RFID circuit elements which should not be read, or written. Also, at this time, since the cartridge storage means is arranged on the cartridge together with the RFID circuit element storage unit, the relative relationship between the RFID circuit elements of the RFID circuit element storage unit and the information stored in the cartridge storage means can be firmly maintained even when the cartridge is mounted/dismounted. As explained above, while avoiding that the information is read, or written to other RFID circuit elements which should not be read, or written, a large number of RFID tags can be manufactured in a higher efficiency.

17th invention is featured by that in the 16th invention, the access control means specifies an RFID circuit element to be accessed among the RFID circuit elements which are sequentially derived from the cartridge based upon the read information; and the information transmitting means accesses with respect to the RFID circuit element specified by the access control means.

As a result, it is possible to firmly avoid that the information is read, or written to other RFID circuit elements which should not be read, or written.

18th invention is featured by that in the 16th invention, or the 17th invention, the RFID tag information communicating device is further comprised of: first communication interface means connected to the access control means, for reading information from the cartridge storage means to the access control means; and wherein: the cartridge comprises: second communication interface means which is constituted to be detachably connected to the first communication interface means, and which reads information from the cartridge storage means.

As a consequence, in the RFID tag information communicating device, while the detachable characteristic of the cartridge with respect to the cartridge holder is maintained, the communication path between the cartridge storage means of the cartridge and the access control means outside the cartridge can be secured via the first and second communication interface means when the cartridge is mounted.

To achieve the first and third objects, A cartridge for an RFID tag information communicating device of 19th invention is featured by comprising: a plurality of RFID circuit elements each having an IC circuit part for storing predetermined information and a tag antenna connected to the IC circuit part, for transmitting/receiving information; holding information related to the RFID circuit elements; and detachably connectable to an RFID tag information communicating device for producing access information used to access RFID tag information of the IC circuit part, and for transmitting the access information to the tag antenna in a non-contact manner by way of a radio communication operation so as to access the RFID tag information of the IC circuit part.

In the RFID tag information communicating device, the access information for accessing the RFID tag information of the IC circuit part is produced, and this access information is transferred to the tag antenna of the RFID circuit element in the non-contact manner. At this time, when the transmission/receiving is carried out by the radio communication by using the radio frequency of the UHF band, the communication distance becomes long due to its characteristic. As a result, for instance, when a plurality of RFID circuit elements carried on a label material are sequentially derived to be accessed, there is some possibility that the RFID tag information communicating device can access not only the RFID circuit element which should be originally accessed and located at a predetermined access position, but also can access other RFID circuit elements which are not located at this access position. As a consequence, before the accessing operation of the above-explained information is carried out, this RFID circuit element which should be accessed must be specified, and then, the communication operation must be carried out only with respect to this specified element. On the other hand, for example, in such a case that an RFID tag label is manufactured, an RFID circuit element storage unit made of the label material which carries the above-explained RFID circuit elements corresponds to an original material, so-called "consumed product." When manufacturing operations of all of the RFID tag labels are accomplished by employing one RFID circuit element storage unit, a new RFID circuit element storage unit is mounted on the RFID tag information communicating device, and then, an RF tag manufacturing work is again carried out.

In the 19th invention, the plural RFID circuit elements are made of a cartridge which can be detachably mounted on the RFID tag information communicating device, and the information related to all of the RFID circuit elements of the RFID circuit element storage unit, for example, identification information of the RFID circuit elements are held.

As a consequence, while a cartridge is manufactured, for example, when the RFID circuit elements are sequentially carried on the label material, if the information of the respective RFID circuit elements grasped at this time is previously stored in the cartridge side in accordance with the deriving order from the cartridge, then when the cartridge is mounted on the RFID tag information communicating device so as to access the IC circuit part, the RFID circuit element is accessed from the cartridge external unit (for example, access control means of RFID tag information communicating device). Thus, for instance, identification information of an RFID circuit element which should be presently read, or written can be obtained. As a result, since the RFID circuit element to be read, or written can be easily specified, the communication operation is carried out only to this specified RFID circuit element, so that it is possible to avoid that the information is not read, or written with respect to other RFID circuit elements which should not be read, or written. As a consequence, the smooth access operation with respect to the RFID circuit elements contained in the cartridge can be secured.

20th invention is featured by that in the 19th invention, the cartridge comprises: an RFID circuit element storage unit for storing the plurality of RFID circuit elements in such a manner that the circuit elements can be sequentially derived; and cartridge storage means for storing information related to the RFID circuit elements.

In the RFID tag information communicating device-purpose cartridge, since a plurality of RFID circuit elements are stored in the RFID circuit element storage unit, the plural RFID circuit elements can be sequentially derived. Also, since the cartridge storage means is provided on this cartridge, the information related to all of the RFID circuit elements of this RFID circuit element storage unit, for example, the identification information of the RFID circuit elements can be held. Then, since the cartridge storage means is arranged on the cartridge together with the RFID circuit element storage unit, the relative relationship between the RFID circuit elements of the RFID circuit element storage unit and the information stored in the cartridge storage means can be firmly maintained. As explained above, while avoiding that the information is read, or written to other RFID circuit elements which should not be read, or written, a large number of RFID tags can be manufactured in a higher efficiency.

21st invention is featured by that in the 20th invention, the cartridge storage means holds identification information of the plurality of RFID circuit elements.

As a result, for example, each of the RFID circuit elements carried on the label material can be directly and firmly specified. Also, the use frequency may be predicted from the identification information.

22nd invention is featured by that in the 20th invention, or the 21st invention, the cartridge storage means holds information related to frequencies used in the plurality of RFID circuit elements.

As a consequence, even in such a case that plural sorts of RFID circuit element storage units having different frequencies are properly substituted to be used for one RFID tag information communicating device, the frequencies corresponding to the respective RFID circuit element storage units can be easily selected, so that the communication operation can be firmly performed.

23rd invention is featured by that in any one of the 20th invention to the 22nd invention, the cartridge storage means holds information related to communication protocol sorts of the plurality of RFID circuit elements.

As a consequence, even in such a case that plural sorts of RFID circuit element storage units having different communication protocols are properly substituted to be used for one RFID tag information communicating device, the communication protocols corresponding to the respective RFID circuit element storage units can be easily selected, so that the communication operation can be firmly performed.

24th invention is featured by that in any one of the 20th invention to the 23rd invention, the cartridge storage means is constructed in such a manner that information can be read as well as written.

As a consequence, every time the access operation is ended with respect to the RFID circuit element derived from the cartridge side, for instance, the cartridge storage means is accessed from the access control means outside the cartridge, and the information related to the RFID circuit elements stored in the cartridge storage means can be rewritten to be updated.

25th invention is featured by that in any one of the 20th invention to the 24th invention, the cartridge further comprises: detachably mounted communication interface means for reading and writing information from an external source outside the cartridge into the cartridge storage means.

As a consequence, while the detachable characteristic of the cartridge with respect to the RFID tag information communicating device can be maintained, the communication path between the cartridge storage means of the cartridge and the cartridge external unit can be secured via the communication interface means when the cartridge is mounted.

26th invention is featured by that in any one of the 20th invention to the 25th invention, the RFID circuit element storage unit comprises: a tape-shaped label material on which the plurality of RFID circuit elements have been sequentially formed along a longitudinal direction of the label material; and a reel member for rolling the tape-shaped label material.

As a result, the reel number is rotated so as to roll out the tape-shaped label material, so that a plurality of RFID circuit elements can be sequentially derived.

27th invention is featured by that in any one of the 20th invention to the 25th invention, the RFID circuit element storage unit comprises: a plurality of label materials having a flat paper shape, in which one piece of the RFID circuit element has been formed respectively; and a tray member for stacking the plurality of flat paper-shaped label materials with each other along a stacking direction and storing the stacked label materials.

As a result, since the flat sheet-shaped label materials are drawn one by one from the deriving port provided on, for example, one side plane (for instance, upper side, or lower side) of the tray member, a plurality of RFID circuit elements can be sequentially derived.

To achieve the first and third objects, an RFID circuit element processing system, according to 28th invention of the present invention, is featured by comprising: a cartridge equipped with a plurality of RFID circuit elements each having an IC circuit part for storing predetermined information and a tag antenna connected to the IC circuit part, for transmitting/receiving information, and for holding information related to the RFID circuit elements; a device antenna for transmitting/receiving in a radio communication between the own antenna and the tag antenna of a specific RFID circuit element among the plurality of RFID circuit elements; access information producing means for producing access information used to access RFID tag information of the IC circuit part; and information transmitting means for transmitting the access information produced by the access information means via the device antenna to the tag antenna in a non-contact manner so as to access the RFID tag information of the IC circuit part.

The 28th invention is such an RFID circuit element processing system that a plurality of RFID circuit elements are made in the form of a cartridge which can be detachably mounted on the RFID tag information communicating device, and also, the information related to all of the RFID circuit elements, for example, the identification information of the RFID circuit elements is held in this cartridge.

As a consequence, while a cartridge is manufactured, for example, when the RFID circuit elements are sequentially carried on the label material, if the information of the respective RFID circuit elements grasped at this time is previously stored in the cartridge storage means in accordance with the deriving order from the cartridge, then when the cartridge is mounted on the RFID tag information communicating device so as to access the IC circuit part, the cartridge storage means is accessed outside the cartridge. Thus, for instance, identification information of an RFID circuit element which should be presently read, or written can be obtained. As a result, the RFID circuit element to be read, or written can be easily specified, so that the information transmitting means is controlled based upon this information so as to read, or write only to this specified RFID circuit element. As a result, it is possible to avoid that the information is not read, or written with respect to other RFID circuit elements which should not be read, or written. As a result, the smooth access operation with respect to the RFID circuit elements in the cartridge can be secured.

29th invention is featured by that in the 28th invention, the cartridge comprises: an RFID circuit element storage unit for storing the plurality of RFID circuit elements in such a manner that the circuit elements can be sequentially derived; and cartridge storage means for storing information related to the plural RFID circuit elements; and which: the RFID circuit element processing system comprises: information process control means for reading information held in the cartridge storage means, for controlling an access operation of the information transmitting means based upon the read information, and further, for updating the information held in the cartridge storage means in response to the controlled access operation of the cartridge storage means.

In the 29th invention, while the cartridge storage means is provided in the cartridge, the information related to all of the RFID circuit elements of the RFID circuit element storage unit, for example, the identification information of the RFID circuit elements is held therein. Then, the information process control means of the RFID tag information communicating device reads the information held in the cartridge storage means, and the access operation is controlled based upon this information. As a consequence, while a cartridge is manufactured, for example, when the RFID circuit elements are sequentially carried on the label material so as to constitute the RFID circuit element storage unit, if the information of the respective RFID circuit elements grasped at this time is previously stored in the cartridge storage means in accordance with the deriving order from the cartridge, then when the cartridge is mounted on the cartridge holder so as to access the IC circuit part, the cartridge storage means is accessed from the access control means outside the cartridge. Thus, for instance, identification information of an RFID circuit element which should be presently read, or written can be obtained. As a result, the RFID circuit element to be read, or written can be easily specified by the information process control means, so that the information transmitting means is controlled based upon this information so as to read, or write only to this specified RFID circuit element. As a result, it is possible to avoid that the information is not read, or written with respect to other RFID circuit elements which should not be read, or written. Also, for example, when either the reading operation or the writing operation to one RFID circuit element which should be read, or written is accomplished, the information process control means accesses the cartridge storage means so as to perform the update process operation for the information stored therein, so that identification information of such an RFID circuit element which should be subsequently read, or written can be acquired. Furthermore, at this time, since the information related to the RFID circuit elements is held on the cartridge side, the relative relationship between the RFID circuit elements of the RFID circuit element storage unit and the information stored in the cartridge storage means can be firmly maintained even when the cartridge is mounted/dismounted.

As explained above, while avoiding that the information is read, or written to other RFID circuit elements which should not be read, or written, a large number of RFID tags can be manufactured in a higher efficiency.

30th invention is featured by that in the 29th invention, the cartridge storage means has held information related to a remaining number of the RFID circuit elements left in the cartridge; and the information process control means rewrites the information related to the remaining number in response to the access operation of the information transmitting means with respect to the RFID circuit elements which are sequentially derived.

As a consequence, a total number of RFID circuit elements which are left in the cartridge and can be normally and hardly grasped can be firmly and continuously grasped.

31st invention is featured by that in the 30th invention, in the case that the remaining number held by the cartridge storage means becomes smaller than a predetermined threshold value, the information process control means outputs a warning output for warning that unused RFID circuit elements within the cartridge are decreased.

As a result, when a total number of the RFID circuit elements left in the cartridge is decreased, a next new cartridge may be previously prepared, so that a large number of RFID tags can be manufactured in a higher efficiency.

32nd invention is featured by that in the 29th invention, the cartridge storage means has held information related to a total number of used RFID circuit elements which had been derived from the cartridge to be accessed; and the information process control means rewrites the information related to the total use number in response to the access operation by the information transmitting means with respect to the RFID circuit elements which are sequentially derived.

As a consequence, a total number of RFID circuit elements which are left in the cartridge and can be normally and hardly grasped can be firmly and continuously grasped.

33rd invention is featured by that in the 32nd invention, in the case that the total use number held by the cartridge storage means becomes larger than a predetermined threshold value, the information process control means outputs a warning output for warning that unused RFID circuit elements within the cartridge are decreased.

As a result, when a total number of the RFID circuit elements left in the cartridge is decreased, a next new cartridge may be previously prepared, so that a large number of RFID tags can be manufactured in a higher efficiency.

34th invention is featured by that in the 29th invention, the plural RFID circuit elements of the RFID circuit element storage unit have been carried on a label material in correspondence with a deriving order of identifiers attached to the respective RFID circuit elements from the cartridge; as information related to the plurality of RFID circuit elements, the cartridge storage means has held a starting identifier of such an RFID circuit element which is firstly derived from the cartridge among the plurality of RFID circuit elements within the cartridge; an end identifier of such an RFID circuit element which is finally derived from the cartridge; and a next processing identifier of such an RFID circuit element which should be subsequently accessed at the present time; the information process control means executes a transfer process operation of the next processing identifier held in the cartridge storage means in response to the access operation of the information transmitting means.

For example, every time the information transmission means accomplishes the reading process, or the writing process of the RFID circuit element, the next process identifier stored in the cartridge storage means is sequentially transferred in accordance with the deriving order, so that the identification information of the RFID circuit element which should be subsequently read, or written can be firmly acquired.

35th invention is featured by that in the 29th invention, the plural RFID circuit elements of the RFID circuit element storage unit have been carried on a label material independently of a deriving order of identifiers attached to the respective RFID circuit elements from the cartridge; as information related to the plurality of RFID circuit elements, the cartridge storage means has held an identifier series of all of the RFID circuit element within the cartridge; and total use number information of the RFID circuit elements which have already been accessed at the present time; the information process control means executes an increasing process operation of the total use information held in the cartridge storage means in response to the access operation of the information transmitting means.

For example, if such a use number information that RFID circuit elements defined from a first stage up to a certain stage are wanted to be used is applied to the identifier series of all of the RFID circuit elements held in the cartridge storage means, identification information of such an RFID circuit element which should be subsequently read, or written can be obtained. As a consequence, every time the information transmitting means accomplishes to access the RFID circuit element, if the use number information stored in the cartridge storage means is increased one by one, then the identification information of such an RFID circuit element which should be subsequently read or written can be obtained, even when the identifiers of the respective RFID circuit elements of the RFID circuit element storage unit are applied irrespective of the deriving order from the cartridge.

In accordance with the invention recited in claims 1, 19, 28, the smooth access operations can be secured with respect to the RFID circuit element to be communicated.

Also, in accordance with the invention recited in claims 2 to 16, the transmission manner from the information transmitting means is controlled so as to be coincident with the tag attribute parameter or the communication parameter of the RFID circuit element mounted on the cartridge holder. As a result, the RFID circuit element can be quickly and easily brought into the communicatable condition irrespective of the sort of the RFID circuit element to be communicated.

Also, in accordance with the invention recited in claims 17 to 18, 20 to 27, and 29 to 35, even when the radio frequency of the UHF band is employed, it is possible to avoid that such an information as to other RFID circuit elements which should not be read, or written is read, or written. As a result, a large number of RFID tags can be manufactured in a high efficiency.

BRIEF DESCRIPTION OF THE DRAWING

FIG. 1 is a system structural diagram for indicating an RFID tag manufacturing system to which an RFID tag information communicating device of a first embodiment of the present invention is applied.

FIG. 2 is a conceptional structural diagram for showing a detailed structure of the RFID tag information communicating device shown in FIG. 1.

FIG. 3 is a side view for showing a detailed structure of a cartridge according to this embodiment, which is provided in the RFID tag information communicating device shown in FIG. 2.

FIG. 4 is a functional block diagram for indicating a detailed function of a radio frequency circuit shown in FIG. 2.

FIG. 5 is a conceptional structural diagram for indicating a detailed structure/function of a sensor shown in FIG. 2.

FIG. 6 is a diagram for schematically representing a positional relationship between the sensor and a portion to be detected.

FIG. 7 is an explanatory diagram for showing an allocation of parameters in identifiers.

FIG. 8 is a diagram for indicating an example as to a high sensitive type RFID circuit element and a low sensitive type RFID circuit element.

FIG. 9 is a diagram for indicating an example in the case that a mechanical switch is employed as a sensor of a portion to be detected.

FIG. 10 is a conceptional structural diagram for indicating a detailed function of the antenna shown in FIG. 2.

FIG. 11 is a functional block diagram for indicating a functional structure of an RFID circuit element.

FIGS. 12A and 12B is an upper view and a lower view, which show an example of an outer view of a manufactured RFID tag.

FIG. 13 is a lateral sectional view, taken along a line XIII-XIII' of FIG. 12.

FIG. 14 is a diagram for indicating an example of a screen displayed on a terminal, or a general-purpose computer when accessing to RFID tag information.

FIG. 15 is a flow chart for describing control sequential operations executed by a control unit shown in FIG. 2.

FIG. 16 is a flow chart for explaining detailed sequential operation of a step S1 shown in FIG. 15.

FIG. 17 is a flow chart for explaining RFID tag information reading sequential operations corresponding to one example of a step S2 indicated in FIG. 15.

FIG. 18 is a flow chart for explaining RFID tag information writing sequential operations corresponding to another example of the step S2 indicated in FIG. 15.

FIG. 19 is a control flow corresponding to detailed sequential operations for judging a tag sort executed by the control unit in a modification where communication/tag attribute parameter information is read when a power supply is turned ON.

FIG. 20 is a flow chart for representing detailed sequential operations for judging a tag sort executed by the control unit, corresponding to a major portion of a second embodiment of the present invention.

FIG. 21 is a flow chart for representing detailed sequential operations for reading RFID tag information executed by the control unit of a second embodiment of the present invention.

FIG. 22 is a flow chart for explaining RFID tag information writing sequential operations executed by the control circuit of the second embodiment of the present invention.

FIG. 23 is a flow chart for indicating tag information reading sequential operations executed by the control circuit employed in a modification for reinterrogating driving access failure.

FIG. 24 is a flow chart for indicating detailed sequential operations of a rejudging process operation shown in FIG. 23.

FIG. 25 is a flow chart for indicating tag sort judging sequential operations executed by the control circuit in a modification for automatically interrogating when the power supply is turned ON.

FIG. 26 is a flow chart for indicating control sequential operations for judging a tag sort executed by the control circuit, which constitutes a major portion of a modification in which a communication parameter is detected by a sensor and a tag attribute parameter is detected by RFID communication.

FIG. 27 is a flow chart for indicating control sequential operations for judging a tag sort executed by the control circuit, which constitutes a major portion of a modification in which a communication parameter is detected by sensor and by RFID communication in a sharing manner.

FIG. 28 is a conceptional structural diagram for showing a detailed structure of an RFID tag information communicating device according to a third embodiment of the present invention.

FIG. 29 is a schematic diagram for indicating a detailed structure of a cartridge shown in FIG. 28, as viewed from an arrow direction of XXIX in FIG. 28.

FIG. 30 is a diagram for indicating one example as to contents of data stored in a memory.

FIG. 31 is a diagram for showing another example as to contents of data stored in the memory.

FIG. 32 is a flow chart for indicating information transmitting/receiving sequential operations with respect to the memory, and for representing information reading sequential operations from the RFID circuit element among control operations executed by the control circuit.

FIG. 33 is a flow chart for indicating a detailed control content in the information reading sequential operations shown in FIG. 32.

FIG. 34 is a conceptional perspective view for representing a modification in which a tray type cartridge is provided.

FIG. 35 is a flow chart for indicating RFID tag information writing sequential operations among control operations executed by the control circuit in a modification in which RFID tag information is written in an IC circuit part.

FIG. 36 is a flow chart for indicating detailed control contents in the information writing sequential operations shown in FIG. 35.

DETAILED DESCRIPTION OF THE PREFERRED EMBODIMENTS

Referring now to drawings, embodiment modes of the present invention will be described.

A first embodiment of the present invention will now be explained with reference to FIG. 1 to FIG. 19. This embodiment corresponds to an embodiment mode in the case that the present invention is applied to a manufacturing system of an RFID tag.

FIG. 1 is a system structural diagram for indicating an RFID tag manufacturing system to which an RFID tag information communicating device of this first embodiment of the present invention.

In this RFID tag manufacturing system 1 shown in FIG. 1, an RFID tag information communicating device 2 is connected via a communication line 3 in either a wired manner or a wireless manner to a route server 4, a terminal 5, a general-purpose computer 6, and a plurality of information severs 7.

FIG. 2 is a conceptional diagram for showing a detailed structure of the above-explained RFID tag information communicating device 2.

In FIG. 2, a cartridge holder (not shown) is provided as a concave portion in a main body 8 of the RFID tag information communicating device 2, and a cartridge 100 is detachably mounted on this holder unit.

The main body 8 is equipped with the cartridge holder to which the cartridge 100 is fitted. Also, the main body 8 contains a housing 9 which constitutes an outer housing; a print head (thermal head) 10 for performing a predetermined printing operation to a cover film 103 (refer to FIG. 3), will be explained later); a driving shaft 11 for driving an ink ribbon where printing operation to the cover film 103 is ended; and a tape-feed-roller drive shaft 12 for feeding a tag label tape 110 with print from the cartridge main body 100. The main body 8 further contains an antenna 14; a cutter 15; one pair of feeding guides 13; a feeding roller 17; and a sensor 18. The antenna 14 transmits and receives a signal by way of a radio communication manner by using a radio frequency such as the UHF frequency band between an RFID circuit element "To" (will be explained later in detail) equipped in the tag label tape 110 with print and the own antenna 14. The cutter 15 cuts the tag label tape 110 with print at predetermined timing by a predetermined length so as to manufacture a label-shaped RFID tag label "T." One pair of feeding guides 13 set/hold the RFID circuit element "To" within a predetermined access area which is located opposite to the antenna 14 when a signal is transmitted/received in the radio communication manner, and further, guide the cut RFID tag labels "T." The feeding roller 17 feeds the guided RFID tag label "T" to a carry-out exit 16 so as to carry out this RFID tag label "T." The sensor 18 detects as to whether or not the RFID tag label "T" is present at the carry-out exit 16.

On the other hand, the main body 8 contains a radio frequency circuit 21 for accessing (either reading or writing) the RFID circuit element To via the antenna 14; a signal processing circuit 22 for processing a signal read from the RFID circuit element To; a motor 23 to drive cartridge shaft for driving the driving shaft 11 and the tape-feed-roller drive shaft 12; and a print-head drive circuit 25 for controlling a supply of electric power to the print head 10. The main body 8 further contains a solenoid 26 for driving the cutter 15 so as to perform a cutting operation; a solenoid driving circuit 27 for controlling the solenoid 26; a tape-feeding-roller motor 28 for the feeding roller 17; a tape-feeding-roller drive circuit 29 for controlling the tape-feeding-roller motor 28; a lid open/close detecting sensor 19 for detecting open/close conditions of a lid (not shown) provided on the housing 9; a sensor (first information detecting means) 20; and a control circuit 30. The sensor 20 detects parameter information (first parameter information which will be explained later in detail) provided in a portion 190 to be detected (will be described in detail) equipped in the cartridge 100. The control circuit 30 controls entire operations of the RFID tag information communicating device 2 via the radio frequency circuit 21, the signal processing circuit 22, the cartridge shaft drive circuit 24, the printhead drive circuit 25, the solenoid driving circuit 27, the tape-feeding-roller drive circuit 29, and the like.

The control circuit 30 corresponds to a so-called "microcomputer." Although a detailed illustration is omitted, the control circuit 30 is arranged by a control processing unit (CPU), a ROM, a RAM, and the like. While the control circuit 30 utilizes a temporary storage function of the RAM, the control circuit 30 executes a signal process operation in accordance with a program previously stored in the ROM. Also, this control circuit 30 is connected via the communication circuit 31 to, for example, the communication line 3, and then, can transmit/receive information with respect to the route server 4, the terminal 5, the general-purpose computer 6, the information server 7, and the like, which are connected to this communication line 3.

FIG. 3 is a side view for showing a detailed structure of the cartridge 100 according to this embodiment, which is provided in the RFID tag information communicating apparatus 2.

In FIG. 3, the cartridge 100 contains a first roll 102 on which a belt-shaped base tape (tag tape) 101 has been wound; a second roll 104 on which the above-explained cover film 103 having the substantially same width as that of the base tape 101 has been wound; a ribbon take-up roller 106 for taking up a printed ink ribbon 105; and a tape feeding roller 107. The tape feeding roller 107 depresses the base tape 101 and the cover film 103 so as to be adhered to each other to constitute the tag label tape 110 with print, and feeds this tape 110 along a direction indicated by an arrow "A."

In the first roll 102, the base tape 101 has been wound around the reel member 102a. A plurality of RFID circuit elements To have been sequentially manufactured on the base tape 101, for example, in an equi-interval along a longitudinal direction.

Both the ribbon take-up roller 106 and the tape feeding roller 107 are rotated by such a way that drive force of the motor 23 to drive cartridge shaft (refer to FIG. 2) corresponding to, for example, a pulse motor is transferred to the ribbon take-up roller driving shaft 11 and the tape-feeding-roller driving shaft 12.

In this example, the base tape 101 wound on the first roll 102 owns a 4-layer structure (refer to enlarged view in FIG. 3). The base tape 101 has been constituted by stacking an adhesive layer 101a made of a proper adhesive material; a colored base film 101b made of PET (polyethyleneterephthalate), or the like; another adhesive layer 101c made of a proper adhesive material; and a separation sheet 101d in this order from the inside wound side (namely, right side in FIG. 3) toward the opposite side (namely, left side in FIG. 3).

An antenna (antenna part) 152 for transmitting/receiving information has been provided on the rear side (namely, left side in FIG. 3) of the base film 101b in an integral body, and an IC circuit part 151 for storing information is formed thereon in such a manner that the IC circuit part 151 is connected to this antenna 152. Thus, the RFID circuit element "To" has been constituted by these components (detailed structure will be explained later).

The above-described adhesive layer 101a to which the cover film 103 will be later adhered has been formed on the front side (namely, right side in FIG. 3) of the base film 101b. Also, the separation film 101d has been adhered to the base film 101b on the rear side (namely, left side in FIG. 3) of the base film 101b by way of the adhesive layer 101c provided in order to include the RFID circuit element To. It should be understood that when an RFID tag label T which has been finally accomplished in a label shape is adhered to a predetermined commercial goods, or the like, this separation sheet 101d is separated, so that the RFID tag label T can be adhered to this commercial goods, or the like by the adhesive layer 101c.

As to the cover film 103 fed from the second roll 104, the ribbon 105 is depressed to the print head 10 so that this ribbon 105 abuts against the rear surface of this cover film 103. The ribbon 105 is driven by both a ribbon supply-sided roll 111 and the ribbon take-up roller 106, which are arranged on the side of the rear surface of the cover film 103 (namely, on the side where being adhered to base tape 101).

In the above-described structure, when the cartridge 100 is mounted on the main body 8, and a roller holder (not shown) having both a platen roller 108 and a sub-roller 109 is moved from a separated position to an abutting position, both the cover film 103 and the ink ribbon 105 are sandwiched between the print head 10 and the platen roller 108, and further, both the base tape 101 and the cover film 103 are sandwiched between the tape feeding roller 107 and the sub-roller 109. Then, both the ribbon take-up roller 106 and the tape feeding roller 107 are rotated in respective synchronism modes along a direction indicated by an arrow "B" by drive force of the motor 23 to drive cartridge shaft. At this time, while the tape feeding shaft 12, the sub-roller 109, and the platen roller 108 have been coupled to each other by gears (not shown), the tape feeding roller 107, the sub-roller 109, and the platen roller 108 are rotated in conjunction with the drive force of the tape feeding roller driving shaft 12, so that the base tape 101 having the 4-layer structure may be fed from the first roll 102. On the other hand, the cover film 103 is fed from the second roller 104, and a plurality of heating elements of the print head 10 are energized by the print driving circuit 25. As a result, such a print "R" (refer to FIG. 12A) as predetermined character, symbol, and bar code is printed on the rear surface (surface of cover film 103 on the side adhered to adhesive layer 101a) of the cover film 103 (it should be noted that since print "R" is printed from rear surface, character and the like are printed which are mirror-symmetrical, as viewed from printing side). Then, both the base tape 101 having the 4-layer structure and the cover film 103 where the printing operation has been accomplished are adhered to each other by the tape feeding roller 107 and the sub-roller 109 so as to be formed in an integral body as a tag label tape 110 with print. This tag label tape 110 with print is carried out from the cartridge 100. It should also be noted that the ink ribbon 105 whose printing operation to the cover film 103 has been accomplished is taken up by the ribbon take-up roller 106 by the drive force of the ribbon take-up roller driving shaft 11.

FIG. 4 is a functional block diagram for showing detailed functions of the radio frequency circuit 21. In this FIG. 4, the radio frequency circuit 21 is arranged by a transmitting portion 32, a receiving portion 33, and a transmit-receive splitter 34. The transmitting portion 32 transmits a signal via the antenna 14 to the RFID circuit element To. The receiving portion 33 inputs a reflection wave from the RFID circuit element To received by the antenna 14.

The transmitting portion 32 is provided with a crystal oscillator 35, a PLL (Phase-Locked Loop) 36, a VCO (Voltage-Controlled Oscillator) 37, a transmission multiplying circuit 38, and a variable transmission amplifier 39. The crystal oscillator 35 generates a carrier wave which is used to access (read, or write) RFID tag information stored in the IC circuit part 151 of the RFID circuit element To. The transmission multiplying circuit 38 modulates the generated carrier wave based upon the signal supplied from the signal processing circuit 22. In this example, the transmission multiplying circuit 38 amplitude-modulates the carrier wave based upon a "TX_ASK" signal supplied from the signal processing circuit 22 in this example, and an amplification factor variable amplifier may be employed in the case of the amplitude modulation. The variable transmission amplifier 39 determines an amplification factor by a "TX_PWR" signal supplied from the control circuit 30, and amplifies the modulation wave modulated by the transmission multiplying circuit 38. Then, the generated carrier wave may preferably, use a frequency (for example, 915 MHz) of the UHF band. The output signal of the variable transmission amplifier 39 is transmitted to the antenna 14 via the transmit-receive splitter 34, and then, is supplied to the IC circuit part 151 of the RFID circuit element To.

The receiving portion 33 is equipped with a first receiving signal multiplying circuit 40, a first band-pass filter 41, a first receiving signal amplifier 43, a first limiter 42, a second receiving signal multiplying circuit 44, a second band-pass filter 45, a second receiving signal amplifier 47, and a second limiter 46. The first receiving signal multiplying circuit 40 multiplies the reflection wave from the RFID circuit element To received by the antenna 14 by the generated carrier wave. The first band-pass filter 41 is used to derive only a signal of a required frequency band from the first receiving signal multiplying circuit 40. The first receiving signal amplifier 43 amplifies the output signal filtered by the first band-pass filter 41. The first limiter 42 further amplifies the signal of the first receiving signal amplifier 43 so as to be converted into a digital signal. The second receiving signal multiplying circuit 44 multiplies the reflection wave from the RFID circuit element To received by the antenna 14 by a carrier wave whose phase has been shifted by 90 degrees after the carrier wave has been generated. The second band-pass filter 45 is used to derive only a signal of a required band from the output of the second receiving signal multiplying circuit 44. The second receiving signal amplifier 47 inputs the output filtered by the second band-pass filter 45, and amplifies this inputted signal. The second limiter 46 further amplifies the output of the second receiving signal amplifier 47 so as to be converted into a digital signal. Then, a signal "RXS-I" outputted from the first limiter 42 and a signal "RXS-Q" outputted from the second limiter 46 are inputted to the signal processing circuit 22 so as to be processed.

Also, the output signals from the first receiving signal amplifier 43 and the second receiving signal amplifier 47 are inputted to an RSSI (Received Signal Strength Indicator) circuit 48, and thus, signals "RSSI" indicative of the strengths of these signal are entered to the signal processing circuit 22. As previously explained, in the RFID tag information communicating device 2 of this first embodiment, a demodulating operation of the reflection wave from the RFID circuit element To is carried out by an I-Q quadrature demodulating operation.

FIG. 5 is a conceptional structural diagram for indicating a detailed structure/function of the sensor 20. FIG. 6 is a diagram for schematically representing a positional relationship between the sensor 20 and the portion 190 to be detected.

In FIG. 5 and FIG. 6, in this example, the portion 190 to be detected is equipped with 4 pieces of identifiers 190A to 190D. In this example, the sensor 20 utilizes a reflection of light. This sensor 20 contains a light emitting diode 20A, and a phototransistor 20B. The light emitting diode 20A emits light in response to a signal from the control circuit 30. The phototransistor 20B reflects reflection light from respective identifiers 190A to 190D of this light emission, and outputs detection signals corresponding to the reflection light to the control circuit 30. The sensor 20 contains plural sets of these light emitting diodes 20A and phototransistors 20B in correspondence with the respective identifiers 190A to 190D.

Among these identifiers 190A to 190D, such an identifier indicated in a white color reflects light of a light emitting diode, whereas an identifier indicated in a black color does not reflect light of a light emitting diode. The identifiers 190A to 190D represent parameter information which is related to optimum communication parameters with respect to the RFID circuit element "To" contained in the cartridge 100, and tag attribute parameters optimized to the RFID circuit element "To." The communication parameters correspond to a frequency, electric power, a communication protocol, and the like of an electromagnetic wave which is used in a radio communication operation. The tag attribute parameters correspond to the sensitivity of the antenna 152 of the RFID circuit element To, the memory capacity of the IC circuit part 151, the width of the tape 101 which adheres the element To, an arranging interval of the elements To on the tape 101, and the like. It should also be understood that all of both the above-explained communication parameters and tag attribute parameters are normally identical (common) to each other as to all of the RFID circuit elements "To" which are provided in a single cartridge.

In FIG. 7, in this example, the information related to the communication parameters correspond to the identifier 190B and the identifier 190C among the identifiers 190A to 190D.

The identifier 190B represents a communication frequency (access frequency). While 915 MHz and 2.4 GHz have been previously prepared, the communication frequency of the RFID circuit element To of the base tape 101 contained in the cartridge 100 shown in this drawing has been set to 915 MHz. Similarly, the identifier 190C indicates a type of a communication protocol. While a type A and a type B have been previously determined, the communication protocol of the RFID circuit element To of the base tape 101 contained in the cartridge 100 shown in this drawing has been set to the type A.

On the other hand, the identifier 190A indicates as to whether or not the RFID circuit element To is present in the base tape 101. In the cartridge 100 shown in the drawing, the RFID circuit element To has been provided on the base tape 101 contained in this cartridge 100. Similarly, the identifier 190D represents a sensitivity of the antenna 152 of the RFID circuit element To. Within such a high sensitive type (refer to FIG. 8(a)) and a low sensitive type (refer to FIG. 8(b)) as shown in FIG. 8, the RFID circuit element To of the base tape 101 contained in the cartridge 100 shown in this drawing has been set to the low sensitive type. As will be explained later, this identifier 190D is identified by executing a tag sort judging process operation (step S1 of FIG. 15). In a tag information access process operation (step S2 of FIG. 15), the TX_PWR signal is controlled in response to the identification result in such a manner this transmission power is decreased in the high sensitivity type, whereas the transmission power is increased in the low sensitivity type.

It should also be understood that as to a connection of the sensor 20 to a signal line to the control circuit 30, for instance, since a so-called "matrix driving system (detailed structure is not shown)" which is known in the field is employed, a total number of ports for connecting signal lines provided on the side of the control circuit 30 can be largely reduced, and furthermore, the electric power required to emit the light from the light emitting diode 20A may also be reduced so as to lower the cost.

Also, the sensor 20 is not limited only to the above-explained optical system, but may employ other systems, for example, may employ a mechanical switch. In this mechanical switch, a contact 20B is energized by a spring member 20A so as to abut against identifiers 190A' to 190D' of a portion 190' to be detected which is equipped with a concave/convex shape, so that the concave/convex shape is detected.

FIG. 10 is a conceptional structural diagram for indicating a detailed function of the antenna 14.

As previously explained, the RFID tag communicating device 2 of this first embodiment owns the characteristic capable of accepting a plurality of communication parameters, and more specifically, the antenna 14 can be operated in response to a plurality of access frequencies. For instance, as this antenna 14, a broad band antenna such as a biconical antenna may be employed, and a multi-band antenna may be employed in response to a plurality of frequencies.

FIG. 10 indicates one example in such a case that the antenna 14 is constituted as a multi-band antenna capable of accepting two frequencies, namely, 915 MHz and 2.4 GHz. The antenna 14 is equipped with a first element 14A, a second element 14B, a trap 14C, and a feeding point 14D.

The first element 14A owns a length which corresponds to 2.4 GHz, and also, the trap 14C is also tuned to 2.4 GHz. Then, a summation between the length of the first element 14A and the length of the second element 14B becomes such a length which corresponds to 915 MHz.

Since such an antenna structure is employed, in the case that the antenna 14 is excited by the frequency of 2.4 GHz, an impedance of the trap 14C is sufficiently large, so that this antenna 14 is operated as such an antenna of 2.4 GHz by the first element 14A. On the other hand, in the case that the antenna 14 is excited by the frequency of 915 MHz, an impedance of the trap 14C is sufficiently small, so that this antenna 14 is operated as such an antenna of 915 MHz by the first element 14A and the second element 14B.

FIG. 11 is a functional block diagram for indicating a functional structure of the above-explained RFID circuit element To. In FIG. 11, the RFID circuit element To contains an antenna 152 and an IC circuit part 151 connected to the antenna 152. The antenna 152 transmits and receives a signal in a non-contact manner by employing a radio frequency of the UHF band, or the like, and also the antenna 14 provided on the side of the RFID tag information communicating device 2.

The IC circuit part 151 is equipped with a rectification part 153, a power source part 154, a clock extraction part 156, a memory part 157, a modem part 158 connected to the antenna 152, and a control unit 155. The rectification part 153 rectifies a carrier wave received from the antenna 152. The power source part 154 stores thereinto energy of the carrier wave rectified by the rectification part 153 so as to use the stored energy as a drive power source. The clock extraction part 156 extracts a clock signal from the carrier wave received from the antenna 152 and supplies the extracted clock signal to the above-described control unit 155. The memory part 157 functions as an information storage means capable of storing thereinto a predetermined information signal. The control unit 155 is employed so as to control operations of the RFID circuit element To via the rectification part 153, the clock extraction part 156, the modem part 158, and the like.

The modem part 158 demodulates a communication signal from the antenna 14 of the RFID tag information communicating device 2 received by the antenna 152, and also, modulates/reflects a carrier wave received by the antenna 152 based upon a response signal supplied form the control unit 155.

The control unit 155 executes a basic control operation. That is, the control unit 155 interprets the receiving signal demodulated by the modem part 158, produces a reply signal based upon the information signal stored in the memory part 157, and returns the return signal by the modem part 158.

FIG. 12A and FIG. 12B are diagrams for indicating one example as to an outer appearance of the RFID tag label "T" manufactured by completing the information reading (or writing) operation of the RFID circuit element To and the cutting operation of the tag label tape 110 with print in the above-explained manner. FIG. 12A is an upper view of the RFID tag label T and FIG. 12(b) is a lower view thereof. FIG. 13 is a lateral sectional view of the RFID tag label, taken along a line XIII-XIII' of FIG. 12.

In FIG. 12A, FIG. 12B, and FIG. 13, the RFID tag label T is made of a 5-layer structure by adding the cover film 103 to the 4-layer structure shown in FIG. 13. The 5 layers are constituted by the cover film 103, the adhesive layer 101a, the base film 101b, the adhesive layer 101c, and the separation sheet 101d from the side of the cover film 103 (namely, upper side shown in FIG. 13) toward the opposite side thereof (namely, lower side shown in FIG. 13). Then, as explained above, the RFID circuit element To containing the antenna 152 provided on the rear surface of the base film 101b has been provided in the adhesive layer 101c, and a print "R" (in this example, character of "RF-ID" indicative of sort of RFID tag label T) has been printed on the rear surface of the cover film 103.

FIG. 14 is a diagram for indicating one example of a screen displayed on the terminal 5, or the general-purpose computer 6 when the RFID tag information communicating device 2 accesses (reads, or waits) RFID tag information of the IC circuit part 151 of the RFID circuit element To.

In FIG. 14, in this example, the printing character "R" corresponding to the RFID circuit element To, an access (either read or write) ID which corresponds to an ID specific to this RFID circuit element To, an address of goods information stored in the information server 7, and storage destination addresses of corresponding information thereto in the route server 4 may be displayed on either the terminal 5 or the general-purpose computer 6. Then, the RFID tag information communicating device 2 is operated by operating the terminal 5 or the general-purpose computer 6, so that the above-explained printing character "R" is printed on the cover film 103, and as will be explained later, the RFID tag information as to the goods information which has been previously stored in the IC circuit part 151 is read (otherwise, such information as write ID and goods information is written in IC circuit part 151).

In the above-explained example, in connection with the printing operation, the feeding guides 13 are held within the access area with respect to the tag label tape 110 with print under transportation so as to access (either read or write) this tape 110. The present invention is not limited only to this example, but may be modified. That is, this tag label tape 110 with print may be stopped at a predetermined position and may be held by the feeding guides 13, under which the access operation may be carried out.

Also, when the reading operation, or the writing operation is performed, the correspondence relationship between the IDs of the manufactured RFID tag labels T and the information read from the IC circuit parts 151 of the RFID tag labels T (otherwise, information written in IC circuit parts 151) is stored in the route server 4, and may be accessed, if necessary.

FIG. 15 is a flow chart for describing control sequential operations executed by the control circuit 30, which corresponds to a major portion of this first embodiment.

In FIG. 15, when a sort judging (namely, sort judging of RFID circuit element To) operation of the cartridge 100 is carried out by either the terminal 5 or the general-purpose computer 6, this flow is commenced.

First, in a step S1, as previously explained, communication/tag attribute parameters of the RFID circuit element To are detected and judged, which have been unified with respect to each of the cartridges 100 (namely, tag sort judging sequence).

When the step S1 is ended and an access operation by the RFID tag information communicating device 2 is carried out by either the terminal 5 or the general-purpose computer 6, this flow operation is commenced. Then, the sort judging operation is advanced to a step S2. In this step S2, RFID tag information of each of the RFID circuit elements To of this cartridge 100 is accessed (either read or written) based upon this judged parameter (tag information access sequence).

FIG. 16 is a flow chart for indicating detailed sequential operations of the step S1 shown in FIG. 15.

In FIG. 16, firstly, in a step S1, a detection signal of the portion 190 to be detected of the cartridge 100 is inputted (identified) by the sensor 20 for detecting parameters.

Thereafter, in a step S12, since a predetermined process operation (including calculation, analysis, extraction, and the like if necessary) is carried out based upon the detection signal identified in the step S11, the above-explained communication parameter (namely, frequency of electromagnetic wave and communication protocol, which are used in radio communication) is acquired among the parameter information expressed in the identifiers 190A to 190D in the step S12. Thereafter, in a step S13, the acquired communication parameter information is stored in the RAM (otherwise, stored via communication circuit 31 and communication line 3 in terminal 5, or general-purpose computer 6, and further, route server 4, or information server 7). Also, in a step S14, the tag attribute parameter (sensitivity of antenna 152 of RFID circuit element To, memory capacity of IC circuit part 151, width of tape 101 on which element To is adhered, arranging interval of elements To on tape 101, and the like) is acquired. In a step S15, this acquired tag attribute information is stored in the RAM (otherwise, stored via communication circuit 31 and communication line 3 in terminal 5, or general-purpose computer 6, and further, route server 4, or information server 7) in a similar manner to the above process operation.

FIG. 17 is a flow chart for showing RFID tag information reading sequential operations from the IC circuit part 151 of the RFID circuit element To, corresponding to one example of the tag information access operation of the step S2 shown in FIG. 15.

In FIG. 17, as previously explained, when the reading operation of the RFID tag information communicating device 2 is carried out, this flow is commenced.

Firstly, in a step S100, after the tag label tape 110 with print has been printed, the RFID circuit element To from which information is read is transported in the vicinity of the antenna 14, and a tag to be detected is set.

Thereafter, in a step S110, a variable "N" is initialized as "0", while the variable "N" counts a retry time when a communication failure is questioned.

Then, in a step S120, a "Scroll All ID" command is outputted to the signal processing circuit 52. This "Scroll All ID" command employs the communication protocol and the access frequency, which are read in accordance with the communication parameter and the tag attribute parameter acquired in the previous step S1, namely, for example, from the identifiers 190A to 190D of the cartridge 100, and further, reads the information stored in the RFID circuit element To based upon the output corresponding to the antenna sensitivity and the memory capacity. Based upon this command, such a "Scroll All ID" signal is produced as access information by the signal processing circuit 22, and this signal is transmitted via the radio frequency circuit 21 to the RFID circuit element To to be accessed so as to prompt a reply operation.

Next, in a step S130, a reply signal (RFID tag information such as goods information) transmitted from the RFID circuit element To to be accessed in response to the "Scroll All ID" signal is received via the antenna 14, and then, is acquired via the radio frequency circuit 21 and the signal processing circuit 22.

Next, in a step S140, a judgement is made as to whether or not an error is contained in the reply signal received in the step S130 by employing the known CRC (Cyclic Redundancy Check) code.

When the judgement is not satisfied, the reading sequential operation is advanced to a step S150 in which 1 is added to "N." Further, a judgement is made as to whether or not N=5 in a step S160. In case of N≦4, the judgement cannot be satisfied, and the reading sequential operation is returned to the step S120 in which a similar sequential operation is repeated. When N=5, the sequential operation is advanced to a step S170. In this step S170, an error display signal is outputted via the communication circuit 31 and the communication line 3 to either the terminal 5 or the general-purpose computer 6 so as to display a reading failure (error), and then, this routine is accomplished. Even when the reading operations are not good as explained above, the retry operations are carried out up to 5 times.

In the case that the judgement of the step S140 is satisfied, the reading operation of the RFID tag information from the RFID circuit element To which should be read is accomplished, and thus, this routine is ended.

Based upon the above-explained routine, the RFID tag information communicating device 2 can access the RFID tag information of the IC circuit part 151 with respect only to the RFID circuit element To (RFID circuit element To to be manufactured) located in a predetermined access area among the RFID circuit elements To contained in the cartridge 100 in accordance with the mode adapted to the optimum communication parameter and the optimum tag attribute parameter corresponding thereto, and can read out this accessed RFID tag information.

FIG. 18 is a flow chart for showing RFID tag information writing sequential operations into the IC circuit part 151 of the RFID circuit element To, corresponding to another example of the tag information access operation of the step S2 shown in FIG. 15.

In FIG. 18, as previously explained, when the writing operation of the RFID tag information communicating device 2 is carried out, this flow is commenced.

Firstly, in a step S200, an identification number ID is set by using a proper known method, and further, the RFID circuit element To into which information is to be written is transported in the vicinity of the antenna 14.

Thereafter, in a step S210, variables "N" and "M" are initialized as "0" respectively, while the variables "N" and "M" count a retry time when a communication failure is questioned.

Then, similar to the above explanation, in a step S220, an "Erase" command is outputted to the signal processing circuit 22. The "Erase" command initializes information stored in the memory part 157 of the RFID circuit element To so as to be coincident with the communication parameter and the tag attribute parameter, which have been acquired in the previous step S1. Based upon this "Erase" command, an "Erase" signal is produced as access information in the signal processing circuit 22, and this produced "Erase" signal is transmitted to the RFID circuit element To into which information is to be written via the radio frequency circuit 21 so as to initialize the memory part 157 thereof.

Next, similar to the above-explained sequential operation, in a step S230, a "Verify" command is outputted to the signal processing circuit 22. This "Verify" command is used to confirm the content of the memory part 157 so as to be coincident with the communication parameter and the tag attribute parameter, which have been acquired in the previous step S1. Based upon this "Verify" command, a "Verify" signal is produced as access information in the signal processing circuit 22, and this produced "Verify" signal is transmitted to the RFID circuit element To into which information is to be written via the radio frequency circuit 21 so as to prompt a reply signal. Thereafter, in a step S240, the reply signal transmitted from the RFID circuit element To to be written in correspondence with the "Verify" signal is received via the antenna 14, and is acquired via the radio frequency circuit 21 and the signal processing circuit 22.

Next, in a step S250, the information stored in the memory part 157 of this RFID circuit element To is confirmed based upon the reply signal, and a judgement is made as to whether or not the memory part 157 is initialized under normal condition.

When the judgement is not satisfied, the writing sequential operation is advanced to a step S260 in which 1 is added to "M." Further, a judgement is made as to whether or not M=5 in a step S270. In case of M≦4, the judgement cannot be satisfied, and the writing sequential operation is returned to the step S220 in which a similar sequential operation is repeated. When M=5, the sequential operation is advanced to a step S280. In this step S280, an error display signal is outputted via the communication circuit 31 and the communication line 3 to either the terminal 5 or the general-purpose computer 6 so as to display a writing failure (error), and then, this routine is accomplished. Even when the initializing operations are not good as explained above, the retry operations are carried out up to 5 times.

In the case that the judgement of the step S250 is satisfied, the writing sequential operation is advanced to a step S290. In this step S290, a "Program" command is outputted to the signal processing circuit 22 in a similar to the above operation. The "Program" command writes desirable data into the memory part 157 so as to be coincident with the communication parameter and the tag attribute parameter, which have been acquired in the previous step S1. Based upon this "Program" command, a "Program" signal is produced as access information containing such an ID information which is originally wanted to be written in the signal processing circuit 22, and this produced "Program" signal is transmitted to the RFID circuit element To into which information is to be written via the radio frequency circuit 21 so as to write the predetermined information into the memory part 157 thereof.

Thereafter, similar to the above-explained sequential operation, in a step S300, a "Verify" command is outputted to the signal processing circuit 22. This "Verify" command is outputted so as to be coincident with the communication parameter and the tag attribute parameter, which have been acquired in the previous step S1. Based upon this "Verify" command, a "Verify" signal is produced as access information in the signal processing circuit 22, and this produced "Verify" signal is transmitted to the RFID circuit element To into which information is to be written via the radio frequency circuit 21 so as to prompt a reply signal. Thereafter, in a step S310, the reply signal transmitted from the RFID circuit element To to be written in correspondence with the "Verify" signal is received via the antenna 14, and is acquired via the radio frequency circuit 21 and the signal processing circuit 22.

Next, in a step S320, the information stored in the memory part 157 of this RFID circuit element To is confirmed based upon the reply signal, and a judgement is made as to whether or not the above-explained transmitted predetermined information is stored in the memory part 157 under normal condition.

When the judgement is not satisfied, the writing sequential operation is advanced to a step S330 in which 1 is added to "N." Further, a judgement is made as to whether or not N=5 in a step S340. In case of N≦4, the judgement cannot be satisfied, and the writing sequential operation is returned to the step S290 in which a similar sequential operation is repeated. When N=5, the sequential operation is advanced to a step S280. In this step S280, an error display signal similarly displays a writing failure (error), and then, this routine is accomplished. Even when the information writing operations are not good as explained above, the retry operations are carried out up to 5 times.

In the case that the judgement of the step S320 is satisfied, the writing sequential operation is advanced to a step S350. In this step S350, similar to the above explanation, a "Lock" command is outputted to the signal processing circuit 22 so as to be coincident with the communication parameter and the tag attribute parameter, which have been acquired in the previous step S1. Based upon this "Lock" command, a "Lock" signal is produced in the signal processing circuit 22, and this produced "Lock" signal is transmitted to the RFID circuit element To into which information is to be written via the radio frequency circuit 21 so as to prohibit a writing operation of new information into this RFID circuit element To. As a result, the writing operation of the RFID tag information to the RFID circuit element To to be written is accomplished, and then, the RFID circuit element To is taken out in the above-explained manner. When the process operation of this step S350 is ended, this routine is accomplished.

Based upon the above-explained routine, the RFID tag information communicating device 2 can write the desirable RFID tag information into the IC circuit part 151 with respect only to the RFID circuit element To (RFID circuit element To to be manufacture) located in a predetermined access area among the RFID circuit elements To contained in the cartridge 100 in accordance with the mode adapted to the optimum communication parameter and the optimum tag attribute parameter corresponding thereto.

It should also be noted that in the above-explained operation flows, in connection with the printing operation, the feeding guides 13 are held within the access area with respect to the tag label tape 110 with print under transportation so as to access (either read or write) this tape 110. The present invention is not limited only to this example, but may be modified. That is, this tag label tape 110 with print may be stopped at a predetermined position and may be held by the feeding guides 13, under which the access operation may be carried out. Also, when the reading operation, or the writing operation is performed, the correspondence relationship between the print information of the manufactured RFID tag labels T and the IDs of the IC circuit parts 151 of the RFID tag labels T is stored in the route server 4, and may be accessed, if necessary.

In the above-described arrangement, the signal processing circuit 22 constitutes an access information producing means which produces access information ("Scroll All ID" signal, "Erase" signal, "Verify" signal, "Program" signal, and "Ping" signal which will be explained later) in order to access the RFID tag information of the IC circuit part 151. Also, the transmitting portion 32 of the radio frequency circuit 21 constitutes such an information transmitting means which transmits the access information produced by the access information producing means via the device antenna to the tag antenna in the non-contact manner so as to access the RFID tag information of the IC circuit part.

Also, the control circuit 30 constitutes a transmission control means which controls a transmission manner from the information transmitting means in order to be coincident with either the tag attribute parameter or the communication parameter of the RFID circuit element.

In the RFID tag information communicating device 2 of this first embodiment, which has been arranged in the above-described manner, the access information produced by the signal processing circuit 22 is transmitted from the antenna 14 to the antenna 152 of the RFID circuit element To so as to access (either read or write) the IC circuit part 151. At this time, the communication/tag attribute parameter information by the identifiers 190A to 190D has been formed in the portion 190 to be detected of the cartridge 100 (namely, communication/tag attribute parameter information has been held in portion 190 to be detected). Then, this information is detected by the sensor 19, and the control circuit 30 of the RFID tag information communicating device 2 controls the transmission manner based upon this detected information so as to be coincident with either the tag attribute parameter or the communication parameter related to the RFID circuit element To of this cartridge 100.

As a consequence, in one RFID tag information communicating device 2, even in such a case that a plurality of cartridges 100 in which the tag attribute parameters and the communication parameters of the RFID circuit elements To are different from each other are properly detachably replaced in the cartridge holder to be used, this RFID tag information communicating device 2 can quickly and readily perform the information communicating operation by employing the optimum parameters corresponding to the RFID circuit element To of each of the cartridges 100. In other words, the RFID tag information communicating device 2 can be quickly and easily brought into the communicatable condition irrespective of the sort of cartridge 100 (namely, sort of RFID circuit element To to be communicated). As a result, the smooth access operations with respect to the RFID circuit elements To within the cartridge 100 can be secured.

In the above-described first embodiment, as the device storage means, as previously explained, the communication/tag attribute parameter information acquired based upon the detection signal of the sensor 20 has been stored in the RAM of the control circuit 30 by employing the flow of FIG. 16. However, the present invention is not limited thereto, but may be modified. For instance, the communication/attribute parameter information may be alternatively stored in a non-volatile storage means (a so-called "EEPROM") which is constituted by a separately provided non-volatile memory (for example, provided in control unit 20 or external unit).

In this alternative case, even when the power supply is turned OFF, since the storage content is held, as previously explained, the communication/tag attribute parameter information which has been once stored may be read when the power supply is turned ON.

FIG. 19 shows a control flow operation corresponding to the "tag sort judging" sequential operation defined in the step S1 of FIG. 15 as a modification, which is executed by the control circuit 30 and corresponds to the above-explained flow chart of FIG. 16.

In FIG. 19, as previously described, when the power supply is turned ON from the OFF state of the power supply, this control flow is commenced. First, in a step S16, the communication parameter which has been previously stored is read out from the above-explained non-volatile storage means. Thereafter, the control flow operation is advanced to a step S17. Similarly, the tag attribute parameter which has already been stored is read out from the non-volatile storage means, and this routine is ended.

Subsequently, similar to the above-explained control flow, the RFID tag information is read, or written in accordance with the flow chart shown in FIG. 17, or FIG. 18 by employing these read communication parameter and tag attribute parameter.

In the above-explained case, for example, in order to exchange the cartridge 100, the above-explained parameter writing operation to the device storage means may be alternatively carried out in response to open/close operations of the lid provided on the housing 9. In this alternative case, when the lid open/close detecting sensor 19 shown in FIG. 2 detects that the lid is opened, and further, is closed, the information as to the portion 190 to be detected of the cartridge 100 is detected by the sensor 19, and thus, the parameters are written into the device storage means.

A second embodiment of the present invention will now be explained with reference to FIG. 20 to FIG. 27. Similar to the first embodiment, this second embodiment corresponds to such an embodiment in the case that the present invention is applied to an RFID tag manufacturing system. Similar to the above-described first embodiment, while a parameter information detecting-purpose sensor is not employed, the above-explained parameter information is acquired by executing a radio communication with respect to the RFID circuit element To. It should be understood that the same reference numerals shown in the first embodiment will be employed as those for indicating the same, or similar portions of the second embodiment, and explanations thereof are properly omitted.

As previously explained, in this second embodiment, in the above-explained "tag sort judging sequential operation" of the step S1 shown in FIG. 15, the communication/tag attribute parameters are acquired by way of the radio communication in the non-contact manner, which is largely different from the above-described first embodiment.

FIG. 20 is a flow chart for indicating detailed sequential operations of the above-described step S1 (tag sort judging sequential operation) which is executed by the control circuit 30, and is a major portion of this second embodiment.

In this second embodiment, while considering such a fact that if both an access frequency and a communication protocol are different, then a communication operation cannot be completely carried out among above-explained communication parameters and tag attribute parameters, the major factor thereof is to perform a control operation in such a way that these two items (access frequency and communication protocol) in minimum must be coincident to the relevant communication parameters with each other. The communication parameters correspond to the frequency, the electric power, the communication protocol, and the like of the electromagnetic wave which is used in the radio communication operation. The tag attribute parameters correspond to the sensitivity of the antenna 152 of the RFID circuit element To, the memory capacity of the IC circuit part 151, the width of the tape 101 which adheres the element To, the arranging interval of the elements To on the tape 101, and the like.

Also, in this second embodiment, while plural sets of communication protocol types and access frequency patterns have been previously prepared, a seeking operation for seeking that a cartridge 100 (namely, RFID circuit element "To") corresponds to what sort thereof is carried out in this range, and thus, a correct communication parameter is detected and judged. In this example, 5 sets of protocol numbers "P1" to "P5", and 5 sets of frequency patterns "F1" to "F5" have been previously prepared.

First, in a step S21, the communication protocol number P=1 and the access frequency number F=1 are set as initial values.

Next, firstly, in a step S22, a value of a "TX_PWR" signal is set to be relatively large predetermined value. This "TX_PWR" signal determines an amplification factor in the variable transmission amplifier 39 (refer to FIG. 4), which determines an output value of a transmission signal from the transmitting portion 32. This determining reason is given as follows: That is, a possibly surely same response signal containing the internal portion of the cartridge 100 is acquired (assuming that even if responses are issued from a plurality of, or a large number of RFID circuit elements To), and then, a communication parameter can be detected based upon this response signal. In other words, an RFID circuit element To need not be specified, but response signals issued from unspecified plural numbers, or a large number of RFID circuit elements To may be acquired.

Then, in a step S23, a "Ping" command is outputted to the signal processing circuit 22. The "Ping" command is to prompt the RFID circuit elements To located in the communication range to issue a response. In the signal processing circuit 22, a "TX_ASK" signal is produced based upon this "Ping" command, and then, is outputted to the transmission multiplexing circuit 38. In the transmission multiplexing circuit 38, the above-described amplitude modulation corresponding thereto is carried out to become a "Ping" signal as the access information. This "Ping" signal is further amplified by the amplification factor (as previously explained, "TX_PWR" signal becomes relatively large value) based upon the "TX_PWR" signal entered from the control circuit 30 in the transmission amplifier 39. The amplified "Ping" signal is transmitted via the transmit-receive splitter 34 and the antenna 14. If there is such an RFID circuit element To capable of this command is present in the accessible range, then this RFID circuit element To is prompted to issue a response.

Next, in a step S24, if there is the RFID circuit element To within the accessible range, then a reply signal (RFID tag information such as commercial goods information) functioning as the response signal is received via the antenna 14, and then, is acquired via the receiving portion 33 and the signal processing circuit 22. This response signal is transmitted from the above-described RFID circuit element To in correspondence with the above-explained "Scroll All ID" signal.

Next, in a step S25, a judgment is made as to whether or not at least one correct ID can be acquired based upon the above-explained CRC code of the reply signal received in the step S24.

In such a case that both the communication protocol (protocol number P=1) and the access frequency (frequency number F=1) acquired at this time are not coincident with both the communication protocol and the access frequency of the RFID circuit element To provided within the cartridge 100, the reply signal cannot be obtained. Thus, since this judgement is not satisfied, the process operation is advanced to a step S26.

In the step S26, while the frequency number "F" and the protocol number "P" are properly changed, the process operation is again returned via a step S27 to the previous step S23 in which a similar sequential operation is repeated. For instance, in such a case that while the frequency number F=1 remains and the protocol number P is successively increased by 1, even if the protocol number is increased up to P=5 and the acquisition is tried, a better replay signal cannot be acquired, the protocol number is returned to P=1, and further, the frequency number F is added by 1 to become F=2. Similarly, under condition of F=2, a process operation is repeated in this manner of P=1→2→ - - - →5.

When any one of 25 sorts of combinations between P=1 to 5 and F=1 to 5 is made coincident with the communication protocol and the access frequency of the RFID circuit element To of the cartridge 100, a better reply signal can be obtained, so that the judgement of the step S25 can be satisfied at this time, and then, the process operation is advanced to a step S32.

Even when all of F and P are tried (namely, 25 sets up to F, P=1 to 5 in above example), a better reply signal cannot be acquired. Thus, the judgement of step S27 is satisfied, and then, the process operation is advanced to a step S31. In this step S31, it is so assumed that none of the RFID circuit element To is present in the cartridge 100, or the present range is located out of the applicable range of the RFID tag information communicating device 2 of this second embodiment for setting the communication protocol and the access frequency range by using the above-explained 25 combinations, an error display signal is outputted via the communication circuit 31 and the communication line 3 to either the terminal 5 or the general-purpose computer 6, and a read failure (error) corresponding thereto is displayed, and then, the process operation is advanced to the above step S2 (otherwise, access to RFID tag information is ceased at this time, and control flow may be alternatively ended).

Similar to the steps S12 and S13 of FIG. 16, in the step S32, a predetermined process operation (containing calculation, analysis, extraction etc, if necessary) is carried out based upon the response signal (reply signal) received in the step S24. As a result, after such a communication parameter (frequency and communication protocol of electromagnetic wave used in radio communication) has been acquired which corresponds to the RFID circuit element To (namely, correspond to cartridge 100) which returns this response signal, this communication parameter information is stored in the RAM (otherwise, stored via communication line 31 and communication line 3 to terminal 5, or general-purpose computer 6, and further, into route server 4, or information server 7) in a step S33.

Next, since the acquisition of the communication parameter is accomplished in the above manner and the above-explained necessity is no longer made, in a step S34, the value of the "TX_PWR" signal is returned (again set) to a relatively small predetermined value (namely, minimum value required to be communicated with target tag).

Thereafter, the process operation is advance to a step S35 in which such an RFID circuit element To which has returned the reply signal is specified, and a "Scroll ID" command similar to the above command is outputted to the signal processing circuit 22. Based upon this "Scroll ID" command, a "Scroll ID" signal is produced as access information by the signal processing circuit 22, and is transmitted via the radio frequency circuit 21 to the RFID circuit element To to be accessed in order to prompt a response.

Next, in a step S36, a reply signal (RFID tag information such as commercial goods information) is received via the antenna 14, and then, is acquired via the radio frequency circuit 21 and the signal processing circuit 22. This response signal is transmitted from the above-described RFID circuit element To in correspondence with the above-explained "Scroll ID" signal.

Thereafter, in a step S37, similar to the previous steps S14 and S15 of FIG. 16, the above-explained tag attribute parameter is acquired which has been stored in the memory part 157 (namely, corresponding to cartridge 100) in the predetermined format in correspondence with the RFID circuit element To which has returned this reply signal. The tag attribute parameter corresponds to the sensitivity of the antenna 152 of RFID tag circuit To, the memory capacity of the IC circuit part 151, the width of the tape 101 which adheres the element To, the arranging interval of the elements To on the tape 101. In a step S38, this tag attribute parameter information is stored in the RAM (otherwise, stored via communication line 31 and communication line 3 to terminal 5, or general-purpose computer 6, and further, into route server 4, or information server 7), and then, this routine is accomplished.

When the "tag sort judging sequence" of the step S1 shown in FIG. 15 is accomplished in the above-explained manner, the process operation is advanced to a step S2 similar to the first embodiment.

FIG. 21 is a flow chart for indicating RFID tag information reading sequential operations from the IC circuit part 151 of the RFID circuit element To, which corresponds to one example of the tag information access operation of the step S2 which is executed by the control circuit 30 in this second embodiment.

In FIG. 21, a different control flow from that of FIG. 17 according to the first embodiment is given as follows: That is, a step S90 is newly provided in front of a step S100. As previously explained, when a reading operation of the RFID tag information communicating device 2 is carried out, the process operation of this step S90 is firstly executed.

In other words, in the step S90, both the communication parameter and the tag attribute parameter which have been stored in the RAM in the step S33 and the step S38 shown in FIG. 20 are read out from this RAM. Since succeeding sequential operations use the read parameters in a substantially similar manner to that of FIG. 20, explanations thereof are omitted.

Also, FIG. 22 is a flow chart for indicating RFID tag information writing sequential operations from the IC circuit part 151 of the RFID circuit element To, which corresponds to another example of the tag information access operation of the step S2 which is executed by the control circuit 30 in this second embodiment.

In FIG. 22, a different control flow from that of FIG. 18 according to the first embodiment is given as follows: That is, a step S190 is newly provided in front of a step S200. As previously explained, when a writing operation of the RFID tag information communicating device 2 is carried out, the process operation of this step S190 is firstly executed.

In other words, in the step S190, both the communication parameter and the tag attribute parameter which have been stored in the RAM in the step S33 and the step S38 shown in FIG. 20 are read out from this RAM. Since succeeding sequential operations use the read parameters in a substantially similar manner to that of FIG. 17, explanations thereof are omitted.

In the above explanation, the receiving portion 33 constitutes an information receiving means recited in the respective claims. After the access information has been transmitted by the information transmitting means, the information receiving means receives the response signal transmitted from the IC circuit part in response to this transmitted access information via the tag antenna by the device antenna in the non-contact manner, and reads the received response signal.

Also, both the communication parameter and the attribute parameter information acquired in the step S32 and the step S37 of FIG. 20 correspond to second parameter information related to the tag attribute parameter of the corresponding RFID circuit element based upon the response signal read by the information receiving means, and these steps correspond to a second information detecting means.

Also, in the second embodiment arranged in the above-described manner, a similar effect to that of the first embodiment may be achieved. In other words, the response signal returned from the IC circuit part 151 after the access information is transmitted which has been produced by the signal processing circuit 22 and transmitted via the antenna 14 is received by the receiving portion 33. In response to this response signal, both the communication parameter information and the tag attribute parameter information are acquired, and based upon the acquired parameter information, the control circuit 30 controls the transmission manner so as to be coincident with either the tag attribute parameter or the communication parameter from the transmitting portion 32. As a consequence, similar to the above-described first embodiment, even in such a case that a plurality of cartridges 100 in which the tag attribute parameters and the communication parameters related to the provided RFID circuit elements To are different from each other are properly detachably replaced in the cartridge holder to be used, this RFID tag information communicating device 2 can quickly and readily perform the information communication operation by employing the optimum parameters corresponding to the RFID circuit element To of each of the cartridges 100. In other words, the RFID tag information communicating device 2 can be quickly and easily brought into the communicatable condition irrespective of the sort of cartridge 100 (namely, sort of RFID circuit element To to be communicated). As a result, the smooth access operations with respect to the RFID circuit elements To within the cartridge 100 can be secured.

It should also be understood that in the second embodiment of the present invention, various modifications may be realized without departing from the technical sprit and scope of the present invention. Such modifications will now be explained as follows:

(1) Reinterrogation when Access Operation Fails:

That is, in the case that both a communication parameter and a tag attribute parameter are acquired in the above-explained manner, and then, communication operations are tried to be commenced with respect to all of the RFID circuit elements To of the cartridge 100, when an access operation fails, there are some possibilities that this acquired parameter information is error. As a result, an interrogation for a confirmation purpose is again made on the side of the RFID circuit element To.

FIG. 23 is flow chart for indicating tag information reading sequential operations executed by the control circuit 30, which constitutes a major portion of this modification, and corresponds to the flow chart of FIG. 21 in the above-explained second embodiment.

In the flow chart shown in FIG. 23, a step S170A is provided instead of the step S170 of FIG. 17. In other words, in the step S160, when the variable "N" becomes equal to 5 (namely, although communication operations are tried 5 times, access fails), the process operation is advanced to the step S170A in which a rejudging process operation is carried out. The variable "N" counts times of retry operations when the communication failure is questioned in the step S160.

FIG. 24 is a flow chart for showing detailed sequential operations of this rejudging process operation.

The control sequence of FIG. 24 is comparatively resembled to the tag sort judging process operation of FIG. 20. That is, first of all, in the newly provided step S21A instead of the step S21, both a communication protocol number "P" and an access frequency number "F" are read which have already been stored in the device storage means such as a RAM.

Thereafter, a step S22 to a step S32 are similar to those of FIG. 20. That is, a value of a "TX_PWR" signal is set to a relatively large predetermined value; a "Pig" command is outputted to the signal processing circuit 22 so as to prompt an RFID circuit element To located in the accessible range to issue a reply; and the received reply signal is acquired to judge as to whether or not at least one correct ID can be acquired. When a better reply signal cannot be obtained, both the frequency number F and the protocol number P are properly changed at the step S26, and the process operation is again returned to the step S23 in which a similar sequential operation is repeated. Even if all of "F" and "P" are tried (in above example, 25 sets up to F, P=1 to 5), and then, a better replay signal cannot be obtained, an error display signal is outputted so as to display a reading failure (error). When any one of the combinations between P and F is made coincident with the communication protocol and the access frequency of the RFID circuit element To of the cartridge 100, the judgement of the step S25 is satisfied; and similar to FIG. 20, in the step S32, such a communication parameter corresponding to the RFID circuit element To which returns this response signal is acquired based upon this received response signal (reply signal).

Thereafter, in a newly provided step S33A instead of the step S33, this acquired communication parameter information is stored in the RAM (otherwise, stored via communication line 31 and communication line 3 to terminal 5, or general-purpose computer 6, and further, into route server 4, or information server 7), and then, an overwrite updating process operation is carried out (even when the same value is left, the same value is updated irrespective of previously stored content).

Thereafter, a step S34 to a step S37 are similar to those of FIG. 20; the value of the "TX_PWR" signal is returned to a small value in minimum; the RFID circuit element To which returns the reply signal is specified; a "Scroll All ID" command is outputted to the signal processing circuit 22 so as to prompt the RFID circuit element To to be accessed to issue a reply; a reply signal transmitted from the corresponding RFID circuit element To is acquired; and a tag attribute parameter corresponding to the RFID circuit element To which has returned this replay signal is acquired.

Thereafter, in a newly provided step S38A instead of the step S38, this acquired tag attribute parameter information is stored in the RAM (otherwise, stored via communication line 31 and communication line 3 to terminal 5, or general-purpose computer 6, and further, into route server 4, or information server 7), and then, an overwrite updating process operation is carried out (even when the same value is left, the same value is updated irrespective of previously stored content). This routine is ended, and the process operation is advanced to the above-explained step S180 of FIG. 23.

In the above explanations, the step S140, the step S150, and the step S160 shown in the flow chart of FIG. 23 correspond to a judging means recited in the respective claims, which judges as to whether or not an access to an IC circuit part can succeed after the information transmitting means executes an access operation in a transmission manner based upon the control of the transmission control means. The step S170A corresponds to a reconfirmation instruction transmitting means. In the case that this judging means judges the access failure, the reconfirmation instruction transmitting means transmits a reconfirmation instruction signal via the device antenna to the tag antenna in the non-contact manner, while the reconfirmation instruction signal reconfirms either the tag attribute parameter or the communication parameter of the RFID circuit element.

Also, both the communication parameter information and the tag attribute parameter information correspond to fifth parameter information, which are derived from the RFID circuit element To received and recognized in the step S24 and the step S25. The receiving portion 33 constitutes an information receiving means for receiving the fifth parameter information via the tag antenna by the device antenna in the non-contact manner so as to perform the reading operation, while the fifth parameter information is related to either the tag attribute parameter or the communication parameter read by the IC circuit part in response to the reconfirmation instruction signals.

Furthermore, the step S33A and the step S38A of the flow chart shown in FIG. 24 correspond to an update control means for updating the parameter information stored in the device storage means as a fifth parameter.

The above-described process operation has exemplified the flow chart of the reading sequential operation as to the RFID tag information from the IC circuit part 151 of the RFID circuit element To, corresponding to an example of the tag information access operation of the step S2 executed by the control circuit 30. Apparently, a similar sequential operation may be carried out as to the RFID tag information writing operation as to another example of the tag information access operation.

In this modification arranged in the above manner, after an access operation to the IC circuit part 151 of the RFID circuit element To is carried out in the transmission manner under control of the control unit 30, in the step S140 to the step S160 of FIG. 23, a judgement as to whether or not this access operation can succeed. When it is so judged that the access operation fails, a reconfirmation instruction signal is transmitted in the step S170A, and in response to this reconfirmation instruction signal, the communication parameter/tag attribute parameter information read by the IC circuit part 151 is received by the receiving portion 33 so as to be read. Then, the control unit 30 updates this stored information as the read parameter information irrespective of the storage content which has been previously stored in the device storage means such as a RAM. As a result, even when the tag attribute parameter and the communication parameter information which have been read in the beginning are error due to some reason (erroneously read), these parameters can be corrected as the correct information when the updating operation is performed.

More specifically, at this time, as previously explained, in the step S23 of FIG. 24, when a "Scroll All ID" signal is produced and transmitted as the reconfirmation instruction signal, in the step S21A, such a signal is produced in accordance with the communication parameters (protocol P and frequency F) which have been so far stored in the device storage means such as a RAM. Then, in the step S26A, another signal is produced in accordance with the parameter originated from the past experienced value, and further, a communication parameter different from the above parameter. Since the past experienced value is considered, probability when the communication parameter is finally reached to the correct communication parameter may be increased, or the reaching time period may be comparably decreased, as compared with such a case that at least the above-explained communication parameter is used at random to produce the "Scroll All ID" signal.

(2) Automatically Interrogate when Power Supply is Turned ON:

In the second embodiment, as explained with reference to the step S32 and the step S37 of the flow chart of FIG. 20, as the device storage means, the acquired communication/tag attribute parameter information has been stored in the RAM of the control circuit 30. However, the present invention is not limited thereto, but may be modified. For instance, the communication/attribute parameter information may be alternatively stored in a non-volatile storage means (a so-called "EEPROM" etc.) which is constituted by a separately provided non-volatile memory (for example, provided in control unit 20 or external unit).

In this alternative case, even when the power supply is turned OFF, since the storage content is held, as previously explained, the communication/tag attribute parameter information which has been once stored may be read when the power supply is turned ON.

FIG. 25 shows a control flow operation corresponding to the "tag sort judging" sequential operation defined in the step S1 of FIG. 15 as a modification, which is executed by the control circuit 30 and corresponds to the above-explained flow chart of FIG. 20.

In FIG. 25, as previously described, when the power supply is turned ON from the OFF state of the power supply, this control flow is commenced. The control flow operation is comparatively resembled to the tag rejudging process sequential operation of FIG. 24 explained in the above item (1). That is, first of all, in a newly provided step S21B, instead of the step S21A, both a communication protocol number "P" and an access frequency number "F" are read which have already been stored in the device storage means such as an EEPROM.

Thereafter, a step S22 to a step S38A are similar to those of FIG. 24. That is, a value of a "TX_PWR" signal is set to a relatively large predetermined value; a "Pig" command is outputted to the signal processing circuit 22 so as to prompt an RFID circuit element To located in the accessible range to issue a reply; and the received reply signal is acquired to judge as to whether or not at least one correct ID can be acquired. When a better reply signal cannot be obtained, both the frequency number F and the protocol number P are properly changed. Even if all of "F" and "P" are tried and then, a better replay signal cannot be obtained, a reading failure (error) is displayed. When any one of the combinations between P and F is made coincident with the communication protocol and the access frequency of the RFID circuit element To of the cartridge 100, such a communication parameter corresponding to the RFID circuit element To which returns this response signal is acquired based upon this received response signal (reply signal). The acquired communication parameter is stored in either the EEPROM or the RAM (otherwise, stored via communication line 31 and communication line 3 to the terminal 5, or general-purpose computer 6, and further, into route server 4, or information server 7), and then, an overwrite updating process operation is carried out (even when the same value is left, the same value is updated irrespective of previously stored content). Thereafter, the value of the "TX_PWR" signal is returned to a relatively small predetermined value, and the RFID circuit element To which has returned the reply signal is specified; a "Scroll All ID" signal is outputted so as to prompt a reply; a transmitted replay signal is acquired; a tag attribute parameter is acquired which corresponds to the RFID circuit element To which has returned this reply signal; and an overwrite updating process operation similar to the above process operation is carried out.

Thereafter, after the step S38A is accomplished, this routine is ended, and then, the process operation is advanced to the previous step S2 in which an access operation (either reading operation or writing operation) of the RFID tag information is carried out.

In the above-described control flow, the "Ping" signal transmitted in the step S23 of the flow chart shown in FIG. 25 corresponds to an initial confirmation instruction signal recited in the respective claims, which is used to initially confirm either a tag attribute parameter or a communication parameter of an RFID circuit element when the power supply is turned ON. The transmitting portion 32 for transmitting this signal constitutes an initial confirmation instruction transmitting means which transmits the initial confirmation instruction signal via the device antenna to the tag-side antenna in a no-contact manner.

Also, both the communication parameter information and the tag attribute parameter information correspond to sixth parameter information, which are derived from the RFID circuit element To received and recognized in the step S24 and the step S25. The receiving portion 33 constitutes an initial information means for receiving the sixth parameter information via the tag antenna by the device antenna in the non-contact manner so as to perform the reading operation, while the fifth parameter information is related to either the tag attribute parameter or the communication parameter read by the IC circuit part in response to the initial confirmation instruction signal.

Furthermore, the step S33A and the step S38A of the flow chart shown in FIG. 25 correspond to an update control means for updating the parameter information stored in the device storage means as a sixth parameter.

In this modification, every time the power supply is turned ON, the transmitting portion 32 transmits the "Ping" signal as the initial confirmation instruction signal, and in response to this initial confirmation instruction signal, the communication parameter/tag attribute parameter information read by the IC circuit part 151 of the RFID circuit element To is received by the receiving portion 33 so as to be read. Then, the control unit 30 updates this stored information as the read parameter information irrespective of the storage content which has been previously stored in the device storage means such as a RAM or an EEPROM. As a result, every time the power supply is turned ON, the parameter information stored in the device storage means can be firmly normalized (namely, when parameter is erroneously read, this error parameter is corrected; when parameter is correctly stored, this correct parameter is reconfirmed) irrespective of the previously stored content of the device storage means.

Also, as previously explained, in the step S23 of FIG. 25, when the "Ping" signal as the initial confirmation instruction signal is produced and transmitted, in the step S21B, such a signal is produced in accordance with the communication parameters (protocol P and frequency F) which have been so far stored in the non-volatile device storage means such as an EEPROM. Then, in the step S26A, another signal is produced in accordance with the parameter originated from the past experienced value, and further, a communication parameter different from the above parameter. Since the past experienced value is considered, probability when the communication parameter is finally reached to the correct communication parameter may be increased, or the reaching time period may be comparably decreased, as compared with such a case that at least the above-explained communication parameter is used at random to produce the "Ping" signal.

Also, for example, in order to replace the cartridge 100, the tag sort judging operation may be alternatively carried out in response to such a condition that the lid provided on the housing 9 is opened/closed. In this alternative case, when the lid open/close detecting sensor 19 shown in FIG. 2 detects that the lid is opened and further is closed, the flow operation of FIG. 25 may be commenced.

(3) Sharing/Combination of Detection by Sensor and Detection not by Sensor:

That is, in the above-described first embodiment, both the communication parameters and the tag attribute parameters are detected from the identifiers 190A to 190D of the portion to be detected as to the cartridge 100 by the sensor 20, while the communication parameters correspond to the frequency, the electric power, the communication protocol, and the like of the electromagnetic wave which is used in the radio communication operation and the tag attribute parameters correspond to the sensitivity of the antenna 152 of the RFID circuit element To, the memory capacity of the IC circuit part 151, the width of the tape 101 which adheres the element To, the arranging interval of the elements To on the tape 101, and the like. Also, in the above-described second embodiment, both the communication parameters and the tag attribute parameters are detected and acquired by way of the radio communication to the RFID circuit element To in the non-contact manner.

Under such a circumstance, as an intermediate method, the following technical idea may be conceived. That is, a portion of the communication parameters as well as the tag attribute parameters is detected by a sensor, and the remaining communication/tag attribute parameters are detected by way of a radio communication. Two examples as to this intermediate method will now be explained.

(3-1) Communication Parameters are Detected by a Sensor and Tag Attribute Parameters are Detected by Radio Communication:

FIG. 26 is a flow chart for indicating control sequential operations (corresponding to step S1 in FIG. 15) for judging a tag sort executed by the control circuit 30, corresponding to a major portion of this modification.

As indicated in FIG. 26, this control sequential operation is equivalent to such a combination made by the control flow operation of FIG. 16 according to the first embodiment, and also, the control flow operation of FIG. 20 according to the second embodiment (it should be understood that the same step numbers are applied to the similar sequential operations).

That is to say, in a first step S11, the detection signal as to the portion 190 to be detected (in this case, only communication parameter information is formed in identifiers 190A to 190D) of the cartridge 100 is inputted (identified), which is detected by the parameter detecting sensor 20 as explained in the first embodiment. Thereafter, in a step S12, since a predetermined process operation (including calculation, analysis, extraction, and the like, if necessary) is carried out based upon the detection signal identified in the step S11, the above-explained communication parameter (namely, frequency of electromagnetic wave and communication protocol, which are used in radio communication operation) is acquired among the parameter information expressed in the identifiers 190A to 190D in the step S12. Thereafter, in a step S13, the acquired communication parameter information is stored in the RAM (otherwise, stored via communication circuit 31 and communication line 3 in terminal 5, or general-purpose computer 6, and further, route server 4, or information server 7).

Subsequently, the control flow operation is advanced to a step S35 in which, similar to the second embodiment, a pre-determined RFID circuit element To is specified, and then, a "Scroll ID" command is outputted to the signal processing circuit 22 so as to be coincident with the communication parameter acquired in the previous step S12. Based upon this "Scroll ID" command, a "Scroll ID" signal is produced as access information by the signal processing circuit 22, and is transmitted via the radio frequency circuit 21 to the RFID circuit element To to be accessed in order to prompt a reply. Next, in a step S36, a reply signal is received via the antenna 14, and then, is acquired via the radio frequency circuit 21 and the signal processing circuit 22.

Then, in a step S37, the above-explained tag attribute parameter is acquired which corresponds to the RFID circuit element To which has returned this reply signal. The tag attribute parameter corresponds to the sensitivity of the antenna 152 of RFID tag circuit To, the memory capacity of the IC circuit part 151, the width of the tape 101 which adheres the element To, the arranging interval of the elements To on the tape 101. In a step S38, this tag attribute parameter information is stored in the RAM similar to the step S12 (otherwise, stored via communication line 31 and communication line 3 to terminal 5, or general-purpose computer 6, and further, into route server 4, or information server 7), and then, this routine is accomplished.

When the "tag sort judging sequence" of the step S1 shown in FIG. 15 is accomplished in the above-explained manner, the process operation is advanced to a step S2.

In the above-explained arrangement, the sensor 20 constitutes a third information detecting means which is recited in the respective claims, and detects third parameter information formed in a cartridge in correspondence with a communication parameter of an RFID circuit element corresponding thereto. The transmitting portion 32 corresponds to a confirmation instruction transmitting means which transmits a confirmation instruction signal via a device antenna to a tag antenna in a non-contact manner, while the confirmation instruction signal is to confirm a tag attribute parameter of an RFID circuit element based upon the third parameter information detected by this third information detecting means.

Also, the receiving portion 33 constitutes a confirmation information receiving means which receives the fourth parameter information related to the tag attribute parameter read by the IC circuit portion in response to the confirmation instruction signal via the tag antenna by the device antenna in the non-contact manner so as to read the received fourth parameter information.

In this modification, the communication parameter information by the identifies 190A to 190D formed in the cartridge 100 is detected by the sensor 20; the "Scroll All ID" signal is transmitted as the confirmation instruction signal from the transmitting portion 32 to the antenna 152 based upon these detected communication parameter information; and the tag attribute parameter information responding to this confirmation instruction signal is read by the IC circuit part 151 and then is received by the receiving portion 33. As a result, the control circuit 20 controls the transmission manner based upon the tag attribute parameter information and the communication parameter information previously detected by the sensor 20 so as to be coincident with either the tag attribute parameter or the communication parameter sent from the transmitting portion 33.

As a consequence, also in this modification, similar to the above-described first and second embodiments, even in such a case that a plurality of cartridges 100 in which the tag attribute parameters and the communication parameters related to the provided RFID circuit elements To are different from each other are properly detachably replaced in the cartridge holder to be used, this RFID tag information communicating device 2 can quickly and readily perform the information communicating operation by employing the optimum parameters corresponding to the RFID circuit element To of each of the cartridges 100. In other words, the RFID tag information communicating device 2 can be quickly and easily brought into the communicatable condition irrespective of the sort of cartridge 100 (namely, sort of RFID circuit element To to be communicated). As a result, the smooth access operations with respect to the RFID circuit elements To within the cartridge 100 can be secured.

(3-2) Communication Parameters are Detected by Sensor and Radio Communication in a Sharing Manner:

FIG. 27 is a flow chart for indicating control sequential operations (corresponding to step S1 in FIG. 15) for judging a tag sort executed by the control circuit 30, corresponding to a major portion of this modification.

As shown in FIG. 27, this control sequential operation is performed as follows: In the step S12 and the step S13 shown in FIG. 26 of the modification of the above-explained item (3-1), a portion (protocol information in this example) of the communication parameters is detected and acquired; and the remaining portion (access frequency in this example) thereof is detected and acquired in a similar manner to the control sequential operation shown in FIG. 20 in the second embodiment (the same step numbers are applied to similar sequential operations).

That is to say, in a first step S11, the detection signal as to the portion 190 to be detected (in this case, only communication parameter information is formed in identifiers 190A to 190D) of the cartridge 100 is inputted (identified), which is detected by the parameter detecting sensor 20 as explained in the first embodiment. Thereafter, in a step S12' similar to the step S12, since a predetermined process operation (including calculation, analysis, extraction, and the like, if necessary) is carried out based upon the detection signal identified in the step S11, communication protocol parameter information expressed in the identifiers 190A to 190D is acquired. Thereafter, in a step S13' similar to the step S13, the acquired communication protocol information is stored in the RAM (otherwise, stored via communication circuit 31 and communication line 3 in terminal 5, or general-purpose computer 6, and further, route server 4, or information server 7).

Next, the process operation is advanced to a step S21' similar to the step S21 in which the access frequency number "F" is set to be 1 as an initial value.

Subsequent steps S22 to S25 are similar to those shown in FIG. 20 of the second embodiment, the value of the "TX_PWR" signal is set to a relatively large predetermined value, and thereafter, the "Scroll All ID" signal is transmitted; a response signal sent from the RFID circuit element To of the accessible range is received to be acquired; and then, a judgement is made as to whether or not at least one correct ID can be acquired.

In such a case that the access frequency (frequency number F=1 at this time) is not made coincident with the access frequency of the RFID circuit element To contained in the cartridge 100, since a better reply signal is not obtained, the judgement of the step S25 cannot be satisfied, so that 1 is added to the frequency F at a step S29, and the process operation is returned via a step S30 to the step S23. Then, in the case that a better reply signal cannot be obtained in the step S24 and the step S25, while the frequency number is increased by such a manner F=1→1→2 - - - →5, the process operations from the step S23 to the step S30 are repeated. In the case that even if the frequency number is increased up to F=2 and the process operation is tried, then a better reply signal cannot be obtained, the judgment of the step S30 is satisfied, and the process operation is advanced to a step S31 in which the above-described read failure (error) is displayed.

When any one of F=1 to 5 is made coincident with the communication protocol and the access frequency of the RFID circuit element To of the cartridge 100, a better reply signal can be obtained, so that the judgement of the step S25 can be satisfied, and then, the process operation is advanced to a step S32' similar to the step S32.

In the step S32', a predetermined process operation (containing calculation, analysis, extraction etc, if necessary) is carried out based upon the response signal (reply signal) received in the step S24. As a result, after such a communication parameter (frequency and communication protocol of electromagnetic wave used in radio communication operation) has been acquired which corresponds to the RFID circuit element To (namely, correspond to cartridge 100) which returns this response signal, this frequency information is stored in the RAM (otherwise, stored via communication line 31 and communication line 3 to terminal 5, or general-purpose computer 6, and further, into route server 4, or information server 7) in a step S33' similar to the step S33.

The succeeding steps S34 to S38 are similar to those of FIG. 20, and therefore, explanations thereof are omitted.

When the process operations up to the step S38 in the above manner are accomplished and the "tag sort judging sequential operation" defined in the step S1 shown in FIG. 15 is accomplished, the process operation is advanced to the step S2 similar to the above-explained example.

Similar to the above-explained first and second embodiments and the respective modifications, also in this modification, the tag attribute parameter and the communication parameter of the RFID circuit element To provided in the cartridge 100 can be finally acquired. As a consequence, similar to the above-described first embodiment, even in such a case that a plurality of cartridges 100 in which the tag attribute parameters and the communication parameters are different from each other are properly detachably replaced in the cartridge holder to be used, this RFID tag information communicating device 2 can quickly and readily perform the information communication operation by employing the optimum parameters corresponding to the RFID circuit element To of each of the cartridges 100. In other words, the RFID tag information communicating device 2 can be quickly and easily brought into the communicatable condition irrespective of the sort of cartridge 100 (namely, sort of RFID circuit element To to be communicated). As a result, the smooth access operations with respect to the RFID circuit elements To within the cartridge 100 can be secured.

It should also be understood that in the above-explained modification, the base tape 101 where a plurality of RFID circuit elements To have been sequentially formed along the longitudinal direction as the storage member of the RFID circuit elements is wound on the first roller 102 so as to be used. However, the present invention is not limited thereto. That is, instead of this roller 102, such a tray member (so-called "stack type member") may be alternatively employed (refer to FIG. 34 which will be explained later). In this tray member, a plurality of flat sheet-shaped label materials are stacked along a stacking direction and the stacked label materials are stored in this tray member, while a single RFID circuit element To has been formed on one label material.

Referring now to FIG. 28 to FIG. 36, a third embodiment of the present invention will be described.

This third embodiment corresponds to such an embodiment that the present invention is applied to an RFID tag manufacturing system equal to one of RFID circuit element processing systems, and either a reading operation or a writing operation is not carried out from another RFID circuit element which should not be read, or written. For the sake of clear structures, the same reference numerals shown in the first and second embodiments will be employed as those for indicating similar structural components of this third embodiment, which will be properly explained with reference to the same drawings.

An RFID tag manufacturing system to which the RFID tag information communicating device of this third embodiment is applied is equivalent to the system shown in FIG. 1 in the first embodiment. In other words, similar to the RFID tag information communicating device 2 of the RFID tag manufacturing system 1, an RFID tag information communicating device 2' according to this third embodiment is connected via a communication line 3 in either a wired manner or a wireless manner to a route server 4, a terminal 5, a general-purpose computer 6, and a plurality of information severs 7.

FIG. 28 is a conceptional diagram for showing a detailed structure of the above-explained RFID tag information communicating device 2' according to this third embodiment.

In FIG. 28, a main body 8 of the RFID tag information communicating device 2' is equipped with a housing 9 which constitutes an outer shell, and a cartridge holder (not shown) functioning as a concave is provided on this housing 9. This holder unit stores thereinto a plurality of RFID circuit elements To, and a cartridge 100' are detachably mounted on this holder unit, while the plural RFID circuit element To may be sequentially taken out from this cartridge 100'.

FIG. 29 is a diagram for showing a detailed structure of the above-described cartridge 100', as viewed from an arrow direction of "XXIX" shown in FIG. 28.

In FIG. 29 and FIG. 28, as to the cartridge 100', a first roller (reel member) 102 on which a belt-shaped base tape (tape-shaped label material) 101 has been wound; a second roll 104 on which a transparent cover film 103 having the substantially same width as that of the base tape 101 has been wound; an ink ribbon role 111; a take-up roller 106 for taking up a printed ink ribbon 105; and a pressure roller 107 are freely rotatably provided around each of shaft center. On the base-shaped base tape 101, a plurality of RFID circuit elements To have been sequentially formed along the longitudinal direction thereof. On the ink ribbon roller 111, a print-purpose ink ribbon 105 has been wound. The pressure roller 107 depresses the base tape 101 against the cover film 103 so as to adhere the cover film 103 to the base tape 101 to constitute a tag tape 110, and feeds this tag tape 110 along a direction indicated by an arrow. Among these members, both the take-up roller 106 and the pressure roller 107 are rotated by such a way that drive force of the motor 23 to drive cartridge shaft (refer to FIG. 28) corresponding to, for example, a pulse motor. The driving operation of this motor 23 to drive cartridge shaft is controlled by a cartridge drive circuit 24 (refer to FIG. 28).

As partially indicated in FIG. 29 in an enlarging manner, the base tape 101 has a 4-layer structure. The base tape 101 has been constituted by stacking an adhesive layer 101a; a colored base film 101b made of PET (polyethyleneterephthalate), or the like; another adhesive layer 101c; and a separation sheet 101d in this order from the inside wound side (namely, right side in FIG. 29) toward the opposite side (namely, left side in FIG. 29).

An IC circuit part 151 has been provided on a rear side (namely, left side in FIG. 29) of the base film 101b in an integral body; an antenna (tag antenna) 101 has been formed on a surface of the rear side of the base film 101b. The RFID circuit element To has been constituted by the IC circuit part 151 and the antenna 152 (refer also to FIG. 12).

The RFID circuit element To in the third embodiment is similar to that of FIG. 11 in the above-explained first embodiment. The RFID circuit element To contains an antenna (tag antenna) 152 and an IC circuit part 151 connected to the antenna 152. The antenna 152 transmits and receives a signal in a non-contact manner by employing a radio frequency of the UHF band, or the like, and also the antenna 14 provided on the RFID tag information communicating device 2'.

The IC circuit part 151 is equipped with a rectification part 153, a power source part 154, a clock extraction part 156, a memory part 157, a modem part 158 connected to the antenna 152, and a control unit 155. The rectification part 153 rectifies a carrier wave received from the antenna 152. The power source part 154 stores thereinto energy of the carrier wave rectified by the rectification part 153 so as to use the stored energy as a drive power source. The clock extraction part 156 extracts a clock signal from the carrier wave received from the antenna 152 and supplies the extracted clock signal to the above-described control unit 155. The memory part 157 functions as an information storage means capable of storing thereinto a predetermined information signal. The control unit 155 is employed so as to control operations of the RFID circuit element To via the rectification part 153, the clock extraction part 156, the modem part 158, and the like.

The modem part 158 demodulates a communication signal from the antenna 14 of the RFID tag information communicating device 2 received by the antenna 152, and also, modulates/reflects a carrier wave received by the antenna 152 based upon a reply signal supplied form the control unit 155.

The control unit 155 executes a basic control operation. That is, the control unit 155 interprets the receiving signal demodulated by the modem part 158, produces a reply signal based upon the information signal stored in the memory part 157, and returns the return signal by the modem part 158. In this third embodiment, the IC circuit part 15 has been constituted in such a manner that only reading operation of information stored in the memory part 157 by the control unit 155 can be carried out (writing operation thereof is not allowed).

Returning back to FIG. 29, the above-described adhesive layer 101a to which the cover film 103 will be later adhered has been formed on the front side (namely, right side in FIG. 29) of the base film 101b. Also, the separation film 101d has been adhered to the base film 101b on the rear side of the base film 101b by way of the adhesive layer 101c provided in order to include the RFID circuit element To. It should be understood that when an RFID tag label T which has been finally accomplished is adhered to a predetermined commercial goods, or the like, this separation sheet 101d is separated, so that the RFID tag label T can be adhered to this commercial goods, or the like by the adhesive layer 101c.

The ink ribbon roll 111 and the tape take-up roller 106 have been arranged on the side of the rear surface of the cover film 103, namely, on the side where the cover film 103 is adhered to the base tape 101. At this time, a thermal head 10 has been provided in the vicinity of the cartridge 100', while the thermal head 10 prints on the cover film 103 by being energized by a print-head drive circuit 25 (refer to FIG. 28). Since the ink ribbon 105 is depressed against this thermal head 10, the ink ribbon 105 abuts against the rear surface of the cover film 103.

In the above-explained structure, both the tape take-up roller 106 and the pressure roller 107 are rotated in a synchronous manner along directions indicated by arrows by being driven by the cartridge-purpose motor 23 respectively, and also, a plurality of heating elements of the thermal head 10 are energized by the print driving circuit 25. As a result, such a print "R" (refer to FIG. 12A) as predetermined character, symbol, and bar code is printed on the rear surface (surface of cover film 103 on the side adhered to adhesive layer 101a, refer to FIG. 12) of the cover film 103 (it should be noted that since print "R" is printed from rear surface, character and the like are printed which are mirror-symmetrical, as viewed from printing side). Then, after this printing operation, the cover film 103 is adhered to the base tape 101 by the pressure roller 107 so as to be formed as a tag tape 110. The tag tape 110 is rolled out via the feeding guides 13 outside the cartridge 100' so as to be carried out.

Further, returning to FIG. 28, the RFID tag information communicating device 2' is equipped with the antenna (device antenna) 14; a radio frequency circuit for accessing (reading in this example) information (RFID tag information) of the IC circuit part 151 of the RFID circuit element To via this antenna 14; a signal processing circuit 22; and a control circuit 30. The antenna 14 transmits/receives a signal in a radio communication operation with respect to the tag tape 110 which is passing through the feeding guides 13 in connection with the above-explained printing operation, while using the radio frequency such as the UHF band between the own antenna 14 and the RFID circuit element To provided on the tag tape 110. The signal processing circuit 22 processes a signal read out from the IC circuit part 151 of the RFID circuit element To so as to read information, and also, functions as an access information producing means for accessing the IC circuit part 151 of the RFID circuit element To. The control circuit 30 controls entire operations of the RFID tag information communicating device 2' via the radio frequency circuit 21, the signal processing circuit 22, the cartridge shaft drive circuit 24, the print driving circuit 25, a solenoid driving circuit 27 and a tape-feeding-roller drive circuit 29 (will be explained later), and the like.

The control circuit 30 corresponds to a so-called "microcomputer." Although a detailed illustration is omitted, the control circuit 30 is arranged by a control processing unit (CPU), a ROM (Read-Only Memory), a RAM (Random Access Memory), and the like. While the control circuit 30 utilizes a temporary storage function of the RAM, the control circuit 30 executes a signal process operation in accordance with a program previously stored in the ROM. Also, this control circuit 30 is connected via an input/output interface 210 to the communication line 3, and then, can transmit/receive information with respect to the route server 4, the terminal 5, the general-purpose computer 6, the information server 7, and the like.

The radio frequency circuit 21 in this third embodiment is similar to that shown in FIG. 4 in the above-explained first embodiment. That is, the radio frequency circuit 21 is arranged by a transmitting portion 32, a receiving portion 33, and a transmit-receive splitter 34 which uses a directional coupler and the like. The transmitting portion 32 transmits a signal via the antenna 14 to the RFID circuit element To. The receiving portion 33 inputs a reflection wave from the RFID circuit element To received by the antenna 14.

The transmitting portion 32 is provided with a crystal oscillator 35, a PLL (Phase-Locked Loop) 36, a VCO (Voltage-Controlled Oscillator) 37, a transmission multiplying circuit (mixer) 38, and a variable transmission amplifier 39. The crystal oscillator 35 functions as a carrier wave generating part which generates a carrier wave which is used to access (read in this example) RFID tag information stored in the IC circuit part 151 of the RFID circuit element To. The transmission multiplying circuit 38 functions as a carrier wave modulating part which modulates the generated carrier wave based upon the signal supplied from the signal processing circuit 22. In this example, the transmission multiplying circuit 38 amplitude-modulates the carrier wave based upon, for example, a "TX_ASK" signal. Then, the carrier wave generated from the carrier wave generating part may preferably use a frequency (for example, 915 MHz) of the UHF band. The output signal of the variable transmission amplifier 39 is transmitted to the antenna 14 via the transmit-receive splitter (directional coupler) 34, and then, is supplied to the IC circuit part 151 of the RFID circuit element To.

The receiving portion 33 is equipped with a first receiving signal multiplying circuit (mixer) 40, a first receiving signal amplifier 43, a first limiter 42, a second receiving signal multiplying circuit (mixer) 44, a second receiving signal amplifier 47, and a second limiter 46. The first receiving signal multiplying circuit 40 multiplies the reflection wave from the RFID circuit element To received by the antenna 14 by the carrier wave generated by the carrier wave generating part. The first receiving signal amplifier 43 inputs the output of the first receiving signal multiplying circuit 40 via a first band-pass filter 41, and amplifies this input signal. The first limiter 42 further amplifies the signal of the first receiving signal amplifier 43 so as to be converted into a digital signal. The second receiving signal multiplying circuit 44 multiplies the reflection wave from the RFID circuit element To received by the antenna 14 by a carrier wave whose phase has been shifted by 90 degrees after the carrier wave has been generated by the carrier wave generating part. The second receiving signal amplifier 47 inputs the output of the second receiving signal multiplexing circuit 44 via a second band-pass filter 45, and amplifies the inputted signal. The second limiter 46 further amplifies the output of the second receiving signal amplifier 47 so as to be converted into a digital signal. Then, a signal "RXS-I" outputted from the first limiter 42 and a signal "RXS-Q" outputted from the second limiter 46 are inputted to the signal processing circuit 22 so as to be processed.

At this time, the output signals from the first receiving signal amplifier 43 and the second receiving signal amplifier 47 are inputted to an RSSI (Received Signal Strength Indicator) circuit 48, and thus, signals "RSSI" indicative of the strengths of these signal are entered to the signal processing circuit 22. As previously explained, in the RFID tag information communicating device 2' of this first embodiment, a demodulating operation of the reflection wave from the RFID circuit element To is carried out by an I-Q quadrature demodulating operation.

Returning again to FIG. 28, the RFID tag information communicating device 2' further contains a cutter 15, one pair of feeding guides (RFID circuit element holding unit) 13, a feeding roller 17, and a sensor 18. The cutter 15 is provided in the vicinity of an exit port of the cartridge 100', and cuts a tag tape 110 at a predetermined length so as to subdivide this tag tape 110 into label-shaped RFID tag labels "T", in which a reading operation of the RFID tag information from the IC circuit part 151 of the above-described RFID circuit element To has been accomplished (writing operation has been accomplished in below-mentioned modification which will be explained in detail). One pair of the feeding guides 13 set/hold the RFID circuit element To in a predetermined access area (=reading position and writing position which will be explained in the below-mentioned modification) which is located opposite to the antenna 14 when the above-explained reading operation (writing operation in the below-mentioned modification which will be explained later) is carried out. Also, one pair of the feeding guides 13 guide the respective cut RFID tag labels T. The feeding roller 17 feeds the guided RFID tag label "T" to a carry-out exit 16 so as to carry out this RFID tag label "T." The sensor 18 detects as to whether or not the RFID tag label "T" is present at the carry-out exit 16.

The cutter 15 is driven by a solenoid 26 so as to perform a cutting operation, and the solenoid 26 is controlled by a solenoid driving circuit 27. Also, the feeding roller 17 is driven by a carry-out roller motor 28, and this motor 28 is controlled by a carry-out roller driving circuit 29. Also, the sensor 18 corresponds to a transmission type photosensor which is constituted by, for example, a light projecting device and a light receiving device. In the case that the RFID tag label T is not present between the light projecting device and the light receiving device, light projected from this light projecting device is inputted to the light receiving device. On the other hand, when the RFID tag label T is present between the light projecting device and the light receiving device, the light outputted from the light projecting device is shielded, so that a control output from the light receiving device is inverted.

An outer view of the RFID tag label T in this third embodiment, which has been manufactured by completing the information reading operation (writing operation in the below-mentioned modification, which will be explained later) and the cutting operation in the above-explained manner is similar to that shown in FIG. 12A, FIG. 12B, and FIG. 13 in the first embodiment. In other words, the RFID tag label T is made of a 5-layer structure by adding the cover film 103 to the 4-layer structure shown in FIG. 29. The 5 layers are constituted by the cover film 103, the adhesive layer 101a, the base film 101b, the adhesive layer 101c, and the separation sheet 101d from the side of the cover film 103 (namely, upper side shown in FIG. 13) toward the opposite side thereof (namely, lower side shown in FIG. 13). Then, as explained above, the RFID circuit element To constituted by the IC circuit part 151 and the antenna 152 is equipped on the rear surface of the base film 101b, and a print "R" (in this example, character of "RF-ID" indicative of sort of RFID tag label T) has been printed on the rear surface of the cover film 103.

A screen displayed on the terminal 5, or the general-purpose computer 6 when the RFID tag information communicating device 2' accesses (reads in this example) RFID tag information of the IC circuit part 151 of the RFID circuit element To in this third embodiment, is similar to that shown in FIG. 14, in the above-explained first embodiment. The printing character "R" corresponding to the RFID circuit element To, an access (reading in this example) ID which corresponds to an ID specific to this RFID circuit element To, an address of goods information stored in the information server 7, and storage destination addresses of corresponding information thereto in the route server 4 may be displayed on either the terminal 5 or the general-purpose computer 6. Then, the RFID tag information communicating device 2' is operated by operating the terminal 5 or the general-purpose computer 6, so that the above-explained printing character "R" is printed on the cover film 103, and the RFID tag information as to the goods information which has been previously stored in the IC circuit part 151 is read (as explained above, this reading operation is carried out with respect to tag tape 110 while passing through the feeding guides 13 in connection with printing operation). At this time, for instance, the above-explained reading operation is performed with respect to one RFID circuit element To by executing the operation one time, so that one RFID tag label T is manufactured, and a correspondence relationship between an ID of the manufactured RFID tag label T and the RFID tag information read from the IC circuit parts 151 of the RFID tag labels T is stored in the route server 4, and may be accessed, if necessary (refer also to the step S420 of FIG. 32, which will be explained later).

The most important feature of the RFID tag information communicating device 2' according to this third embodiment is provided with respect to the above-explained basic structure. That is, both a readable/writable memory (cartridge storage means) 200 and a connector (communication interface means; first communication interface means) 201 connected to this memory 200 are provided inside the cartridge 100', while the memory 200 holds information (identification information of respective RFID circuit elements To in this example, which will be explained in detail) related to the RFID circuit element To carried by the base tape 101 stored in the first roll 102. Also, another connector (second communication interface means) 202 (refer to FIG. 29) is provided on the main body side of the RFID tag information communicating device 2', while the connector 202 is connected to the control circuit 30, and is detachably engaged with the connector 201 when the cartridge 101' is mounted and dismounted.

When the RFID circuit elements To are sequentially carried on the base tape 101 while the cartridge 100' is manufactured, the identification information (identifiers, namely ID numbers) of the respective RFID circuit elements To grasped at this time has been entered in the memory 200 in such a manner that sequences of the identification information are defined in the deriving order from, for example, the cartridge 100' by a proper method (for example, manual inputting method by operator) so as to be stored/held in the memory 200.

FIG. 30 and FIG. 31 are diagrams for representing one example of contents of data which have been stored/held in this memory 200.

FIG. 30 shows one example of the above-described identification information, which corresponds to such a case (serial type) that the RFID circuit elements To are arranged in the above-described ID number order when the cartridge 100' is manufactured. As shown in FIG. 30, in this case, such information has been stored/held in the memory 200, which relates to "sort of RFID circuit element", "manufacturing date", "serial type identifier", "RFID circuit element number which is firstly rolled out", "RFID circuit element number which is finally rolled out", and "RFID circuit element number to be accessed (read in this example)."

The information "sort of RFID circuit element" is, for example, a predetermined model number etc., and includes such information related to frequency bands and communication protocols, which should be used in a transmitting operation and a receiving operation. The control circuit 30 of the RFID tag information communicating device 2' selects both a frequency band and a communication protocol which are used during a communication operation based upon this information. Also, the control circuit 30 produces control signals of the above-explained VCO 37 and PLL 36 which generate a corresponding frequency signal. Also, the signal processing circuit 22 is controlled in such a way that the signal processing circuit 22 is operated in correspondence with the selected communication protocol.

The information "RFID circuit element number to be accessed" may function as a subsequent process identifier. In response to this element number, the control circuit 30 of the RFID tag information communicating device 2' designates an RFID circuit element to which should be communicated, and accesses (reads in this example) the RFID tag information of the IC circuit part 151 which is communicated only with this circuit element To (will be explained in detail). Also, this information "RFID circuit element number to be accessed" is rewritable and can be updated from the side of the control circuit 30. For instance, in such a case that an unused cartridge 100' is mounted, the information "RFID circuit element number to be accessed" is made coincident with the above-described information "RFID circuit element number which is firstly rolled out" as the starting identifier; the number is increased by 1 every time the access operation (reading operation in this example, and writing operation in below mentioned modification, will be described in detail) to as RFID circuit element To is sequentially accomplished; and finally, the information "RFID circuit element number to be accessed" is made coincident with the above-explained information "RFID circuit element number which is finally rolled" as an end identifier, so that rolling-out operations of all of the RFID circuit element To contained in the cartridge 100' and the access operations (reading operations in this example, and writing operations in below-mentioned modification, will be explained in detail) thereto are accomplished (will be explained later).

FIG. 31 shows one example of the above-described identification information, which corresponds to such a case (random type) that the ID numbers of the RFID circuit elements To are arranged at random when the cartridge 100' is manufactured.

As shown in FIG. 31, in this case, such information has been stored/held in the memory 200, which relates to "sort of RFID circuit element", "manufacturing date", and "random type identifier". At succeeding addresses 1, 2, 3, 4, - - - (this address sequence is defined in roll out sequence from cartridge 100'), ID number series (identifier series) of the respective RFID circuit elements To are stored/held in the deriving order from the cartridge 100'. As a result, the ID numbers are listed up at random irrespective of the address number. Also, information "total printed number" (use number information) has been stored/held at the position (last) after these ID number series.

The information "sort of RFIT circuit element" is similar to the above-described information.

The information "total printed number" indicates such a total number of RFID circuit elements To which have already been rolled out up to now after this cartridge 100' has been manufactured, the printing operations and the accessing operations (reading operations in this example, and writing operations in below-mentioned modification, will be explained in detail) of which are accomplished. Based upon this total printed number and the ID numbers of the address 1 to the final address, the control unit 30 of the RFID tag information communicating device 2' designates an RFID circuit element To which should be communicated, and communicates only with respect to this designated element so as to access (read in this example, and write in below-mentioned modification, will be explained later) information (will be described in detail). Also this information "total printed number" can be rewritten and updated from the side of the control circuit 30. For instance, this information "total printed number" is equal to "0" when the unused cartridge 100' is mounted, is increased by 1 every time an access operation for 1 element is ended, and is finally coincident with the total number of all the RFID circuit elements To which were prepared in this cartridge 100' in the beginning. Thus, the rolling-out operations of all of the RFID circuit element To contained in the cartridge 100' and the access operations (reading operations in this example, and writing operations in below-mentioned modification, will be explained in detail) thereto are accomplished (will be explained later).

FIG. 32 is a flow chart for indicating a sequence of accessing operations (reading operations in this example) with respect to an IC circuit par of an RFID circuit element To, and transmitting/receiving operations of information with respect to the memory 200, which constitutes a major operation of this third embodiment among control operations executed by the control circuit 30.

In FIG. 32, when a reading operation (as previously explained, for example, reading operation is carried out every one RFID circuit element To) is carried out in the RFID tag information communicating device 2', this flow operation is commenced. First, in a step S410, a judgment is made as to whether or not the cartridge 100' where the memory 200 has been installed is mounted by checking, for example, as to whether or not there is such a connector 201 connected to the connector 202 provided on the RFID tag information communicating device 2' when the cartridge 100' is mounted.

When the judgment is not satisfied, it is so regarded that the cartridge mounting error occurs, and the process operation is advanced to a step S415 in which a predetermined error process operation (for example, predetermined error display signal is outputted via input/output interface 201 and communication line 3 to either terminal 5 or general-purpose computer 6 so as to perform relevant failure (error) display). Thereafter, this flow operation is ended.

When the judgment is satisfied, the process operation is advanced to a step S420 in which the information (refer to FIG. 30 and FIG. 31) stored in the memory 200 of the cartridge 100' is read out. The read information is once stored in, for example, a RAM (not shown) employed in the control circuit 30.

In the next step S430, a judgment is made as to whether or not the remaining number of the RFID circuit elements To employed in the mounted cartridge 100' is equal to 0. This judging operation is carried out as follows:

In the case that data stored in the memory 200 corresponds to such a serial type as shown in FIG. 30, a judgment is made as to whether or not "RFID circuit element number to be accessed" indicated in the lowermost stage of FIG. 30 is larger than "RFID circuit element number which is finally rolled out" indicated in an upper stage thereof. When a large value is inputted, it is so regarded that the remaining number is equal to 0. Thus, the judgement of this step S430 is satisfied, the process operation is advanced to a step S440. In this step S440, such a display signal that the remaining number is 0 is outputted via the input/output interface 201 and the communication line 3 to either the terminal 5 or the general-purpose computer 6 so as to perform the relevant information display operation. If the large value is not entered, then the judgement of the step S430 is not satisfied, so that the process operation is advanced to a step S450.

In the case that data stored in the memory 200 corresponds to such a random type as shown in FIG. 31, a judgment is made as to whether or not "total printed number" indicated in the lowermost stage of FIG. 31 is larger than the address number of "RFID circuit element number which is finally rolled out" indicated in an upper stage thereof. When a large value is inputted, it is so regarded that the remaining number is equal to 0. Thus, the judgement of this step S430 is satisfied, the process operation is advanced to the step S440. In this step S440, such a display signal that the remaining number is 0 is similarly outputted via the input/output interface 201 and the communication line 3 to either the terminal 5 or the general-purpose computer 6 so as to perform the relevant information display operation. If the large value is not entered, then the judgement of the step S430 is not satisfied, so that the process operation is advanced to the step S450.

In the step S450, the remaining number of the RFID circuit elements To employed in the mounted cartridge 100' is counted.

The counting operation of this remaining number is carried out in the below-mentioned manner.

For instance, in the case that the data stored in the memory 200 corresponds to such a serial type as shown in FIG. 30, a calculation is made of how many difference of "RFID circuit element number to be accessed" shown in the lowermost stage of FIG. 30 with respect to "RFID circuit element number which is finally rolled out" shown in the upper stage thereof, and then, 1 is added to this calculation result. In this serial type, as previously explained, since the respective RFID circuit elements To are arranged in the ID number order, this value added by 1 is made coincident with the remaining number. Also, in the case that the data stored in the memory 200 corresponds to such a random type as shown in FIG. 31, a calculation is made of how many difference of "total printed number" shown in the lowermost stage of FIG. 31 with respect to the address number of "RFID circuit element number which is finally rolled out" shown in the upper stage thereof, and then, 1 is added to this calculation result. Similar to the above case, these differences are made coincident with the remaining number. As a consequence, in other words, the information related to the remaining number of the RFID circuit elements To remained in the cartridge 100' has been stored in the memory 200.

It should also be understood that the remaining number calculating sequential operation defined in this step S450 may be alternatively carried out in combination with the step S430.

Then, the remaining number of the RFID circuit elements To counted in the above-described manner is displayed by outputting the corresponding remaining number display signal via the input/output interface 201 and the communication line 3 to either the terminal 3 or the general-purpose computer 6.

Thereafter, the process operation is advanced to a step S460. In this step S460, a judgement is made as to whether or not the remaining number of the RFID circuit element To calculated in the step S450 is smaller than a predetermined threshold value ("5" in this example). When the remaining number is smaller than, or equal to 4, the judgement is satisfied, and then, the process operation is advanced to a step S470. In this step S470, such a warning display signal that the remaining number of the unused RFID circuit elements To employed in the cartridge 100' is outputted via the input/output interface 201 and the communication line 3 to either the terminal 5 or the general-purpose computer 6 so as to display the relevant remaining number warning. It should also be noted that in the method for counting the remaining number, as explained above, when the data stored in the memory 200 corresponds to the random type as shown in FIG. 31, the judging operation for judging as to whether or not the remaining number is smaller than 5 corresponds to such a judging operation for judging as to whether or not a total use number of RFID circuit elements To which have already been used (have been rolled out to be read-processed) is larger than such a number obtained by subtracting 5 from a total number of the RFID circuit elements To which have been originally stored in the cartridge 100'.

When the remaining number becomes larger than, or equal to 5, the judgment is not satisfied, but the process operation is advanced to a step S480.

In the step S480, a judgement is made as to whether or not information stored in the memory 200 corresponds to the serial type.

When the information corresponds to the serial type, the judgement is satisfied and the process operation is advanced to a step S490A. When the information corresponds to the random type, the judgement is not satisfied and the process operation is advanced to a step S490B. In these steps S490A and S490B, a reading (writing operation in below-mentioned modification, will be explained in detail) process operation is carried out with respect to such an RFID circuit element To which should be accessed (reading operation in this example, writing operation in below-mentioned modification, will be discussed in detail).

FIG. 33 is a flow chart for indicating detailed control contents obtained in the steps S490A and S490B.

In FIG. 33, firstly, in the step S491, an operator "N" is initialized as "0", while the operator "N" counts a retry time when a communication failure is questioned.

Then, in a step S492, a "Scroll ID" command is outputted to the signal processing circuit 52. This "Scroll ID" command corresponds to a tag number of an RFID circuit element To which should be read. Based upon this command, such a "Scroll ID" signal is produced as access information by the signal processing circuit 22, and this signal is transmitted via the radio frequency circuit 21 to the RFID circuit element To to be accessed so as to prompt a reply operation.

Next, in a step S493, a reply signal (RFID tag information such as goods information) transmitted from the RFID circuit element To to be accessed having the corresponding tag number in response to the "Scroll ID" signal is received via the antenna 14, and then, is acquired via the radio frequency circuit 21 and the signal processing circuit 22.

Next, in a step S494, a judgement is made as to whether or not the information stored in the memory part 157 of this RFID circuit element To can be received under normal condition based upon the reply signal received in the step S493.

When the judgement is not satisfied, the control process operation is advanced to a step S495 in which 1 is added to "N." Further, a judgement is made as to whether or not N=5 in a step S496. In case of N≦4, the judgement cannot be satisfied, and the control process operation is returned to the step S492 in which a similar control process operation is repeated. When N=5, the control process operation is advanced to a step S497. In this step S497, an error display signal is outputted via the input/output interface 201 and the communication line 3 to either the terminal 5 or the general-purpose computer 6 so as to display a reading failure (error), and then, this routine is accomplished. Even when the reading operations are not good as explained above, the retry operations are carried out up to 5 times.

In the case that the judgement of the step S494 is satisfied, the reading operation of the RFID tag information from the RFID circuit element To which should be read is accomplished, and thus, this routine is ended.

Based upon the above-explained routine, the RFID tag information communicating device 2' can access the RFID tag information of the IC circuit part 151 of the RFID circuit element To to be accessed, and can read out this accessed RFID tag information.

In the case of the above-described serial type, in the step S490A, the information reading process operation is carried out with respect to the RFID circuit element To of such an ID number which has been held in "RFID circuit element number to be accessed" at this time. Thereafter, the control process operation is advanced to a step S500A shown in FIG. 32. In the step S500A, 1 is added to "RFID circuit element number to be accessed" shown in the lowermost stage of FIG. 30 among the information read from the memory 200 in the previous step S420. Thereafter, the control process operation is advanced to a step S510. In this step S510, an update control signal is outputted to the memory 200, and the information stored in the memory 200 is overwritten/updated by the above-explained content.

In the case of the above-described random type, in the step S490B, the information reading process operation is carried out with respect to the RFID circuit element To of such an ID number which has been stored at such an address defined by adding 1 to a total number being held in "total printed number" at this time. Thereafter, the control process operation is advanced to a step S500B. In the step S500B, 1 is added to "total printed number" shown in the lowermost stage of FIG. 31 among the information read from the memory 200 in the previous step S420. Thereafter, the control process operation is advanced to the step S510. In this step S510, an update control signal is outputted to the memory 200, and the information stored in the memory 200 is overwritten/updated by the above-explained content.

In the step S520, the tag number of the RFID circuit element To whose information is read in either the step S490A or the step S490B, the RFID tag information such as the commercial goods information read from this RFID circuit element To, and the printed content (printed character "R" etc.) which is printed on the cover film 103 in correspondence with this RFID circuit element To are transmitted to the route server 4, and then, is stored at a predetermined storage destination address in the route server 4. As a result, in such a case that product information related to a product to which this label-shaped RFID tag label T has been adhered is wanted to be obtained later, the RFID tag information of the IC circuit part 151 of this RFID tag label T is read out by a reader and the product information corresponding thereto is retrieved in the route server 4, so that the product information of this product can be obtained.

It should also be noted that in the above-explained operation flows, in connection with the printing operation, the feeding guides 13 are held within the access area with respect to the tag tape 110 under transportation so as to access this tape 110. The present invention is not limited only to this example, but may be modified. That is, this tag tape 110 may be stopped at a predetermined position and may be held by the feeding guides 13, under which the access operation may be carried out.

In the above-described arrangement, the signal processing circuit 22 constitutes an access information producing means which produces access information ("Scroll All ID" signal, "Erase" signal, "Verify" signal, "Program" signal, and "Lock" signal) in order to access the RFID tag information of the IC circuit part 151. Also, the transmitting portion 32 of the radio frequency circuit 21 constitutes such an information transmitting means which transmits the access information produced by the access information producing means via the device antenna to the tag antenna in the non-contact manner so as to access the RFID tag information of the IC circuit part.

Also, the control circuit 30 constitutes an access control means which controls an access operation by the information transmitting means, and also, constitutes an information processing control means which controls the access operation by the information transmitting means, and executes an updating process operation of information held in the cartridge storage means.

Next, operations and effects of this third embodiment arranged in the above-explained manner will now be described.

In this RFID tag manufacturing system 1, an access operation (reading operation of RFID circuit element To in this example, and writing operation of RFID circuit element To is performed in below-mentioned modification) to an IC circuit part 151 is sequentially carried out with respect to an RFID circuit element To which is rolled out from the cartridge 100' as the tag tape 110, and is set/held at a predetermined position (access area) located opposite to the antenna 14 by the feeding guides 13. In other words, access information (namely, above-described "Scroll ID" signal) which is produced by the signal processing circuit 22 of the RFID tag information communicating device 2' is used in the transmission multiplying circuit 38; a carrier wave from the VCO 37 is modulated by the access information; and further, the modulated signal is amplified by the variable transmission amplifier 39; and thereafter, the amplified signal is transferred from the antenna 14 to the IC circuit part 151 of the RFID circuit element To in the non-contact manner. At this time, in the case that the signal is transmitted/received by the radio communication by employing the radio frequency such as the UHF band, the communication distance becomes long in view of the frequency characteristic. As a result, if this radio frequency is directly used, then there are some possibilities that the radio tag information may be read not only from the RFID circuit element To which constitutes the element originally to be read and is held by the feeding guides 13, but also from such RFID circuit elements subsequent to the first-mentioned RFID circuit element To. These RFID circuit elements correspond to such an RFID circuit element which has been rolled out from the succeeding cartridge 100' just after the preceding RFID circuit element, and RFID circuit elements stored in other cartridges 100'. As a consequence, before the reading operation of the above-explained information is carried out, this RFID circuit element To which should be read must be specified, and then, the communication operation must be carried out only with respect to this specified element. On the other hand, in such a case that an RFID tag label T is manufactured, an RFID circuit element storage unit made of the base tape 101 which carries the above-explained RFID circuit elements To corresponds to an original material, so-called "consumed product." When manufacturing operations of all of the RFID tag labels T are accomplished by employing one RFID circuit element storage unit, a new RFID circuit element storage unit is mounted on the RFID tag information communicating device 2', and then, an RF tag manufacturing work is again carried out. Alternatively, an RFID tag manufacturing work may be carried out by replacing a plurality of RFID circuit element storage units, the tag attribute parameters (tag widths) of which are different from each other.

While considering the above-explained matters, in this third embodiment, the above-described RFID circuit element storage unit is made in the form of a cartridge which can be detachably mounted on the side of the RFID tag information communicating device 2', and further, while the memory 200 is provided in this cartridge 100', the information (above-described identification information etc.) related to all of the RFID circuit elements To of the RFID circuit element storage unit has been held in the memory 200. Concretely speaking, in the case that the RFID circuit elements To are sequentially carried on the base tape 101 so as to construct the RFID circuit element storage unit when the cartridge 100' is manufactured, ID numbers of the respective RFID circuit elements To which are grasped at this time are previously stored in the memory 200 in the deriving order from the cartridge 100' (refer to FIG. 30 and FIG. 31). As a result, when the cartridge 100' is mounted on the RFID tag information communicating device 2' so as to read the RFID tag information, the control circuit 30 provided outside the cartridge 100' can access the memory 200 so as to acquire such an ID number of an RFID circuit element To in the step S420 shown in FIG. 32, the RFID tag information of which should be presently read out. As a result, since the RFID circuit element To to be read can be easily specified, the RFID tag information communicating device 2' can be communicated with only this specified RFID circuit element To in either the step S490A or the step S490B, so that it is possible to avoid that the RFID tag information is read out from the IC circuit parts 151 of other RFID circuit elements To which should not be read. As a result, the smooth accessing operation can be secured with respect to the RFID circuit element To within the cartridge 100'.

Also, when the ID number of the element to be read is specified in the above-explained manner, and then, the information reading operation from the IC circuit part 151 of one RFID circuit element To is accomplished, such a process operation is carried out in either a step S500A or a step S500B in which 1 is added to either the RFID circuit element number to be read or the total printed number. Also, in a step S510, an updating processing operation of the information held in the memory 200 is carried out, so that an ID number (otherwise, information for this ID number) of the RFID circuit element To which constitutes a next reading subject can be obtained. As a consequence, since the above-explained process operations are repeated, while it is possible to avoid that the information is read out from other RFID circuit elements To which should not be read, the RFID tag labels T can be manufactured in a higher efficiency.

Furthermore, since the memory 200 functioning as the cartridge storage means is arranged within the cartridge 100' in connection with the RFID circuit element storage unit, even when the cartridge 100' is mounted/dismounted, the integral relative relationship between the RFID circuit element To of the RFID circuit element storage unit and the information held in the memory 200 can be firmly maintained.

As a consequence, in accordance with this third embodiment, while it is possible to avoid that the RFID tag information is read out from the IC circuit parts 151 of other RFID circuit elements To which should not be read, a large number of RFID tag labels T can be manufactured in a higher efficiency.

Also, since the information related to use frequencies and communication protocols is held in the memory 200, even in such a case that a plurality of RFID circuit element storage units whose use frequencies are different from each other are properly replaced with each other to be used with respect to, for example, one RFID tag information communicating device 2', the frequency band and the communication protocol, which correspond to each of these RFID circuit element storage units, can be easily selected, and thus, the communication operation can be firmly carried out.

Furthermore, since the memory 200 side is connected to the control circuit 30 side via the connector 201 and the connector 202 which can be engaged and disengaged, while mounting/dismounting characteristic of the cartridge 100' with respect to the RFID tag information communicating device 2' can be maintained, when the cartridge 100' is mounted on the RFID tag information communicating device 2', the communication path between the memory 200 provided in the cartridge 100' and the control circuit 30 can be firmly secured via these connector 201 and connector 202.

Also, as explained in the step S450 of FIG. 32, the remaining number of the RFID circuit elements To provided in the cartridge 100' is continuously displayed on either the terminal 5 or the general-purpose computer 6. As a result, a total number of the RFID circuit elements To which are left in the cartridge 100' which can be hardly grasped under normal condition can be firmly and continuously grasped. Also, as explained in the step S460 and the step S470 of FIG. 32, when the remaining number of the RFID circuit elements To contained in the cartridge 100' becomes smaller than a certain number (namely, becomes smaller than 5 in this example), a warning display operation is performed either on the terminal 5 or the general-purpose computer 6. As a result, if the remaining number of the RFID circuit elements To contained in the cartridge 100' becomes smaller than a certain number, then the next new cartridge 100' may be previously prepared, so that a large number of RFID tag labels T may be manufactured in a higher efficiency.

It should also be understood that the above-described third embodiment has exemplified such an example that as the cartridge, the cartridge 100' equipped with the first roll 102 has been provided, while the first roll 102 rolls out the belt-shaped base tape 101 on which the plural RFID circuit elements To have been sequentially formed along the longitudinal direction. The present invention is not limited only this cartridge 100', but may be realized by other cartridge modes.

FIG. 34 is a conceptional perspective view for showing such a modification.

In FIG. 34, in this modification, a tray member (tray type cartridge) 211 having a substantially flat box shape is provided as the cartridge. In this tray member 211, a plurality of label materials 212 are stacked with each other along a stacking direction, and then, the stacked label materials 212 are stored, while a single piece of RFID circuit element To has been formed on each of these label materials 212. The plural RFID circuit elements To are sequentially taken out by drawing the flat sheet-shaped label materials 212 one by one from a deriving port 211A which is provided on one side plane (namely, depth side in this example) of the tray member 211. The RFID circuit element To derived from the tray member 211 is set to an opposite position (just under position) of the antenna 14 equipped in the RFID tag information communicating device 2', and a reading operation thereof is carried out. In other words, an RFID circuit element storage unit is constituted by the tray member 211 and the label member 212.

Then, a memory 200' has been assembled in the side portion of the tray member 211. Although not shown in the drawing, a connector (communication interface means; first communication interface means) 201' connectable to this memory 200' is provided on the tray member 211. When the tray member 211 is mounted/dismounted on the main body side of the RFID tag information communication device 2', this connector 201' can be engaged/disengaged with the above-explained connector 202 (refer to FIG. 29) provided on the main body of the RFID tag information communicating device 2'.

Also, in accordance with this modification, an effect similar to that of the above-described embodiment may be achieved.

Furthermore, the above description has been made of such an example that the present invention is applied to the system for manufacturing the only readable (writing operation is not allowed) RFID tags. The present invention is not limited only to this example, but may be modified. That is, the present invention may be applied to a system for manufacturing an RFID tag in which RFID tag information is written in the IC circuit part 151 of the RFID circuit element To.

In this alternative case, in the arrangement of the above-explained RFID tag information communicating device 2', the radio frequency circuit 21 may play a function for accessing (writing) the RFID tag information of the IC circuit part 151 of the RFID circuit element To via the antenna 14; and the crystal oscillator 35, the PLL 36, and VCO 37 of the transmitting portion 32 thereof may play a carrier wave generating part which generates a carrier wave used to access (write) the RFID tag information of the IC circuit part 151. Also, the signal processing circuit 22 may function as an access information producing means which produces access information ("Erase" signal, "Verify" signal, "Program" signal, and the like) which accesses the IC circuit part 151.

Then, as previously explained with reference to FIG. 14, in this alternative case, a print character "R", an access ID (writing ID in this case) of an RFID circuit element To, an address of product information, a storage destination address of corresponding information, and the like are displayed on either the terminal 5 or the general-purpose computer 6. Then, the RFID tag information communicating device 2' is operated by operating this terminal 5, or the general-purpose computer 6, so that the print character "R" is printed on the cover film 103, and also, the information such as the writing ID and the product information is written in the IC circuit part 151.

FIG. 35 is a flow chart for indicating a sequence of accessing operations (writing operations in this example) with respect to an IC circuit part of an RFID circuit element To, and transmitting/receiving operations of information with respect to the memory 200, among control operations executed by the control circuit 30 in this modification. FIG. 35 is a diagram substantially equal to FIG. 32 of the above-described embodiment.

In FIG. 35, when a writing operation (for example, writing operation is carried out for every one RFID circuit element To) is carried out in the RFID tag information communicating device 2', this flow operation is commenced.

Since a step S410 to a step S470 are similar to those of FIG. 32, explanations thereof are omitted. In a step S480, similar to FIG. 32, a judgement is made as to whether or not information stored in the memory 200 is the serial type. When the stored information corresponds to the serial type, the judgement is satisfied, and then, the writing operation is advanced to a step S490A', whereas when the stored information corresponds to the random type, the judgment is not satisfied, and then, the writing operation is advanced to a step S490B', in which a writing process operation to an RFID circuit element To which should be accessed (written in this case) is carried out respectively.

FIG. 36 is a flow chart for indicating detailed control contents in the step S490A' and the step S490B'.

In FIG. 36, first of all, in a step S610, operators "N" and "M" are initialized as "0" respectively, while the operators "N" and "M" count a retry time when a communication failure is questioned.

Then, in a step S620, an "Erase" command is outputted to the signal processing circuit 22. Based upon this "Erase" command, an "Erase" signal is produced as access information in the signal processing circuit 22, and this produced "Erase" signal is transmitted to the RFID circuit element To to be accessed (into which information is to be written in this example) via the radio frequency circuit 21 so as to initialize the memory part 157 thereof.

Next, in a step S630, a "Verify" command is outputted to the signal processing circuit 22. Based upon this "Verify" command, a "Verify" signal is produced as access information in the signal processing circuit 22, and this produced "Verify" signal is transmitted to the RFID circuit element To into which information is to be written via the radio frequency circuit 21 so as to prompt a reply signal. Thereafter, in a step S640, the reply signal transmitted from the RFID circuit element To to be written in correspondence with the "Verify" signal is received via the antenna 14, and is acquired via the radio frequency circuit 21 and the signal processing circuit 22.

Next, in a step S650, the information stored in the memory part 157 of this RFID circuit element To is confirmed based upon the reply signal, and a judgement is made as to whether or not the memory part 157 is initialized under normal condition.

When the judgement is not satisfied, the writing sequential operation is advanced to a step S660 in which 1 is added to "M." Further, a judgement is made as to whether or not M=5 in a step S670. In case of M≦4, the judgement cannot be satisfied, and the writing sequential operation is returned to the step S620 in which a similar sequential operation is repeated. When M=5, the sequential operation is advanced to a step S680. In this step S680, an error display signal is outputted via the input/output interface 201 and the communication line 3 to either the terminal 5 or the general-purpose computer 6 so as to display a writing failure (error), and then, this routine is accomplished. Even when the initializing operations are not good as explained above, the retry operations are carried out up to 5 times.

In the case that the judgement of the step S650 is satisfied, the writing sequential operation is advanced to a step S690. In this step S690, a "Program" command is outputted to the signal processing circuit 22. Based upon this "Program" command, a "Program" signal is produced as access information equal to predetermined information which is originally wanted to be written in the signal processing circuit 22, and this produced "Program" signal is transmitted to the RFID circuit element To into which information is to be written via the radio frequency circuit 21 so as to write the predetermined information into the memory part 157 thereof.

Thereafter, in a step S700, a "Verify" command is outputted to the signal processing circuit 22. Based upon this "Verify" command, a "Verify" signal is produced as access information in the signal processing circuit 22, and this produced "Verify" signal is transmitted to the RFID circuit element To into which information is to be written via the radio frequency circuit 21 so as to prompt a reply signal. Thereafter, in a step S710, the reply signal transmitted from the RFID circuit element To to be written in correspondence with the "Verify" signal is received via the antenna 14, and is acquired via the radio frequency circuit 21 and the signal processing circuit 22.

Next, in a step S720, the information stored in the memory part 157 of this RFID circuit element To is confirmed based upon the reply signal, and a judgement is made as to whether or not the above-explained transmitted predetermined information is stored in the memory part 157 under normal condition.

When the judgement is not satisfied, the writing sequential operation is advanced to a step S730 in which 1 is added to "N." Further, a judgement is made as to whether or not N=5 in a step S740. In case of N≦4, the judgement cannot be satisfied, and the writing sequential operation is returned to the step S690 in which a similar sequential operation is repeated. When N=5, the sequential operation is advanced to a step S680. In this step S680, an error display signal similarly displays a writing failure (error), and then, this routine is accomplished. Even when the information writing operations are not good as explained above, the retry operations are carried out up to 5 times.

In the case that the judgement of the step S720 is satisfied, the writing sequential operation is advanced to a step S750. In this step S750, a "Lock" command is outputted to the signal processing circuit 22. Based upon this "Lock" command, a "Lock" signal is produced in the signal processing circuit 22, and this produced "Lock" signal is transmitted to the RFID circuit element To into which information is to be written via the radio frequency circuit 21 so as to prohibit a writing operation of new information into this RFID circuit element To, and then this routine is accomplished.

In the above-described routine, the RFID circuit element To to be written is designated (specified), and thus, desirable information (RFID tag information) can be written with respect to the IC circuit part 151 thereof.

In the case of the above-described serial type, in the step S490A', the information reading process operation is carried out with respect to the RFID circuit element To of such an ID number which has been held in "RFID circuit element number to be accessed" at this time. Thereafter, the control process operation is advanced to a step S500A' shown in FIG. 35. In the step S500A', 1 is added to "RFID circuit element number to be accessed (written in this case)" shown in the lowermost stage of FIG. 30 among the information read from the memory 200 in the previous step S420. Thereafter, the control process operation is advanced to a step S510. In this step S510, an update control signal is outputted to the memory 200, and the information stored in the memory 200 is overwritten/updated by the above-explained content.

In the case of the above-described random type, in the step S490B', the information reading process operation is carried out with respect to the RFID circuit element To of such an ID number which has been stored at such an address defined by adding 1 to a total number being held in "total printed number" at this time. Thereafter, the control process operation is advanced to a step S500B similar to FIG. 32. In the step S500B, 1 is added to "total printed number" shown in the lowermost stage of FIG. 31. Thereafter, the control process operation is advanced to the step S510. In this step S510, the information stored in the memory 200 is overwritten/updated by the above-explained content, and then this flow operation is ended.

As previously described, with respect to the basic structure and the functions for writing the RFID tag information to the IC circuit part 151, the cartridge 100' (otherwise, tray member 211) is applied, so that an effect substantially similar to the above-explained effect can be obtained, while the cartridge 100' is equipped with the memory 200 (or, memory 200') which holds the above-explained information (identification information of the respective RFID circuit elements To) related to the RFID circuit element To.

In other words, when the cartridge 100' (or tray member 211) is mounted on the RFID tag information communicating device 2', and the RFID tag information writing operation is carried out, the external control circuit 30 can access the memory 200 in the step S420 shown in FIG. 35 and can acquire the ID number of the RFID circuit element To into which the RFID tag information should be presently written. As a result, since the RFID circuit element To which should be written can be easily specified, it is possible to avoid that the RFID tag information is written with respect to the IC circuit parts 151 of other RFID circuit elements To which should not be written by communicating only to this specified RFID circuit element To in either the step S490A' or the step S490B'. Also, when the ID number of the writing subject is specified in the above-described manner and the information writing operation to the IC circuit part 151 of one RFID circuit element To is accomplished, such a process operation is performed in either the step S500A or the step S500B in which 1 is added to either the RFID circuit element number to be written or the total print number. Also, such an update process operation for updating the information held in the memory 200 is carried out in the step S510. As a result, the ID number (otherwise, information for acquiring ID number) of the RFID circuit element To which constitutes the subsequent writing subject can be obtained.

In the above descriptions, the RFID tag information communicating devices 2 and 2' access the RFID tag information of the IC circuit part 151 of the RFID circuit element To so as to read, or write the information, and also operate the thermal head 10 to print in order to identify this RFID circuit element To. Alternatively, this printing operation is not always carried out, but only the reading operation, or only the writing operation may be carried out.

It should also be assumed that the "Scroll All ID signal", "Erase signal", "Verify signal", and "Program signal" which are employed in the above embodiments may follow the Auto-ID specification defined by the EPC global. This EPC global implies a non-profit-making corporation which has been founded by the international EAN association corresponding to the international institute of distribution codes, and also Unformed Code Council (UCC) corresponding to the US distribution code institute. It should also be understood that even when there are any other signals following other standards, if these signals may have similar functions, then these signals may be employed.

Although not exemplified, the present invention may be modified in various manners without departing from the technical spirit and scope of the present invention.

What is claimed is:

1. An RFID tag information communicating device comprising:
   a housing;
   a cartridge holder provided on said housing, for detachably mounting thereon a cartridge, said cartridge being equipped with a plurality of RFID circuit elements each having an IC circuit part for storing predetermined information and a tag antenna connected to said IC circuit part, for transmitting/receiving information, and said cartridge holding information related to said RFID circuit elements;
   a device antenna for transmitting/receiving in a radio communication between the device antenna and said tag antenna of a specific RFID circuit element among said plurality of RFID circuit elements;
   access information producing means for producing access information used to access RFID tag information of said IC circuit part; and
   information transmitting means for transmitting said access information produced by said access information means via said device antenna to said tag antenna in a non-contact manner so as to access said RFID tag information of said IC circuit part.

2. An RFID tag information communicating device according to claim 1 wherein:
   said cartridge has held either a tag attribute parameter or a communication parameter of said RFID circuit element as the information related to said RFID circuit element; and
   said RFID tag information communicating device further comprises:
   transmission control means for controlling a transmission manner from said information transmitting means so as to be coincident with either said tag attribute parameter or said communication parameter.

3. An RFID tag information communicating device according to claim 2 wherein:
   first parameter information which corresponds to said tag attribute parameter and said communication parameter of said corresponding RFID circuit element is formed in said cartridge;
   said RFID tag information communicating device further comprises:

first information detecting means for detecting said first parameter information; and wherein:

said transmission control means controls the transmission manner from said information transmitting means based upon said first parameter information detected by said first information detecting means.

4. An RFID tag information communicating device according to claim 3 wherein:

said first or third information detecting means is means for optically or electrically identifying an identifier formed in said cartridge.

5. An RFID tag information communicating device according to claim 3 wherein:

said RFID tag information communicating device further comprises:

device storage means for storing said detected first parameter information.

6. An RFID tag information communicating device according to any one of claims 5 wherein:

said device storage means is a non-volatile storage means.

7. An RFID tag information communicating device according to claim 2 wherein:

said RFID tag information communicating device further comprises:

information receiving means for receiving a reply signal transmitted from said IC circuit part after said access information has been transmitted by said information transmitting means in response to said transmitted access information via said tag antenna by said device antenna in a non-contact manner, and for performing a reading operation; and second information detecting means for detecting second parameter information related to said tag attribute parameter of said corresponding RFID circuit element in response to the reply signal read by said information receiving means; and wherein:

said transmission control means controls the transmission manner from said information transmitting means based upon said second parameter information detected by said second information detecting means.

8. An RFID tag information communicating device according to claim 7 wherein:

said RFID tag information communicating device further comprises:

device storage means for storing said detected second to fourth parameter information.

9. An RFID tag information communicating device according to claim 8 wherein:

said RFID tag information communicating device further comprises:

judging means for judging as to whether or not said information transmitting means executes said access operation in the transmission manner based upon the control of said transmission control means, and thereafter, can succeed in an access operation to said IC circuit part;

reconfirmation instruction transmitting means operated in such a manner that when said judging means judges an access failure, a reconfirmation instruction signal for reconfirming either said tag attribute parameter or said communication parameter of said RFID circuit element is transmitted via said device antenna to said tag antenna in a non-contact manner;

information re-receiving means for receiving the fifth parameter information related to said tag attribute parameter or said communication parameter read from said IC circuit part in response to said reconfirmation instruction signal via said tag antenna by said device antenna in a non-contact manner, and for reading said received fifth parameter means; and update control means for updating parameter information stored in said device storage means into said fifth parameter.

10. An RFID tag information communicating device according to claim 9 wherein:

either said reconfirmation instruction transmitting means or said initial confirmation instruction transmitting means produces and transmits said reconfirmation instruction signal and said initial confirmation instruction signal based upon said communication parameter based on said parameter information stored in said device storage means.

11. An RFID tag information communicating device according to claim 10 wherein:

in the case that an effective signal is not read from the said IC circuit part in response to either said reconfirmation instruction signal or said initial confirmation instruction signal, either said reconfirmation instruction transmitting means or said initial confirmation instruction transmitting means newly produces and transmits said reconfirmation instruction signal and said initial confirmation instruction signal in correspondence with a communication parameter different from said communication parameter.

12. An RFID tag information communicating device according to claim 8 wherein:

said RFID tag information communicating device further comprises:

initial confirmation instruction transmitting means for transmitting an initial confirmation instruction signal via said device antenna to said tag antenna in a non-contact manner, said initial confirmation instruction signal initially confirming either said tag attribute parameter or said communication parameter when said cartridge is replaced or a power supply is turned ON; and initial information receiving means for receiving sixth parameter information related to said tag attribute parameter or said communication parameter read from said IC circuit part in response to said initial confirmation instruction signal via said tag antenna by said device antenna in a non-contact manner, and for reading said received sixth parameter means; and wherein:

update control means updates parameter information stored in said device storage means into said sixth parameter.

13. An RFID tag information communicating device according to claim 2 wherein:

third parameter information which corresponds to said tag attribute parameter and said communication parameter of said corresponding RFID circuit element is formed in said cartridge;

said RFID tag information communicating device further comprises:

third information detecting means for detecting said third parameter information;

confirmation instruction transmitting means for transmitting a confirmation instruction signal via said device antenna to said tag antenna in a non-contact manner, said confirmation instruction signal confirming said tag attribute parameter of said RFID circuit element based upon said third parameter information detected by said third information detecting means; and confirmation information receiving means for receiving fourth parameter information related to said tag attribute parameter read from said IC circuit part via said tag antenna by said device antenna in a non-contact manner in response to said confirmation instruction signal, and for reading said received fourth parameter information; and wherein:

said transmission control means controls the transmission manner from said information transmitting means based upon both said fourth parameter information read by said confirmation information receiving means and said third parameter information detected by said third information detecting means.

14. An RFID tag information communicating device according to any one of claims 2 wherein:

said tag attribute parameter contains at least one of a sensitivity of said tag antenna of said corresponding RFID circuit element, a memory capacity of said IC circuit part, a width of a tape for adhering said RFID circuit element, and an arranging interval of the RFID circuit elements on the tape.

15. An RFID tag information communicating device according to any one of claims 2 wherein:

said communication parameter contains at least one of a frequency of electromagnetic waves, electric power thereof, and a communication protocol, which are used in said radio communication operation.

16. An RFID tag information communicating device according to claim 1 wherein:

said cartridge comprises: an RFID circuit element storage unit for storing said plurality of RFID circuit elements in such a manner that said circuit elements can be sequentially derived; and cartridge storage means for storing information related to said RFID circuit elements; and wherein:

said RFID tag information communicating device further comprises:

access control means for reading information held in said cartridge storage means, and for controlling an access operation by said information transmitting means based upon said read information.

17. An RFID tag information communicating device according to claim 16 wherein:

said access control means specifies an RFID circuit element to be accessed among the RFID circuit elements which are sequentially derived from said cartridge based upon said read information; and said information transmitting means accesses with respect to the RFID circuit element specified by said access control means.

18. An RFID tag information communicating device according to claim 16 wherein:

said RFID tag information communicating device further comprises:

first communication interface means connected to said access control means, for reading information from said cartridge storage means to said access control means; and wherein:

said cartridge comprises: second communication interface means which is constituted to be detachably connected to said first communication interface means, and which reads information from said cartridge storage means.

19. A cartridge for an RFID tag information communicating device comprising:

a plurality of RFID circuit elements each having an IC circuit part for storing predetermined information and a tag antenna connected to said IC circuit part, for transmitting/receiving information;

holding information related to said RFID circuit elements; and detachably connectable to an RFID tag information communicating device for producing access information used to access RFID tag information of said IC circuit part, and for transmitting said access information to said tag antenna in a non-contact manner by way of a radio communication operation so as to access said RFID tag information of said IC circuit part.

20. A cartridge for an RFID tag information communicating device according to claim 19 wherein:

said cartridge comprises:

an RFID circuit element storage unit for storing said plurality of RFID circuit elements in such a manner that said circuit elements can be sequentially derived; and cartridge storage means for storing information related to said RFID circuit elements.

21. A cartridge for an RFID tag information communicating device according to claim 20 wherein:

said cartridge storage means holds identification information of said plurality of RFID circuit elements.

22. A cartridge for an RFID tag information communicating device according to claim 20 wherein:

said cartridge storage means holds information related to frequencies used in said plurality of RFID circuit elements.

23. A cartridge for an RFID tag information communicating device according to any one of claims 20 wherein:

said cartridge storage means holds information related to communication protocol sorts of said plurality of RFID circuit elements.

24. A cartridge for an RFID tag information communicating device according to any one of claims 20 wherein:

said cartridge storage means is constructed in such a manner that information can be read as well as written.

25. A cartridge for an RFID tag information communicating device according to any one of claims 20 wherein:

said cartridge further comprises:

detachably mounted communication interface means for reading and writing information from an external source outside said cartridge into said cartridge storage means.

26. A cartridge for an RFID tag information communicating device according to any one of claims 20 wherein:

said RFID circuit element storage unit comprises:

a tape-shaped label material on which said plurality of RFID circuit elements have been sequentially formed along a longitudinal direction of said label material; and a reel member for rolling said tape-shaped label material.

27. A cartridge for an RFID tag information communicating device according to any one of claims 20 wherein:

said RFID circuit element storage unit comprises:

a plurality of label materials having a flat paper shape, in which one piece of said RFID circuit element has been formed respectively; and a tray member for stacking said plurality of flat paper-shaped label materials with each other along a stacking direction and storing the stacked label materials.

28. An RFID circuit element processing system comprising:

a cartridge equipped with a plurality of RFID circuit elements each having an IC circuit part for storing predetermined information and a tag antenna connected to said IC circuit part, for transmitting/receiving information, and for holding information related to said RFID circuit elements;

a device antenna for transmitting/receiving in a radio communication between the device antenna and said tag antenna of a specific RFID circuit element among said plurality of RFID circuit elements;

access information producing means for producing access information used to access RFID tag information of said IC circuit part; and information transmitting means for transmitting said access information produced by said access information means via said device antenna to said tag antenna in a non-contact manner so as to access said RFID tag information of said IC circuit part.

29. An RFID circuit element processing system according to claim 28 wherein:

said cartridge comprises:

an RFID circuit element storage unit for storing said plurality of RFID circuit elements in such a manner that said circuit elements can be sequentially derived; and cartridge storage means for storing information related to said plural RFID circuit elements; and which:

said RFID circuit element processing system further comprises:

information process control means for reading information held in said cartridge storage means, for controlling an access operation of said information transmitting means based upon said read information, and further, for updating the information held in said cartridge storage means in response to the controlled access operation of said cartridge storage means.

30. An RFID circuit element processing system according to claim 29 wherein:

said cartridge storage means has held information related to a remaining number of the RFID circuit elements left in said cartridge; and said information process control means rewrites the information related to said remaining number in response to the access operation of said information transmitting means with respect to said RFID circuit elements which are sequentially derived.

31. An RFID circuit element processing system according to claim 30 wherein:

in the case that said remaining number held by said cartridge storage means becomes smaller than a predetermined threshold value, said information process control means outputs a warning output for warning that unused RFID circuit elements within said cartridge are decreased.

32. An RFID circuit element processing system according to claim 29 wherein:

said cartridge storage means has held information related to a total number of used RFID circuit elements which had been derived from said cartridge to be accessed; and said information process control means rewrites the information related to said total use number in response to the access operation by said information transmitting means with respect to said RFID circuit elements which are sequentially derived.

33. An RFID circuit element processing system according to claim 32 wherein:

in the case that said total use number held by said cartridge storage means becomes larger than a predetermined threshold value, said information process control means outputs a warning output for warning that unused RFID circuit elements within said cartridge are decreased.

34. An RFID circuit element processing system according to claim 29 wherein:

said plural RFID circuit elements of said RFID circuit element storage unit have been carried on a label material in correspondence with a deriving order of identifiers attached to the respective RFID circuit elements from said cartridge;

as information related to said plurality of RFID circuit elements, said cartridge storage means has held a starting identifier of such an RFID circuit element which is firstly derived from said cartridge among said plurality of RFID circuit elements within said cartridge; an end identifier of such an RFID circuit element which is finally derived from said cartridge; and a next processing identifier of such an RFID circuit element which should be subsequently accessed at the present time;

said information process control means executes a transfer process operation of said next processing identifier held in said cartridge storage means in response to the access operation of said information transmitting means.

35. An RFID circuit element processing system according to claim 29 wherein:

said plural RFID circuit elements of said RFID circuit element storage unit have been carried on a label material independently of a deriving order of identifiers attached to the respective RFID circuit elements from said cartridge;

as information related to said plurality of RFID circuit elements, said cartridge storage means has held an identifier series of all of the RFID circuit element within said cartridge; and total use number information of the RFID circuit elements which have already been accessed at the present time;

said information process control means executes an increasing process operation of said total use information held in said cartridge storage means in response to the access operation of said information transmitting means.

* * * * *